United States Patent
Lee et al.

(10) Patent No.: US 9,715,761 B2
(45) Date of Patent: Jul. 25, 2017

(54) REAL-TIME 3D COMPUTER VISION PROCESSING ENGINE FOR OBJECT RECOGNITION, RECONSTRUCTION, AND ANALYSIS

(71) Applicant: VanGogh Imaging, Inc., McLean, VA (US)

(72) Inventors: Ken Lee, Fairfax, VA (US); Jun Yin, McLean, VA (US); Xin Hou, Falls Church, VA (US); Greg Werth, Washington, DC (US); Yasmin Jahir, McLean, VA (US)

(73) Assignee: VanGogh Imaging, Inc., McLean, VA (US)

( * ) Notice: Subject to any disclaimer, the term of this patent is extended or adjusted under 35 U.S.C. 154(b) by 374 days.

(21) Appl. No.: 14/324,891

(22) Filed: Jul. 7, 2014

(65) Prior Publication Data

US 2015/0009214 A1    Jan. 8, 2015

Related U.S. Application Data

(60) Provisional application No. 61/843,646, filed on Jul. 8, 2013, provisional application No. 61/885,228, filed on (Continued)

(51) Int. Cl.
*G06T 17/10* (2006.01)
*G06K 9/46* (2006.01)
(Continued)

(52) U.S. Cl.
CPC .......... *G06T 17/10* (2013.01); *G06K 9/00201* (2013.01); *G06T 7/0046* (2013.01);
(Continued)

(58) Field of Classification Search
CPC ..... G06T 17/10; G06T 7/0028; G06T 7/0046; G06T 7/0065; G06T 17/20;
(Continued)

(56) References Cited

U.S. PATENT DOCUMENTS 6,259,815 B1   7/2001  Anderson et al.
6,525,722 B1   2/2003  Deering
(Continued)

FOREIGN PATENT DOCUMENTS

KR       10-1054736 B1    8/2011
KR    10-2011-0116671 A   10/2011

OTHER PUBLICATIONS

Biegelbauer, Georg et al., "Model-based 3D object detection—Efficient approach using superquadrics," Machine Vision and Applications, Jun. 2010, vol. 21, Issue 4, pp. 497-516.
(Continued)

*Primary Examiner* — Tapas Mazumder
(74) *Attorney, Agent, or Firm* — Proskauer Rose LLP

(57) ABSTRACT

Methods and systems are described for generating a three-dimensional (3D) model of a fully-formed object represented in a noisy or partial scene. An image processing module of a computing device receives images captured by a sensor. The module generates partial 3D mesh models of physical objects in the scene based upon analysis of the images, and determines a location of at least one target object in the scene by comparing the images to one or more 3D reference models and extracting a 3D point cloud of the target object. The module matches the 3D point cloud of the target object to a selected 3D reference model based upon a similarity parameter, and detects one or more features of the target object. The module generates a fully formed 3D model of the target object using partial or noisy 3D points from the scene, extracts the detected features of the target object and
(Continued)

features of the 3D reference models that correspond to the detected features, and calculates measurements of the detected features.

43 Claims, 49 Drawing Sheets

Related U.S. Application Data on Oct. 1, 2013, provisional application No. 61/921,058, filed on Dec. 26, 2013, provisional application No. 61/942,551, filed on Feb. 20, 2014, provisional application No. 61/973,606, filed on Apr. 1, 2014, provisional application No. 61/978,424, filed on Apr. 11, 2014.

(51) Int. Cl.
  *G06T 5/00* (2006.01)
  *G06T 17/20* (2006.01)
  *G06T 7/00* (2017.01)
  *G06K 9/00* (2006.01)

(52) U.S. Cl.
  CPC ............ *G06T 7/0065* (2013.01); *G06T 17/20* (2013.01); *G06T 2207/10028* (2013.01); *G06T 2207/20028* (2013.01)

(58) Field of Classification Search
  CPC  G06T 2207/20028; G06T 2207/10028; G06K 9/4609; G06K 9/00201
  See application file for complete search history.

(56) References Cited

U.S. PATENT DOCUMENTS

| | | | |
|---|---|---|---|
| 6,525,725 | B1 | 2/2003 | Deering |
| 7,248,257 | B2 | 7/2007 | Elber |
| 7,420,555 | B1 | 9/2008 | Lee |
| 2005/0068317 | A1 | 3/2005 | Amakai |
| 2005/0253924 | A1 | 11/2005 | Mashitani |
| 2007/0075997 | A1 | 4/2007 | Rohaly et al. |
| 2010/0209013 | A1 | 8/2010 | Minear et al. |
| 2010/0310154 | A1* | 12/2010 | Barrois ............... G01B 11/245 382/154 |
| 2011/0184695 | A1* | 7/2011 | Grzesiak ............... G01B 5/008 702/167 |
| 2011/0310125 | A1* | 12/2011 | McEldowney ......... G06F 3/017 345/660 |
| 2012/0056800 | A1 | 3/2012 | Williams et al. |
| 2012/0063672 | A1 | 3/2012 | Gordon et al. |
| 2012/0130762 | A1 | 5/2012 | Gale et al. |
| 2013/0123801 | A1 | 5/2013 | Umasuthan et al. |
| 2014/0139639 | A1* | 5/2014 | Wagner ............. H04N 13/0253 348/46 |
| 2014/0267264 | A1* | 9/2014 | Crassin .................. G06T 15/08 345/424 |
| 2014/0267776 | A1* | 9/2014 | Duthu ................. G06Q 10/087 348/169 |
| 2015/0356727 | A1* | 12/2015 | Urano ................. G01N 21/956 382/149 |

OTHER PUBLICATIONS

Kanezaki, Asako et al., "High-speed 3D Object Recognition Using Additive Features in a Linear Subspace," 2010 IEEE International Conference on Robotics and Automation, Anchorage Convention District, May 3-8, 2010, pp. 3128-3134.

International Search Report and Written Opinion from corresponding International PCT patent application No. PCT/US14/045591, dated Nov. 5, 2014, 9 pages.

Rossignac, J. et al., "3D Compression Made Simple: Edgebreaker on a Corner-Table," Invited lecture at the Shape Modeling International Conference, Genoa, Italy (Jan. 30, 2001), pp. 1-6.

Melax, S., "A Simple, Fast, and Effective Polygon Reduction Algorithm," Game Developer, Nov. 1998, pp. 44-49.

Myronenko, A. et al., "Point Set Registration: Coherent Point Drift," IEEE Transactions on Pattern Analysis and Machine Intelligence, vol. 32, No. 12, Dec. 2010, pp. 2262-2275.

Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.

Izadi, S. et al., "KinectFusion: Real-time 3D Reconstruction and Interaction Using a Moving Depth Camera," UIST '11, Oct. 16-19, 2011, 10 pages.

Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 8-12, 2010, 14 pages.

\* cited by examiner

| Keys | | | Values | | |
|---|---|---|---|---|---|
| $\Delta(n_i,n_j)_0$ | $\Delta(n_i,p_j-p_i)_0$ | $\Delta(n_j,p_i-p_j)_0$ | $(p_{i0},p_{j0})_0$ | $(p_{i1},p_{j1})_0$ | $(p_{i2},p_{j2})_0$ ⋮ |
| $\Delta(n_i,n_j)_1$ | $\Delta(n_i,p_j-p_i)_1$ | $\Delta(n_j,p_i-p_j)_1$ | $(p_{i0},p_{j0})_1$ | $(p_{i1},p_{j1})_1$ | $(p_{i2},p_{j2})_1$ ⋮ |
| $\Delta(n_i,n_j)_2$ | $\Delta(n_i,p_j-p_i)_2$ | $\Delta(n_j,p_i-p_j)_2$ | $(p_{i0},p_{j0})_2$ | $(p_{i1},p_{j1})_2$ | $(p_{i2},p_{j2})_2$ ⋮ |
| ⋮ | ⋮ | | ⋮ | ⋮ | |

FIG. 19

REAL-TIME 3D COMPUTER VISION PROCESSING ENGINE FOR OBJECT RECOGNITION, RECONSTRUCTION, AND ANALYSIS

RELATED APPLICATIONS

This application claims priority to U.S. Provisional Patent Application No. 61/843,646, filed on Jul. 8, 2013; U.S. Provisional Patent Application No. 61/885,228, filed on Oct. 1, 2013; U.S. Provisional Patent Application No. 61/921,058, filed on Dec. 26, 2013; U.S. Provisional Patent Application No. 61/942,551, filed on Feb. 20, 2014; U.S. Provisional Patent Application No. 61/973,606, filed on Apr. 1, 2014; and U.S. Provisional Patent Application No. 61/978,424, filed on Apr. 11, 2014; the contents of each of which are incorporated herein in their entirety.

TECHNICAL FIELD

The subject matter of this application relates generally to methods and apparatuses, including computer program products, for three-dimensional (3D) computer vision processing including a 3D computer vision processing engine that can be plugged into various applications for different industries and capable of extracting a full 3D model of an object from a real-world scene in real-time.

BACKGROUND

Recently, 3D computer vision processing is starting to become more common in numerous industries for use in solving problems and improving existing workflows. For example, applications such as 3D printing, parts inspection, robotics, augmented reality, automotive safety, and medical analysis are using 3D computer vision processing techniques. However, real-time 3D computer vision processing takes significantly more computing power than is typically available in most existing platforms and using existing methods, especially for mobile and embedded applications. To compound this problem, most free open-source computer vision libraries are either too complex or inefficient to be used by most application developers.

There are a number of challenges in achieving real-time 3D vision processing in real-world environments. For example:

- Real-world environments are often very busy and dynamic.
- Many hardware platforms (e.g., smartphones) have limited processing power.
- Input scans from most low-cost scanners are frequently noisy and/or incomplete.
- The number of scans available for processing may also be limited.
- Objects of interest may be blocked.
- Significant manual post-processing is frequently required to extract the 3D model from the scene or object (e.g., the use of CAD software to clean up a 3D model).

Hence, there is currently no easy-to-use, integrated solution for implementing real-time computer vision technology—especially for object recognition and reconstruction.

SUMMARY

Therefore, what is needed is an efficient, fully automated, easy-to-use 3D computer vision processing method and system that can be used in real-time and works on multiple platforms. As will be described in greater detail below, the advantageous techniques described herein use priori information about the scene and/or object which is tolerant to noise and occlusions typically found in the real world. Further, the entire process is fully automated, alleviating the need for manual post-processing to form complete, accurate, fully-formed 3D models suitable for many commercial and consumer applications. The methods and systems described herein are designed to run efficiently on low cost, low power, System on Chip (SoC)-based processor platforms—such as ARM processors (available from ARM Ltd. of Cambridge, UK) that run Android™/Linux™ operating systems.

The invention, in one aspect, features a computerized method for generating a fully-formed three-dimensional (3D) model of an object represented in a noisy or partial scene. An image processing module of a computing device receives a plurality of images captured by a sensor coupled to the computing device. The images depict a scene containing one or more physical objects. The image processing module generates partial 3D mesh models of the physical objects in the scene based upon analysis of the plurality of images. The image processing module determines a location of at least one target object in the scene by comparing the plurality of images to one or more 3D reference models and extracting a 3D point cloud of the target object. The image processing module matches the 3D point cloud of the target object to a selected 3D reference model based upon a similarity parameter. The image processing module detects one or more features of the target object based upon the matching step. The image processing module generates a fully-formed 3D model of the target object using the 3D reference model and partial or noisy 3D points extracted from the scene. The image processing module extracts, using the 3D reference model, the detected features of the target object and features of the 3D reference models that correspond to the detected features of the target object. The image processing module calculates, using the 3D reference model, measurements of the detected features of the target object by comparing each of the detected features of the target object to the corresponding features of the 3D reference models.

The invention, in another aspect, features a system for generating a fully-formed three-dimensional (3D) model of an object represented in a noisy or partial scene. An image processing module of a computing device receives a plurality of images captured by a sensor coupled to the computing device. The images depict a scene containing one or more physical objects. The image processing module generates partial 3D mesh models of the physical objects in the scene based upon analysis of the plurality of images. The image processing module determines a location of at least one target object in the scene by comparing the plurality of images to one or more 3D reference models and extracting a 3D point cloud of the target object. The image processing module matches the 3D point cloud of the target object to a selected 3D reference model based upon a similarity parameter. The image processing module detects one or more features of the target object based upon the matching step. The image processing module generates a fully-formed 3D model of the target object using the 3D reference model and partial or noisy 3D points extracted from the scene. The image processing module extracts, using the 3D reference model, the detected features of the target object and features of the 3D reference models that correspond to the detected features of the target object. The image processing module calculates, using the 3D reference model, measurements of the detected features of the target object by comparing each of the detected features of the target object to the corresponding features of the 3D reference models.

The invention, in another aspect, features a computer program product, tangibly embodied in a non-transitory computer readable storage device, for generating a fully-formed three-dimensional (3D) model of an object represented in a noisy or partial scene. The computer program product includes instructions operable to cause an image processing module of a computing device to receive a plurality of images captured by a sensor coupled to the computing device. The images depict a scene containing one or more physical objects. The computer program product includes instructions operable to cause the image processing module to generate partial 3D mesh models of the physical objects in the scene based upon analysis of the plurality of images. The computer program product includes instructions operable to cause the image processing module to determine a location of at least one target object in the scene by comparing the plurality of images to one or more 3D reference models and extracting a 3D point cloud of the target object. The computer program product includes instructions operable to cause the image processing module to match the 3D point cloud of the target object to a selected 3D reference model based upon a similarity parameter. The computer program product includes instructions operable to cause the image processing module to detect one or more features of the target object based upon the matching step. The computer program product includes instructions operable to cause the image processing module to generate a fully-formed 3D model of the target object using the 3D reference model and partial or noisy 3D points extracted from the scene. The computer program product includes instructions operable to cause the image processing module to extract, using the 3D reference model, the detected features of the target object and features of the 3D reference models that correspond to the detected features of the target object. The computer program product includes instructions operable to cause the image processing module to calculate, using the 3D reference model, measurements of the detected features of the target object by comparing each of the detected features of the target object to the corresponding features of the 3D reference models.

The invention, in another aspect, features a 3D reference model data structure. The 3D reference model data structure includes a plurality of 2×2 arrays, wherein each row of an array represents a 2D layer of the 3D reference model and each column of the array represents points connected to points in layers above and below the 2D layer.

Any of the above aspects can include one or more of the following features. In some embodiments, the step of generating partial 3D mesh models of the physical objects in the scene comprises cleaning the plurality of images by removing artifacts caused by the scanner from the images; capturing a depth map for each cleaned image and converting the depth map into a point cloud; generating a 3D global model of the scene; registering the point cloud for each image to the 3D global model; updating the 3D global model after each registration of a point cloud; and generating the partial 3D mesh models after registration of the point clouds.

In some embodiments, the step of generating a 3D global model of the scene comprises analyzing, by the image processing module, the first image in the plurality of images to generate a global distance volume model. In some embodiments, the step of registering the depth map for each image to the 3D global model comprises comparing the point cloud for each image to the 3D global model using a multi-level iterative closest point (ICP) comparison.

In some embodiments, the step of updating the 3D global model after each registration of a point cloud comprises calculating a distance between a voxel in the 3D global model and one or more closest points in the point cloud based upon the ICP comparison; and updating a distance value of the voxel in the 3D global model based upon the calculated distance between the voxel and the one or more closest points. In some embodiments, the image processing module determines a position and a direction of the sensor relative to the scene; calculates a direction of one or more simulated rays traveling from the sensor to the 3D global model and determining whether each simulated ray crosses a surface of the 3D global model; determines a vertex and a normal for each simulated ray that crosses a surface of the 3D global model, the vertex and the normal based upon a point at which the simulated ray crosses the surface; and updates the 3D global model based upon the determined vertex and normal for each simulated ray.

In some embodiments, the depth map is filtered and/or downsampled before being converted into a point cloud. In some embodiments, the step of determining a location of at least one target object in the scene comprises determining a plurality of descriptors associated with pairs of points in the one or more 3D reference models; storing the descriptors of the 3D reference models in a table; removing one or more flat surfaces from the plurality of images and downsampling the images; sampling, by the image processing module, a pair of points in one of the plurality of images, where the sampled pair of points are at a specified distance from each other; determining a descriptor for the sampled pair of points; determining a rigid transform that aligns the sampled pair of points and a similar pair of points retrieved from the table; cropping an area from the image based upon the rigid transform; aligning the cropped area to one of the 3D reference models to obtain a rough transform of the 3D reference model; determining a number of registered points in the cropped area; projecting the rough transform of the 3D reference model to the image; determining a refined transform of the 3D reference model based upon the rough transform, wherein the refined transform includes a maximum number of projected points in the image; and aligning the maximum number of projected points to the 3D reference model to generate a final transform of the 3D reference model.

In some embodiments, the final transform is used to highlight the location of the target object in the scene. In some embodiments, the descriptor for the sampled pair of points is used as a key to retrieve the similar pair of points from the table. In some embodiments, the step of matching the 3D point cloud of the target object to a selected 3D reference model based upon a similarity measurement comprises selecting a 3D reference model; measuring a level of similarity between the 3D point cloud of the target object and the selected 3D reference model; repeating the steps of selecting a 3D reference model and measuring a level of similarity, for each of the 3D reference models; determining the 3D reference model corresponding to the highest level of similarity that is higher than the similarity parameter; and removing a plurality of points from the 3D reference model corresponding to the highest level of similarity.

In some embodiments, generating a fully formed 3D model of the target object using partial or noisy 3D points extracted from the scene comprises modifying the 3D reference model using the extracted partial or noisy 3D points. In some embodiments, the image processing module is further configured to retain an original point position of the 3D reference model if measurements of the detected features of the target object cannot be calculated using the corresponding features of the 3D reference models. In some embodiments, the image processing module is further configured to control an amount of modification of the 3D reference model to provide automatic smoothing of the extracted partial or noisy 3D points.

In some embodiments, the 2D layers in the 3D reference model data structure are of equal distance from each other. In some embodiments, the 3D reference model data structure includes a center of each 2D layer. In some embodiments, the 3D reference model data structure includes an interconnection array that provides connection points between two 3D reference models. In some embodiments, the rows of an array are sorted by height. In some embodiments, one or more points in the 3D reference model data structure are designated as feature points. In some embodiments, the image processing module uses the feature points to calculate measurements of the features in the 3D reference models.

In some embodiments, the calculated measurements of the detected features of the target object include a height of a detected feature, a width of a detected feature, a length of a detected feature, or a volume of a detected feature.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 19 depicts the structure of a 3D hash table to represent the object model.

DETAILED DESCRIPTION

Figure 1:
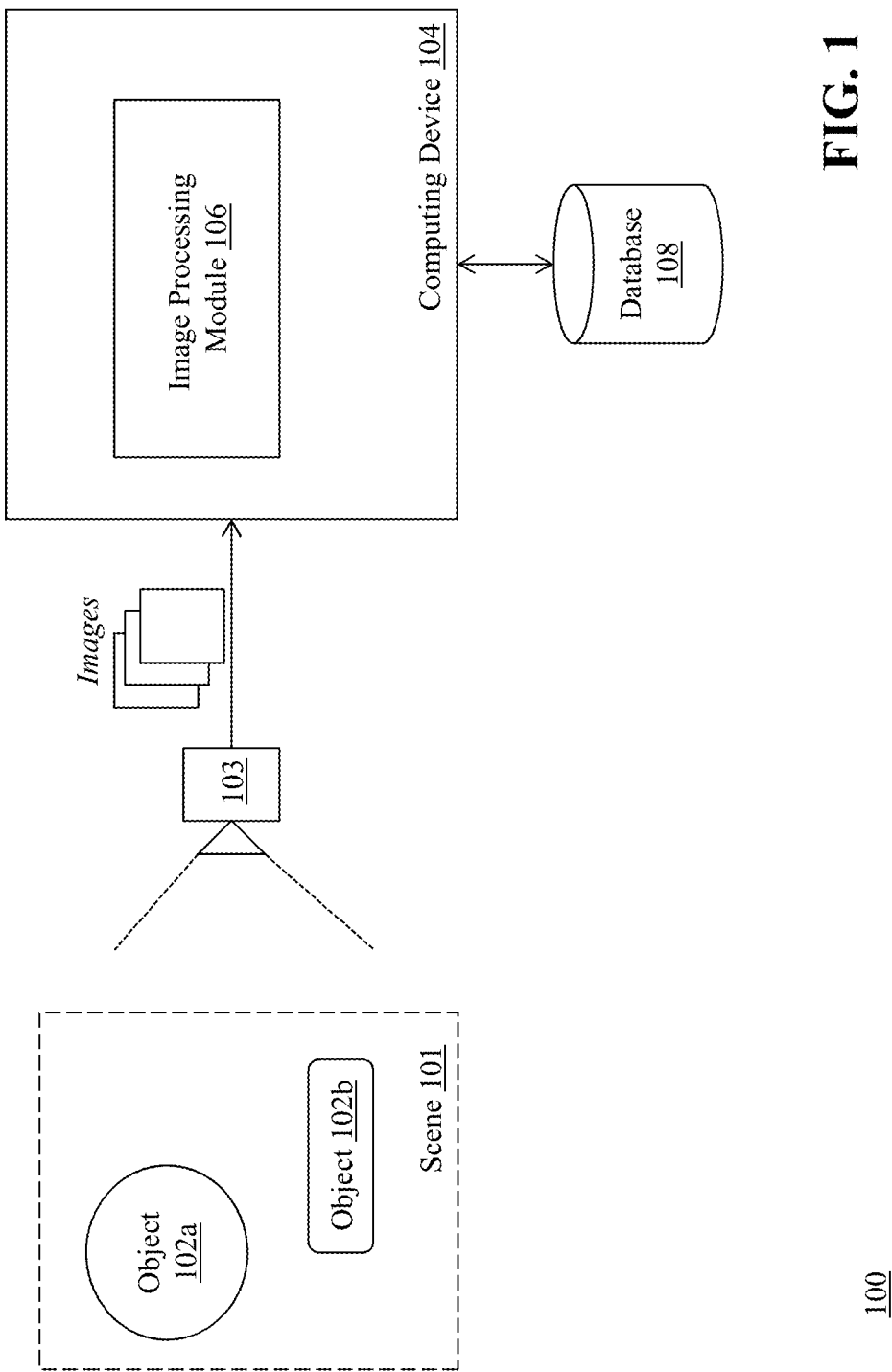
FIG. 1 is a block diagram of a system for generating a three-dimensional (3D) model of an object represented in a scene.

FIG. 1 is a block diagram of a system 100 for generating a three-dimensional (3D) model of an object represented in a scene. The system includes a sensor 103 coupled to a computing device 104. The computing device 104 includes an image processing module 106. The computing device is also coupled to a database 108.

The sensor 103 is positioned to capture images of a scene 101 which includes one or more physical objects (e.g., objects 102a-102b). Exemplary sensors that can be used in the system 100 include, but are not limited to, 3D scanners, digital cameras, and other types of devices that are capable of capturing images of a real-world object and/or scene to collect data on its position, location, and appearance. In some embodiments, the sensor 103 is embedded into the computing device 104, such as a camera in a smartphone, for example.

The computing device 104 receives images (also called scans) of the scene 101 from the sensor 103 and processes the images to generate 3D models of objects (e.g., objects 102a-102b) represented in the scene 101. The computing device 104 can take on many forms, including both mobile and non-mobile forms. Exemplary computing devices include, but are not limited to, a laptop computer, a desktop computer, a tablet computer, a smart phone, an internet appliance, or the like. It should be appreciated that other computing devices (e.g., an embedded system) can be used without departing from the scope of the invention. The mobile computing device 102 includes network-interface components to connect to a communications network. In some embodiments, the network-interface components include components to connect to a wireless network, such as a Wi-Fi or cellular network, in order to access a wider network, such as the Internet.

The computing device 104 includes an image processing module 106 configured to receive images captured by the sensor 103 and analyze the images in a variety of ways, including detecting the position and location of objects represented in the images and generating 3D models of objects in the images. The image processing module 106 is a hardware and/or software module that resides on the computing device 106 to perform functions associated with analyzing images capture by the scanner, including the generation of 3D models based upon objects in the images. In some embodiments, the functionality of the image processing module 106 is distributed among a plurality of computing devices. In some embodiments, the image processing module 106 operates in conjunction with other modules that are either also located on the computing device 104 or on other computing devices coupled to the computing device 104. An exemplary image processing module is the Starry Night plug-in for the Unity 3D engine or other similar libraries, available from VanGogh Imaging, Inc. of McLean, Va. It should be appreciated that any number of computing devices, arranged in a variety of architectures, resources, and configurations (e.g., cluster computing, virtual computing, cloud computing) can be used without departing from the scope of the invention.

The database 108 is coupled to the computing device 104, and operates to store data used by the image processing module 106 during its image analysis functions. The database 108 can be integrated with the server computing device 106 or be located on a separate computing device. An example database that can be used with the system 100 is MySQL™ available from Oracle Corp. of Redwood City, Calif.

Figure 2:
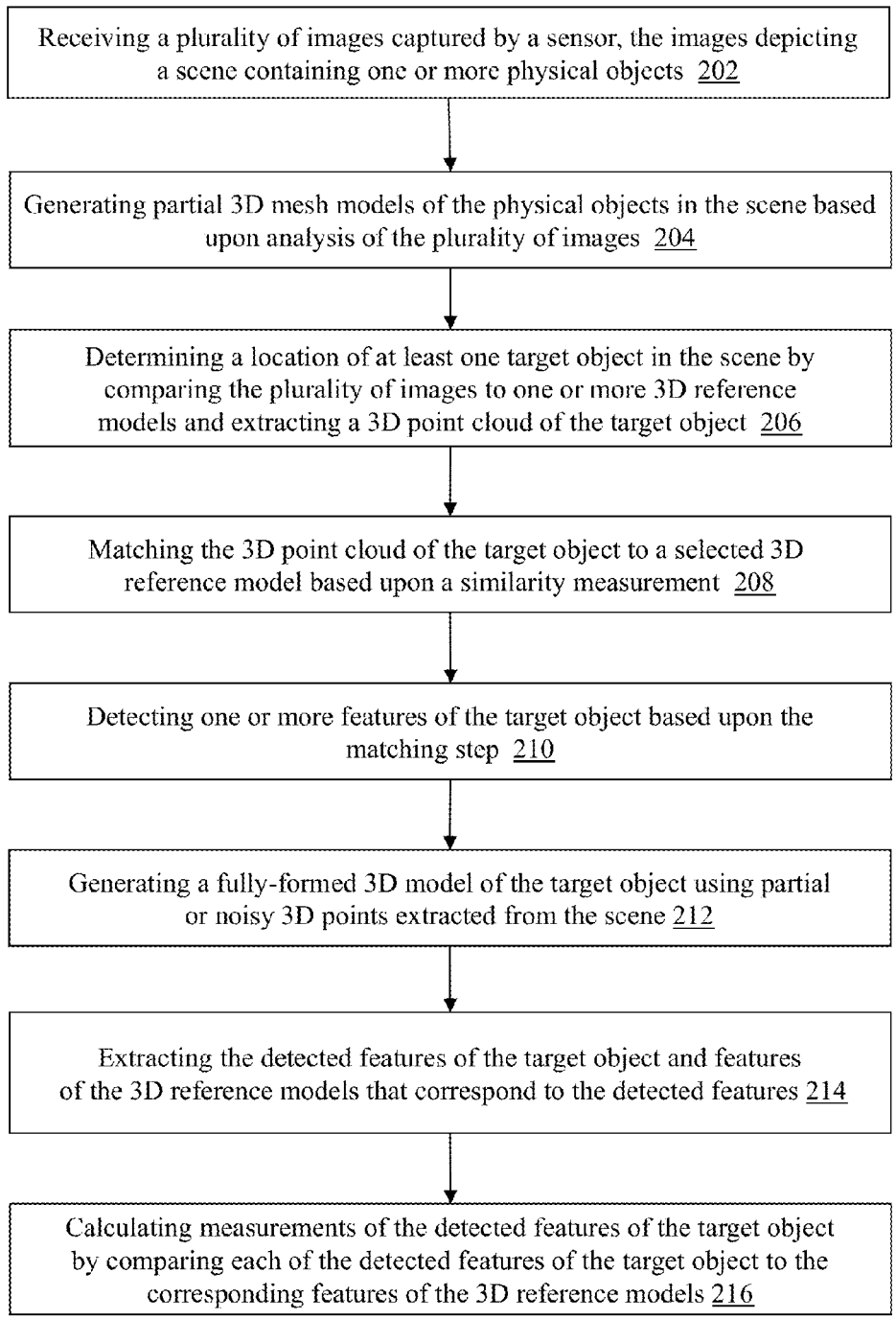
FIG. 2 is a flow diagram of a method for generating a 3D model of an object represented in a scene.

FIG. 2 is a flow diagram of a method 200 for generating a three-dimensional (3D) model of an object represented in a scene, using the system 100 of FIG. 1. The image processing module 106 of the computing device 104 receives (202) a plurality of images captured by the sensor 103, where the images depict a scene 101 containing one or more physical objects (e.g., objects 102a-102b). The image processing module 106 generates (204) partial 3D mesh models of the physical objects 102a-102b in the scene 101 based upon analysis of the plurality of images.

The image processing module 106 determines (206) a location of at least one target object (e.g., object 102a) in the scene 101 by comparing the plurality of images to one or more 3D reference models and extracting a 3D point cloud of the target object 102a. The image processing module 106 matches (208) the 3D point cloud of the target object 102a to a selected 3D reference model based upon a similarity measurement. The image processing module 106 detects (210) one or more features of the target object 102a based upon the matching step.

The image processing module 106 generates (212) a fully-formed 3D model of the target object using partial or noisy 3D points from the scene. The image processing module 106 extracts (214) the detected features of the target object 102a and features of the 3D reference models that correspond to the detected features using the 3D reference model. The image processing module 106 calculates (216) measurements of the detected features of the target object 102a using the 3D reference model by comparing each of the detected features of the target object 102a to the corresponding features of the 3D reference models. Greater detail on each of the above-referenced steps is provided below.

Figure 3:
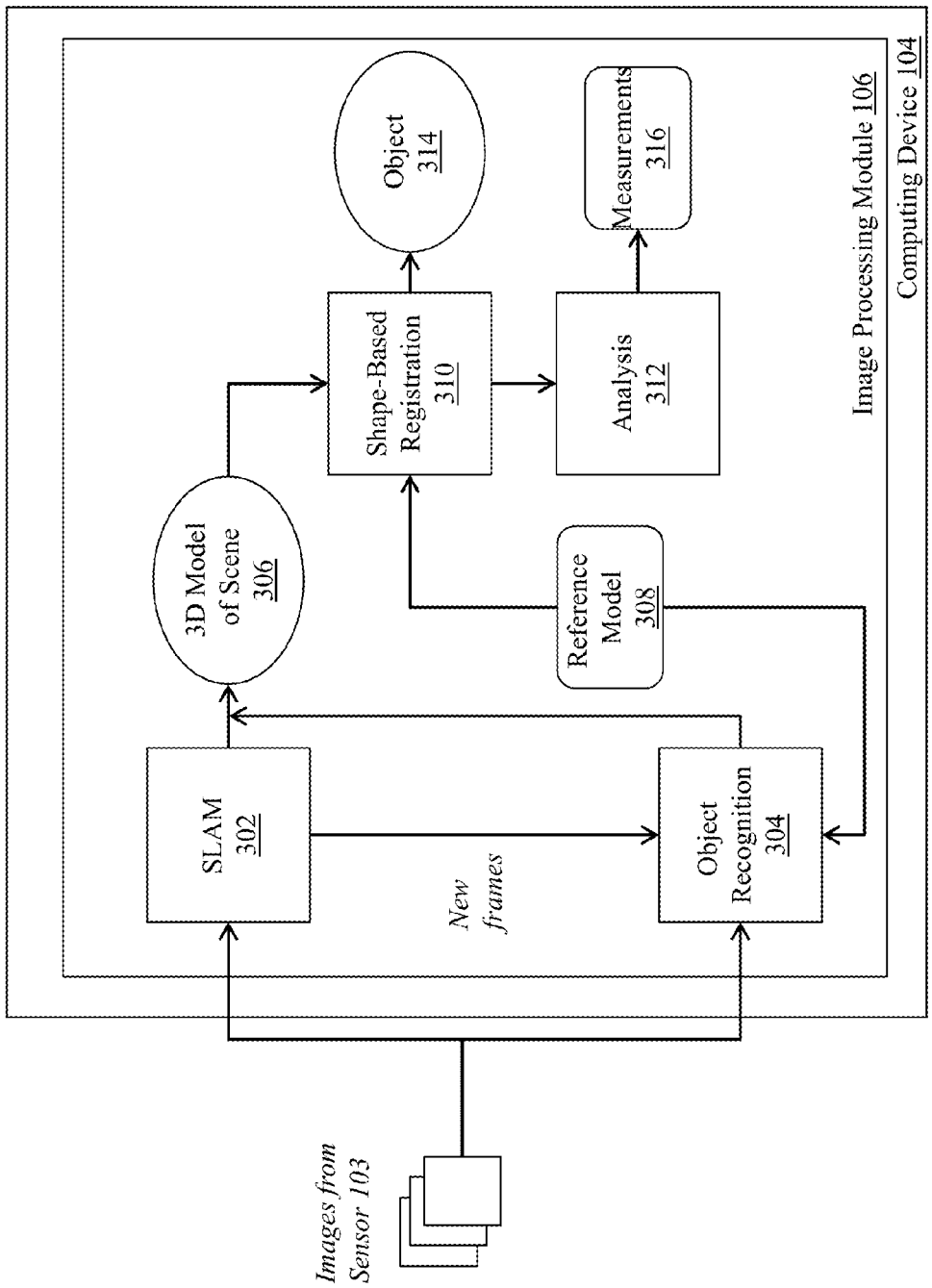
FIG. 3 is a diagram of a workflow method for generating a 3D model of an object represented in a scene.

FIG. 3 is a diagram of a workflow method 300 for generating a three-dimensional (3D) model of an object represented in a scene, according to the method 200 of FIG. 2 and using the system 100 of FIG. 1. The workflow method 300 includes four functions to be performed by the image processing module 106 for processing images received from the sensor 103: a Simultaneous Localization and Mapping (SLAM) function 302, an object recognition function 304, a shape-based registration function 310, and an analysis function 312.

Generally, the methods and systems described herein utilize a 3D sensor (such as a 3D scanner) that provides individual images or scans of the scene 101 at multiple frames per second. The SLAM function 302 constructs the scene in 3D by stitching together multiple scans in real time. The Object Recognition function 304 is also performed in real time by examining the captured image of the scene and looking for an object in the scene based on a 3D reference model. Once the system 100 has recognized the object's location and exact pose (i.e. orientation), points associated with the object are then extracted from the scene. Then, the shape-based registration function 310 converts the extracted points into a fully-formed 3D model and the analysis function 312 obtains and provides corresponding measurements of the object and/or features of the object. In some embodiments, the shape-based registration function 310 and analysis function 312 are performed during a post-processing (i.e., non real-time) phase but these functions 310, 312 can also be performed in real-time, e.g., for platforms with more processing power.

It should also be appreciated that while the functions 302, 304, 310, 312 are designed to be performed together, e.g., in a workflow as shown in FIG. 3, certain functions can be performed independently of the others. As an example, the object recognition function 304 can be performed as a standalone function. Further, there are several parameters such as scene size, scan resolution, and others that allow an application developer to customize the image processing module 106 to maximize performance and reduce overall system cost. Some functions—such as shape-based registration (e.g., 3D reconstruction) function 310—can only work in conjunction with the object recognition function 304 because the shape-based registration function 310 uses information relating to points in the scene 101 that are a part of the object (e.g., object 102*a*) the system 100 is reconstructing. A more detailed description of each function 302, 304, 310, and 312 is provided in the following sections.

3D Scene Capture (Simultaneous Localization and Mapping)

The Simultaneous Localization and Mapping (SLAM) function 302 can be used for 3D construction of a scene (e.g, scene 101) or object (e.g., objects 102*a*-102*b*), augmented reality, robot controls, and many other applications. It should be noted that while the SLAM function 302 generates a 3D model, the model is typically a point-cloud format and not a fully formed, closed 3D mesh model due to certain processing limitations as well as the existence of holes or the lack of enough scans to form a full 360-degree model.

The 3D sensor 103 provides one or more 3D scans of an image to the computing device 104 configured with the image processing module 106. The image processing module 106 stitches the plurality of 3D scans into a 3D model of the scene using the SLAM function 302. In some embodiments, the image processing module 106 includes the location of the sensor 103 relative to the object and/or scene (e.g., for augmented reality (AR) or robotics applications). As will be described below, the SLAM function 302 described herein includes advantages that allow it to run efficiently on mobile and embedded platforms, such as:

Low-end processors—Processing 3D images is typically computationally intensive. Currently-available tablets and smartphones generally include low-end processors (e.g., available from companies such as ARM Ltd. of Cambridge, UK) that do not provide robust performance. For example, the following commonly-used 3D processing algorithms and tools are too computationally intensive and/or power hungry for such mobile device processors:
  i. most open-source computer vision libraries, such as PCL and OpenCV;
  ii. complex algorithms like 3D mesh model reconstruction; and
  iii. complex data structures.

Therefore, the SLAM function 302 described herein is an efficient and reliable function that can work in conjunction with mobile and embedded processors having limited processing and memory resources and using a low-cost noisy 3D scanner.

In some embodiments, the input parameters for the SLAM function 302 can be set to configure the 3D scan(s) as received from the sensor 103. Exemplary input parameters and settings include:

Scene Size

Small—used to capture a small area (e.g., 1 meter×1 meter×1 meter); typically for capturing a small object within a small scene.

Medium—used to capture a medium area (e.g., less than 3 meters long) in any direction; typically for capturing a large object or a small scene.

Large—used to capture a large area (e.g., 10 meters long) in any direction; typically for capturing a large scene such as the inside of a room.

Camera Location

For example, when the SLAM function 302 is first activated (e.g., with a START command), the location of the sensor 103 is set as the origin (0,0,0) in the 3D space. As the sensor moves around in 3D space, the SLAM function 302 provides (i.e., in real-time via a function call) new coordinates of the sensor as well as the translational matrix that shows the relative position of the sensor with respect to the origin in the original 3D Cartesian coordinate system. This allows the software application executing the SLAM function 302 to know the current position of the sensor and allows control of devices and display rendering based on this information.

current_model.obj

The current_model.obj represents the 3D model of what is currently being viewed by the 3D sensor 103. In some embodiments, the current_model.obj is updated in real-time and can be called as an asset by the executing software application (e.g., via the Unity engine). Each new version of the current_model.obj is used to update the global_model.obj. Therefore, the current_model.obj is a subset of the entire global model being built via the SLAM function 302. In some embodiments, the mesh quality of the current_model.obj is low because the current_model.obj process is optimized for speed.

global_model.obj

The global_model.obj represents the final 3D model constructed using the SLAM function 302 and the global_model.obj is generated after the image processing module 106 completes the processing of the 3D scan(s) using the SLAM function 203 and the object recognition function 304. The mesh quality of the 3D model generated by the global_model.obj is high and is only limited by the resolution of the sensor 103 being used.

In some embodiments, certain commands are provided by the image processing module 106 to process the 3D scans using the SLAM function 302 and the object recognition function 304.

Commands

START—starts the SLAM function 302, which both constructs the global model and tracks the sensor location with respect to the 3D model. The START function also sets the origin of the sensor at (0,0,0) and establishes the global Cartesian coordinate system.

GET SENSOR LOCATION—returns the current sensor position relative to the global model. The GET SENSOR LOCATION function also outputs the current position as well as the translation matrix that is used to find the sensor's exact location and orientation.

GET current_model.obj—provides the partial 3D model currently relevant to the sensor location and perspective, i.e., the 3D model of what is currently being viewed by the 3D sensor.

STOP—stops the SLAM function 302.

GET global_model.obj—available only after the START command is invoked and then the STOP command is executed. The GET global_model.obj function returns the global model which has been constructed using the SLAM function 302.

Figure 4:
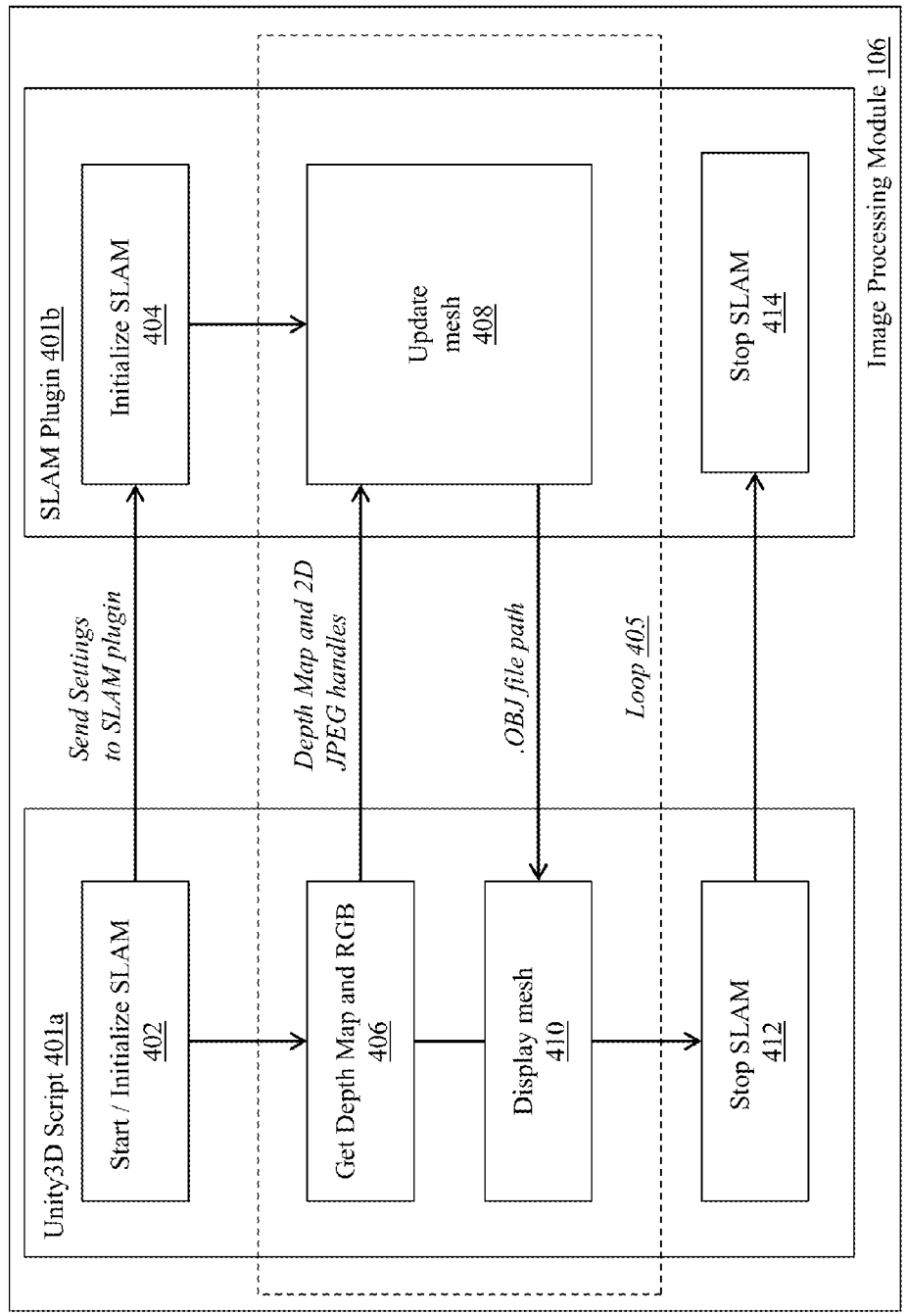
FIG. 4 is a flow diagram of a method of the SLAM function performed by the image processing module.

FIG. 4 is a flow diagram of a method 400 of the SLAM function 302 performed by the image processing module 106 of FIG. 1. The flow diagram shows the interaction between, e.g., a Unity3D script from the Unity 3D Development Engine and the image processing module 106 (e.g., the Starry Night plugin available from VanGogh Imaging, Inc.). While this example uses the Unity engine, the functionality of the image processing module 106 can be accessed via other development engine plugins, such as .SO for Linux™, .DLL for Windows™, or other such modules that can be integrated into any application.

As shown in FIG. 4, the Unity3D script 401a invokes the START command (402) for the SLAM plugin 401b and initializes the settings for the SLAM plugin 401b. The script then sends the settings, including any input parameters, to the SLAM plugin 401b.

The SLAM plugin 401b initializes the SLAM function (404) (using the input parameters) and enters a loop 405 where the Unity3D script 401a and the SLAM plugin 401b interact. The SLAM plugin 401b continually updates (408) the mesh of the 3D model by analyzing the 3D scan(s) coming from the 3D sensor (e.g., using the get current_model.obj function) and transmits the OBJ file path to the Unity3D script 401a. The Unity3D script 401a determines (406) the depth map and RGB—via the depth map and 2D JPEG handles provided by the SLAM plugin 401b—and displays (410) the mesh.

The image processing module 106 continues the loop 405, where the mesh is updated and displayed, until the STOP function is called (412 and 414). The Unity3D script 401a and the SLAM plugin 401b finish their execution, which breaks the loop 405 and the GET global_model.obj function is called to return the generated 3D model.

The overall goal of the SLAM function 302 is to break down the physical world into a series of overlapping boxes. Each box is then processed independently of other boxes. This technique allows a large space to be constructed, even with limited memory and processing power. The technique also lends itself to a parallelization of the processing by being able to processing multiple boxes at the same time. The concept of overlapping boxes is important because it allows smooth continuation of the scan versus the model. For example, if the scan is always smaller than a single model box, the overlapping boxes concept allows the scan to fit completely in a model box even when the scan moves within the model box. Once the scan moves far enough away from the center, the adjoining model box can be used which then contains the scan more or less around the center of its box for robust 3D reconstruction.

Generally, when a scan is captured (e.g., by a 3D sensor 103), the scan is then cleaned up in order to reduce any noise or artifacts caused by the scanner 103—especially a reduction to 'floating points' and 'edge' points. The clean-up step is especially important when using a low cost 3D sensor. To eliminate such floating points or edge points, the combination of a Sobel operator and an erosion method is applied to the original received scan. Because Sobel edge detection and the erosion method are both used to process 2D images, the computing device 104 processor(s) and software map a 3D scan from 3D space to 2D space. Then, the processor(s) and software determine the edges and floating points. The scans are then registered to the global model using, e.g., the iterative closest point (ICP) algorithm. After the registration, a mesh is created by updating surface information of the model. It should be appreciated that the ICP algorithm can be either distance- or normal-based (or both) depending on the nature of the scene. Both the input scan and the global models are divided into voxels which reduce the processing requirement and allows parallel processing of the dataset. For example, the computing device 104 executes 3D image processing, extraction, and reconstruction software that subdivides the physical space (e.g., 1.5 m×1.5 m×1.5 m) into a voxel (or volumetric pixel) grid with a certain number of voxels per axis (e.g., 300 voxels per axis).

Figure 5:
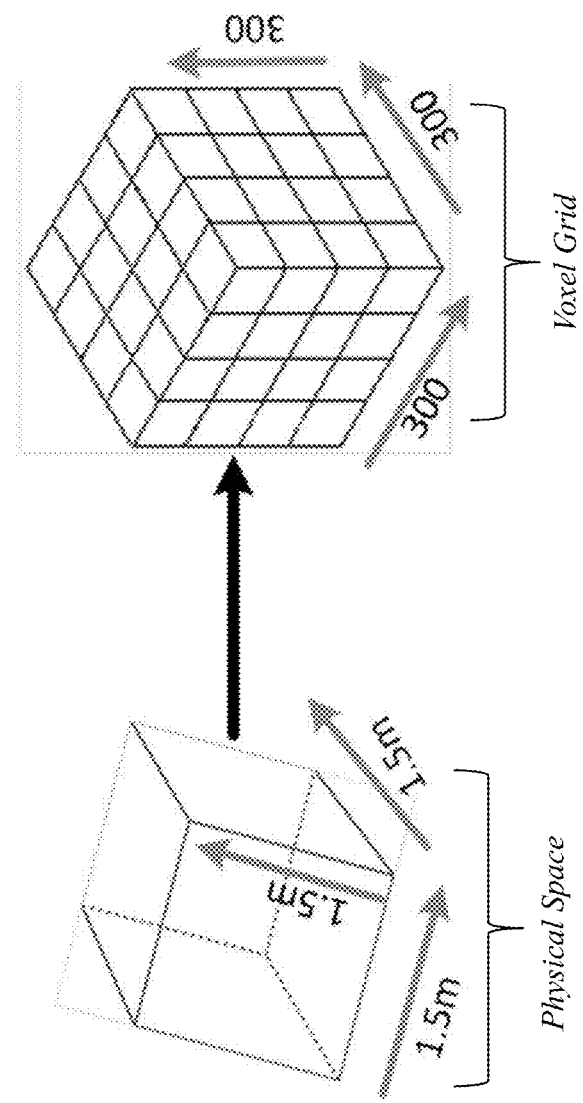
FIG. 5 depicts the relationship between physical space and the voxel grid.

FIG. 5 depicts the relationship between physical space and the voxel grid. The voxel grid is used to save the 3D global model. Specifically, each voxel contains only points which constitute the 3D global model. The resolution of the 3D model is proportional to the number of voxels. But, it should be appreciated that a greater number of voxels may result in a higher computational cost unless a greater number of processing units are available.

Figure 6:
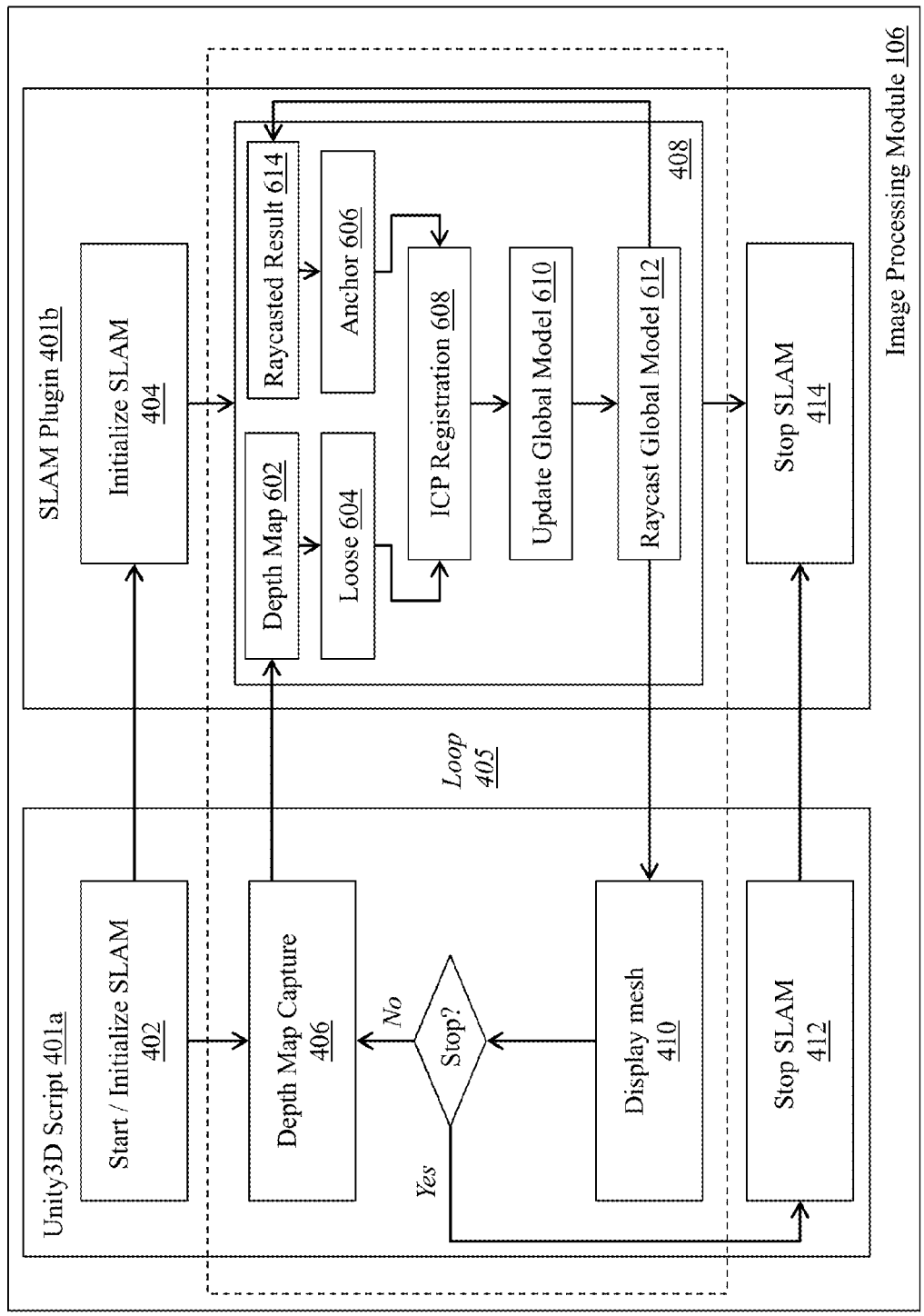
FIG. 6 is a detailed flow diagram of the method of the SLAM function performed by the image processing module.

FIG. 6 is a detailed flow diagram of the method of the SLAM function performed by the image processing module, as shown above in FIG. 4. In FIG. 6, the steps involved in the update mesh 408 processing step are shown in detail. The SLAM plugin 401b receives the depth map from the Unity3D script 401a and preprocesses the depth map in order to generate loose data to be used in a subsequent ICP registration processing step (e.g., step 608).

Figure 7:
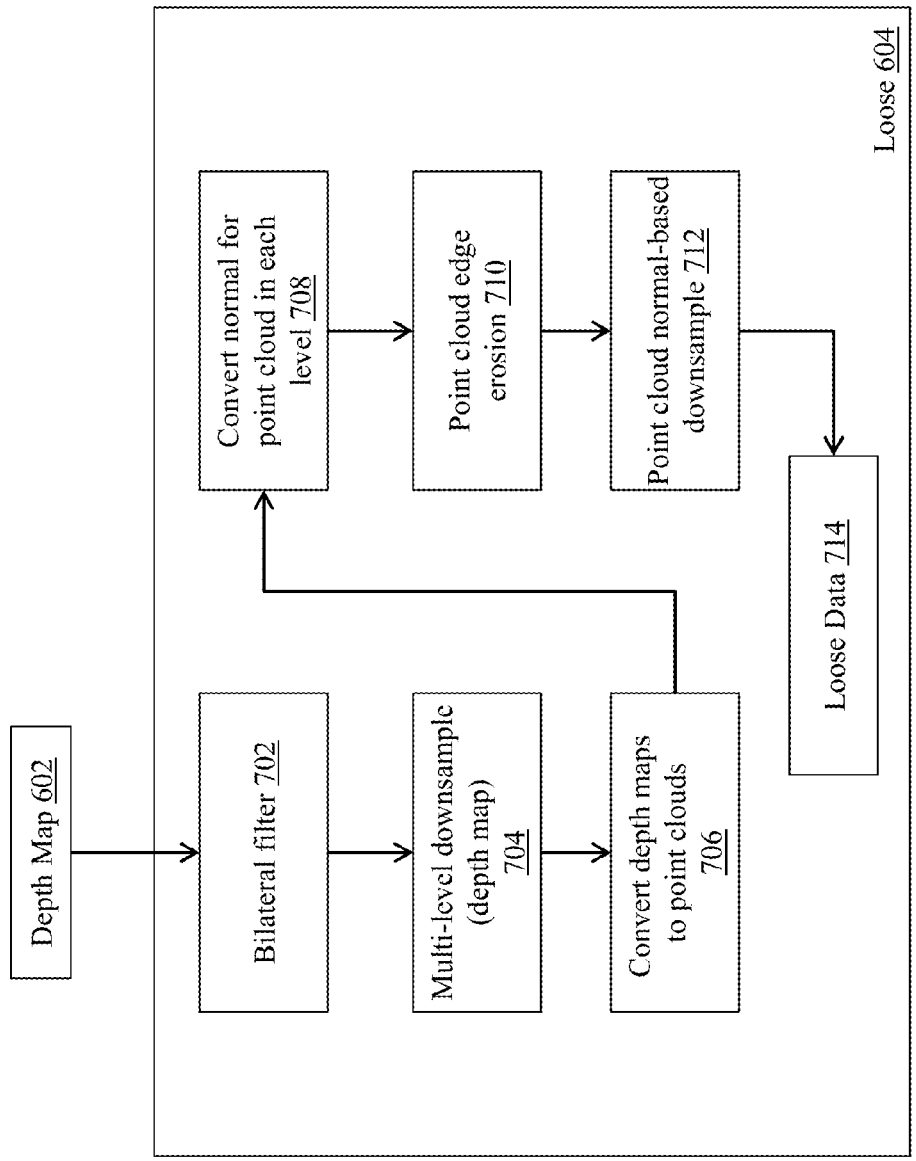
FIG. 7 is a flow diagram of a method for preprocessing the depth map to generate loose data.

FIG. 7 is a flow diagram of a method for preprocessing the depth map to generate loose data. As shown in FIG. 7, the loose step 604 receives as input the depth map 602. A bilateral filter and a multi-level downsample are applied (702 and 704, respectively) to the depth map. The depth map is converted (706) to a 3D point cloud. The normal for the point cloud is converted (708) in each level. An edge erosion process is applied (710) to the point cloud. A normal-based downsample process is applied (712) to the point cloud. The loose data is then generated (714) for use by the ICP registration process 608. It should be appreciated that the bilateral filter, edge erosion process and normal-based downsample processed are optional when generating the loose data.

Figure 8:
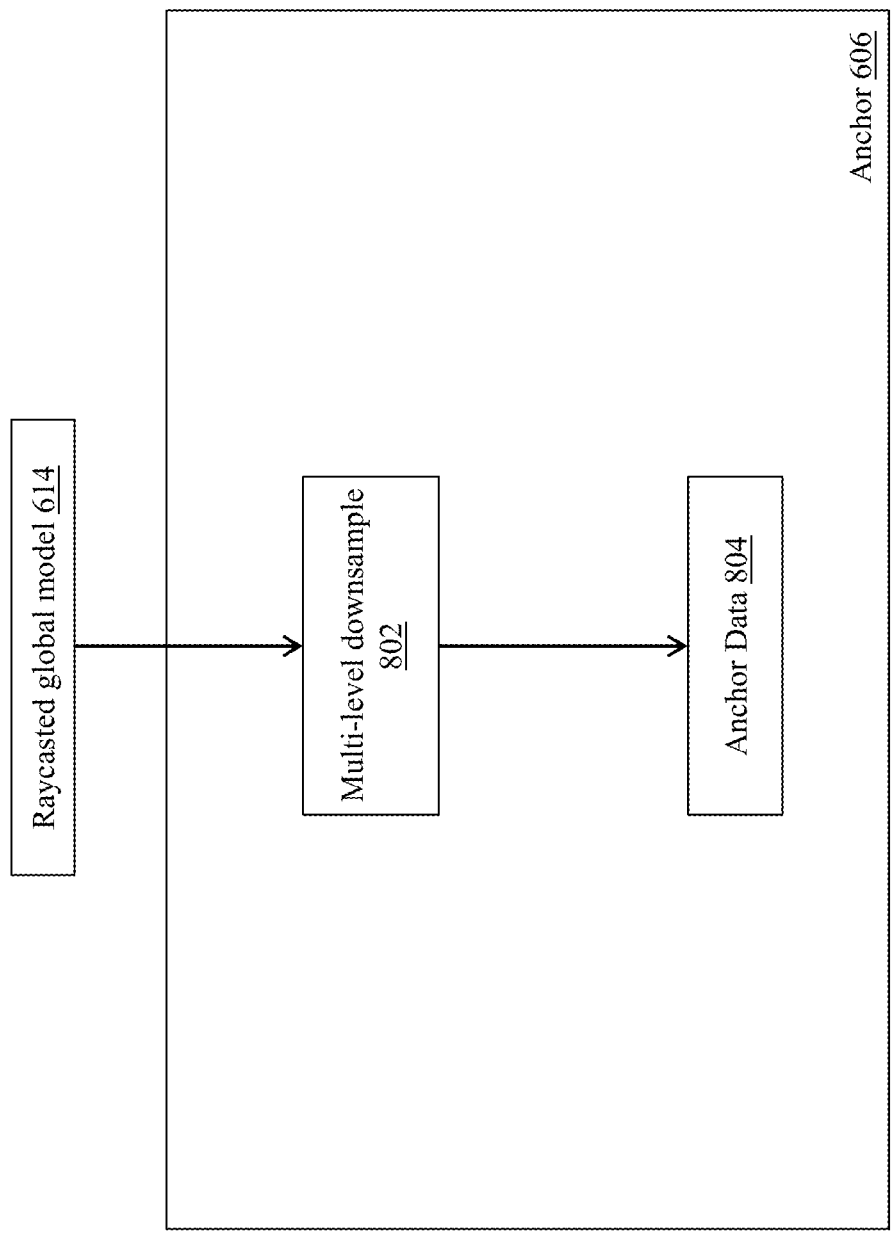
FIG. 8 is a flow diagram of a method for processing the raycasted global model to generate anchor data.

Turning back to FIG. 6, the SLAM plugin 401b processes the raycasted result in order to generate anchor data to be used in a subsequent ICP registration processing step (e.g., step 608). FIG. 8 is a flow diagram of a method for processing the raycasted global model to generate anchor data. As shown in FIG. 8, the anchor step 606 receives as input the raycasted global model 614 (e.g., from the raycast global model step 612). A multi-level downsample process is applied (802) to the raycasted global model. The anchor data is then generated (804) for use by the ICP registration process 608. It should be appreciated that the anchor step 606 is first applied to the second scan received from the sensor 103, because the step 606 relies on the raycasted global model.

The quality of "Loose" and "Anchor" is important to get better accuracy of SLAM. Pre-process of both "Loose" and "Anchor" are necessary to eliminate the noise. "Loose" is the captured scan from the camera. Pre-processing of "Loose" include, bilateral filter, edge erosion, normal based downsampling, multi-level downsampling of "Loose" for multi-level ICP. "Anchor" is generated from raycasting of global model based on current camera position and direction. This leads to a closed-loop procedure which is more robust and overcomes drifting problem of the SLAM. Pre-processing of "Anchor" includes multi-level downsampling for multi-level ICP.

Turning back to FIG. 6, once the loose step 604 and the anchor step 606 are completed for a scan, the loose data and anchor data are used as input for an ICP registration step 608. Generally, the ICP registration step 608 matches the loose data to the anchor data by matching multiple levels of loose data to anchor data, and each level of the loose data to anchor data is the down-sampled from original data by a different ratio. The multi-level ICP algorithm matches the loose data to the anchor data from coarse to fine in order to decrease the registration error. In addition, the ICP registration step 608 matches points and related normals which results in faster and more accurate convergence.

Figure 9:
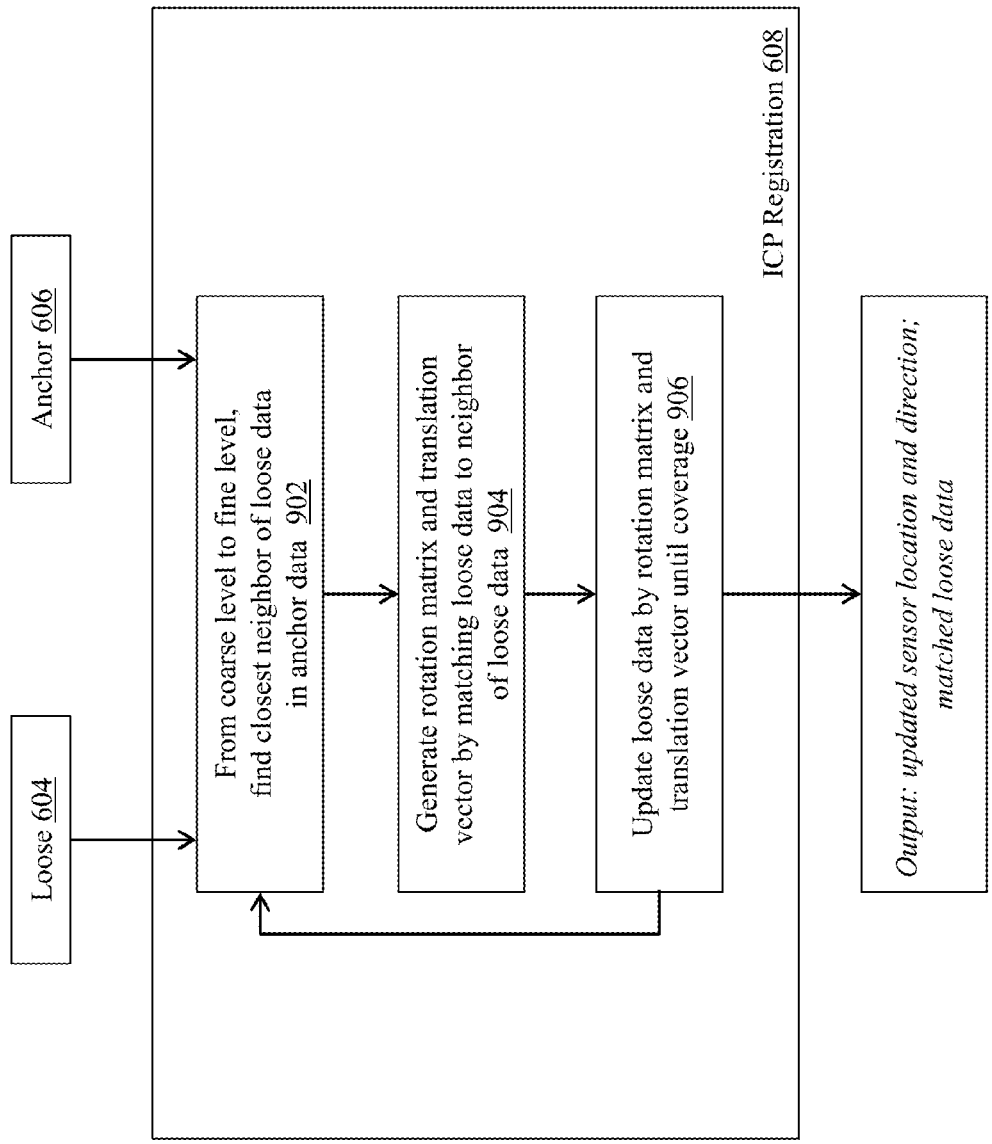
FIG. 9 is a flow diagram of a method for processing the loose data and anchor data using an ICP registration algorithm.

FIG. 9 is a flow diagram of a method for processing the loose data and anchor data using an ICP registration algorithm. As shown in FIG. 9, data from the loose step 604 and the anchor step 606 is used as input for the ICP registration step 608. First, from the coarse level to the fine level, the registration algorithm finds (902) the closest neighbor of a point in the loose data in the anchor data. The algorithm generates (904) a rotation matrix and translation vector by matching the loose data point to a neighbor in the loose data. The algorithm updates (906) the loose data using the rotation matrix and the translation vector until achieving coverage. The ICP registration algorithm repeats these steps for all of the points in the loose data. The output is an updated sensor location and direction, and a matched (or registered) loose data point cloud. The output is provided to the update global model step 610, as described below.

Figure 10:
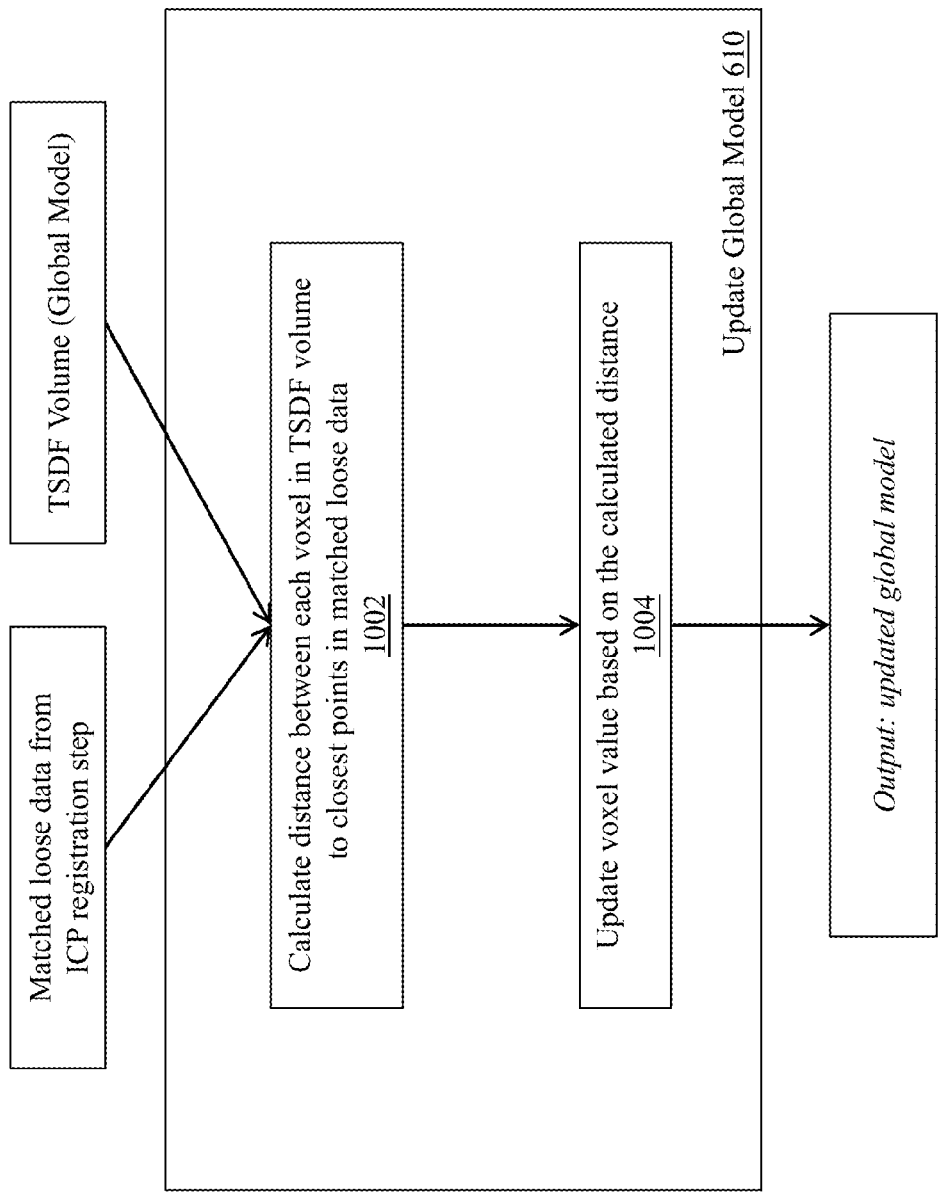
FIG. 10 is a flow diagram of a method for updating the global model using the output of the ICP registration step.

The 3D space in the real world is defined by a 3D volume consisting of voxels. Each voxel includes the distance from the center of the voxel to the surface. The update global model step 610 calculates the weighted distance value of each voxel. FIG. 10 is a flow diagram of a method for updating the global model using the output of the ICP registration step. As shown in FIG. 10, the matched loose data from the ICP registration step and the volume of truncated signed distance function value are used as input to the update global model step 610. The distance between each voxel in the TSDF volume and the closest point(s) in the matched loosed data is calculated (1002). The voxel value is updated (1004) based upon the calculated distance. The output is the updated global model.

Returning to FIG. 6, the raycast global model step 612 is performed on the updated global model from the update global model step 610. Raycasting the global model provides the global model view in vertices and normals based on the current sensor location, and sensor orientation. Raycasting simulates the ray travelling from the sensor to the global model and checks if the ray crosses the surface of the global model, then estimates the vertex and normal on the crossing surface. The vertices and normal generated by the raycasting step are also used to generate the input anchor data for ICP registration (as described above).

Figure 11:
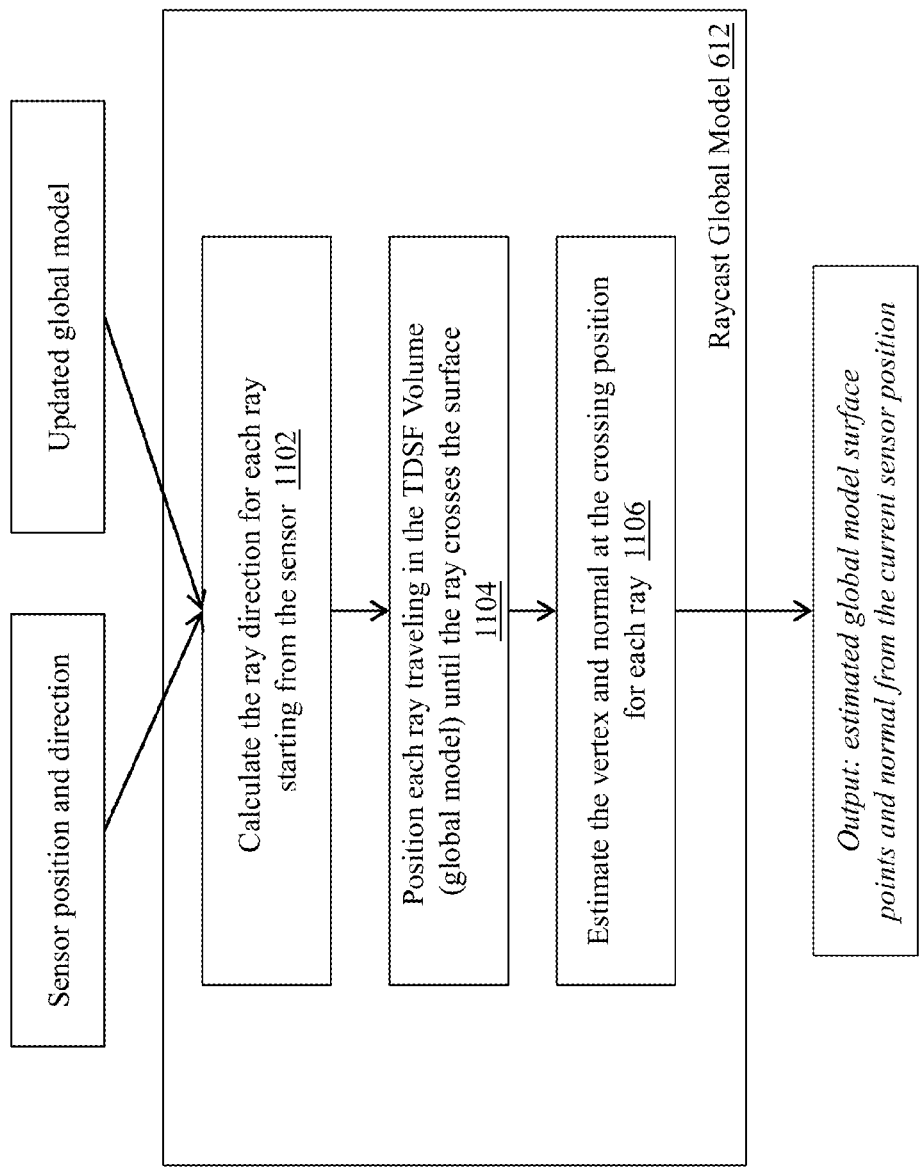
FIG. 11 is a flow diagram of a method for raycasting the global model.

FIG. 11 is a flow diagram of a method for raycasting the global model. As shown in FIG. 11, the sensor position and direction, and the updated global model (TSDF Volume) is used as input to the raycast global model step 612. The ray direction for each ray starting from the sensor is calculated (1102). Each ray is positioned (1104) traveling in the TDSF Volume (global model) until the ray crosses the surface. The vertex and normal at the crossing position is estimated (1106) for each ray. The output is the estimated global model surface points and normal from the current sensor position.

Figure 12:
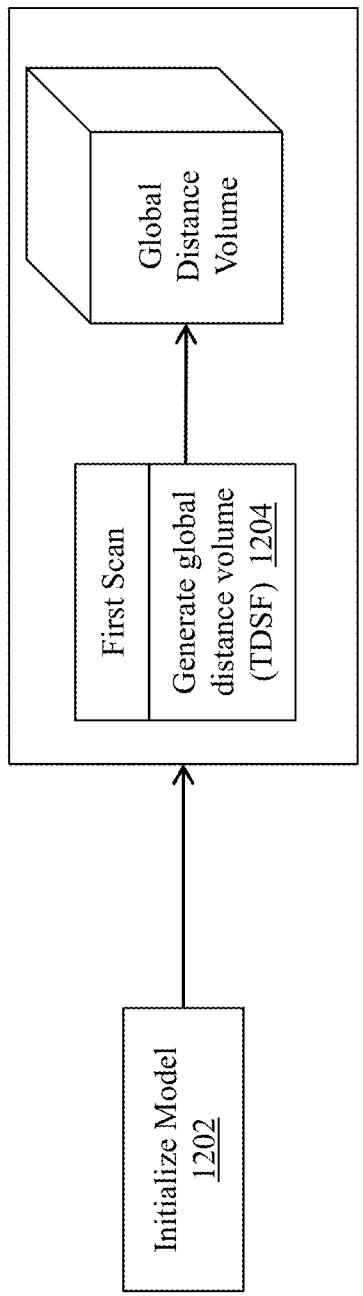
FIG. 12 is a flow diagram of a method to directly fill the scan into the TDSF Volume (global model).

If the incoming scan is the first scan, the image processing module 106 directly fills the scan into the TDSF Volume (global model), as shown in FIG. 12. When the image processing module 106 calls (1202) the initialize model routine, the module 106 generates (1204) the global distance volume (TDSF) using the first scan.

Figure 13:
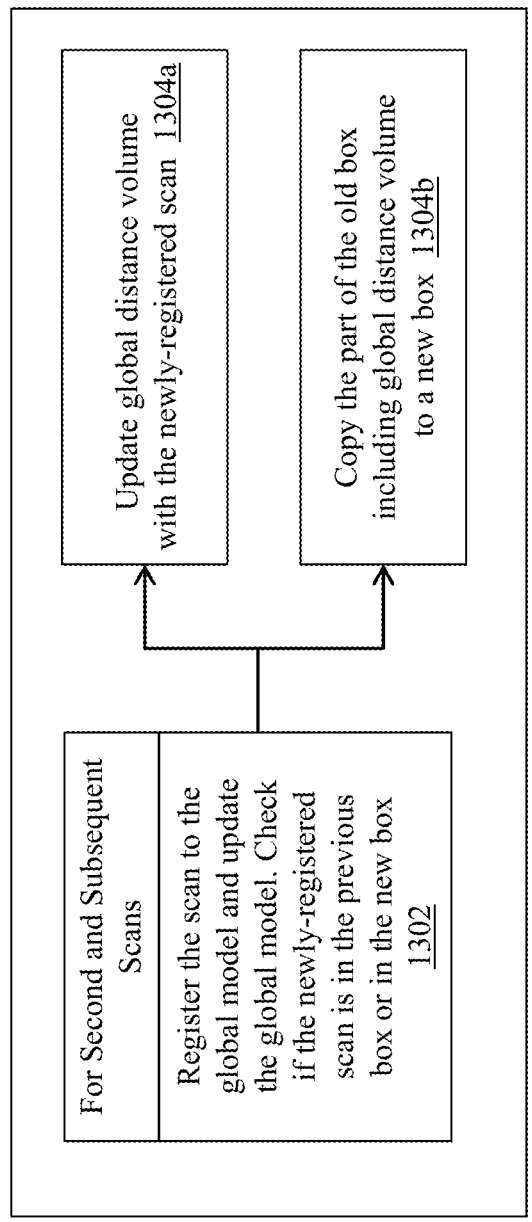
FIG. 13 is a flow diagram of a method for processing subsequent scans to update the TDSF Volume.
Figure 14:
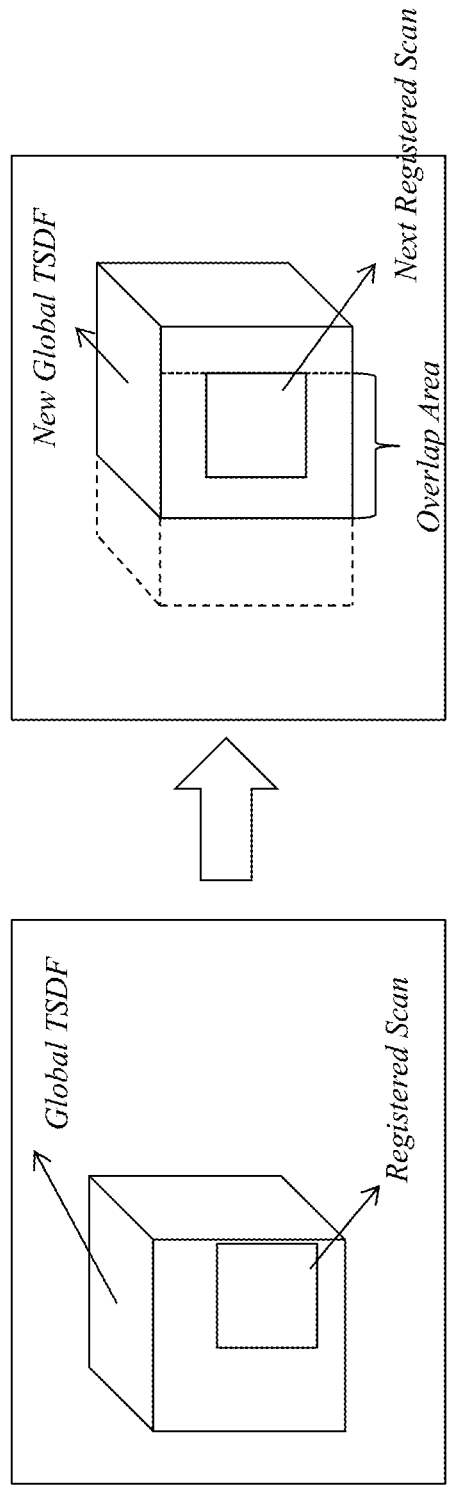
FIG. 14 is a flow diagram of a method for checking to see if the scan crosses the boundaries of the previous box.

Further, as shown in FIGS. 13 and 14, when new scans after the first scan (e.g., the second and subsequent scans) are captured by the sensor 103 and received by the image processing module 106, the module 106 downsamples the scan using the normal-based downsample method (explained in more detail below). The module 106 then uses the raycasted result from the previous frame as the anchor data for the ICP registration algorithm. The ICP algorithm is then run to register (1302) the newly-processed scan's loose data to the anchor data. The registered scan is checked (1302) to see if the newly-registered scan crosses the boundaries of the previous box and is in a new box. If the newly-registered scan does not cross the boundaries, the module 106 updates (1304*a*) the global distance volume using the newly-registered scan. If the newly-registered scan does cross the boundaries, the module 106 creates a new box, and copies (1304*b*) the part of the old box that includes the global distance volume to a new box. The module 106 also fills the overlap area with the size of 1.5 times of the newly-registered scan into the new box. Note that, in some cases, the overlap could be much smaller or bigger than 1.5 depending on the nature of the scene.

Returning to FIG. 6, when all scans have been processed by the SLAM plugin 401*b*, the module 106 applies, e.g., a Taubin smoothing algorithm to the global model to smooth the mesh as generated by Marching Cube (explained in more detailed in a later section) and then generates an .OBJ file.

Normal-Based Downsampling

Figure 15:
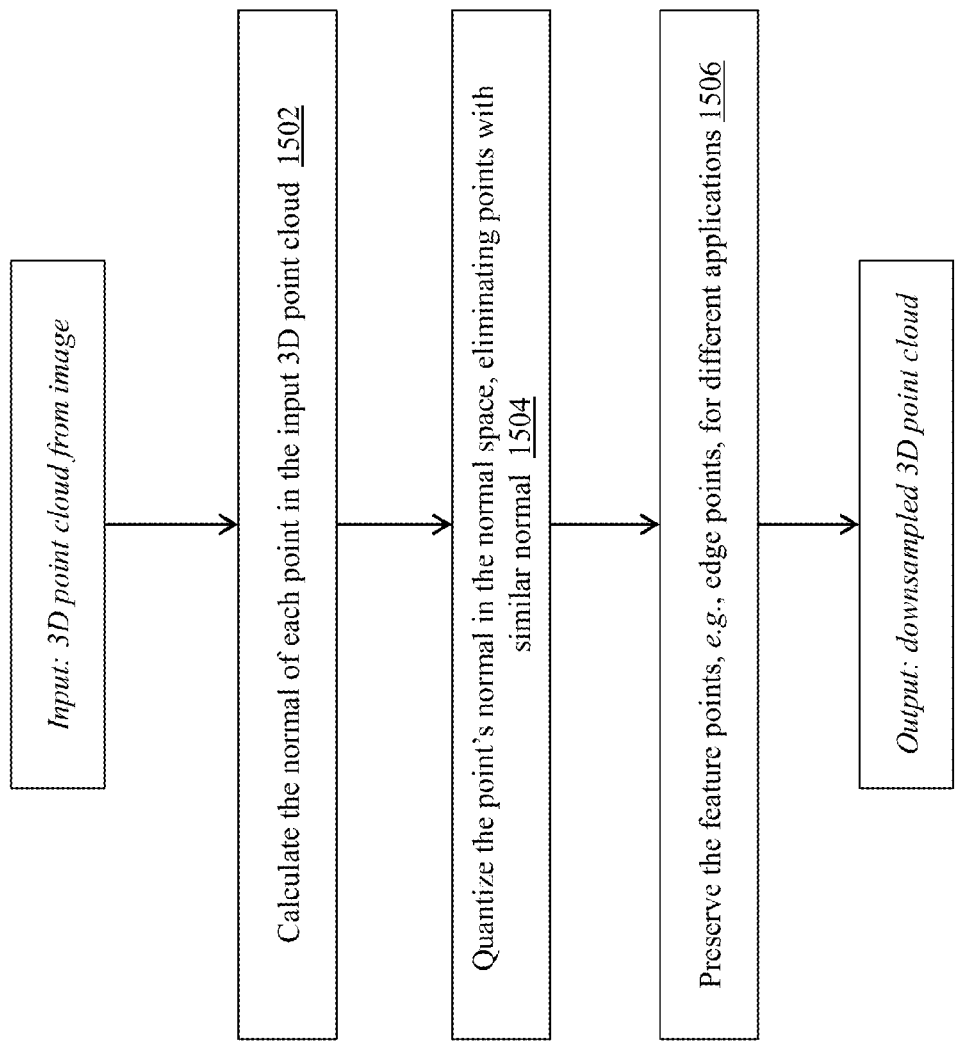
FIG. 15 is a flow diagram of a method for normal-based downsampling.

As mentioned above, the image processing module 106 can apply a normal-based downsampling process to an incoming image. FIG. 15 is a flow diagram of a method for normal-based downsampling.

As shown in FIG. 15, a 3D point cloud from an image is the input. Generally, there is no restriction for the input. In some embodiments, some of the input 3D point cloud is pre-organized so that it is faster to find the points' neighbor(s) for normal calculation.

First, the normal of each point in the point cloud is calculated (1502). The image processing module 106 finds the neighbor of each of the points. If the point cloud is not organized, the neighbor can be searched by 3D distance comparison, or the module 106 can take advantage of a data structure, such as a K-D tree, to speed up the neighbor searching procedure. If the point cloud is pre-organized, such as a point cloud from a depth map, the neighbor can take advantage of pre-organized information, e.g., searching the neighbor from the depth map.

Each points' normal is calculated using their neighbor(s). The normal can be calculated by 1) the average of cross-product between point and its neighbor; or 2) the smallest eigen vector of the covariance matrix of the point and its neighbor.

Next, the point's normal is quantized (1504) in the normal space, and the points with a similar normal are eliminated. In the normal space, the module 106 samples the normal of the entire 3D point cloud so that there are only a certain number of 3D points with similar normal in each 3D voxel in the normal space.

Then, the feature points are preserved (1506) for different application(s). In some embodiments, for different application(s), beyond the points that have been eliminated, some of the points need to be preserved, such as 1) the edge point, some of edge points on the surface cannot be preserved, check the number of their neighbor points to keep the edge points; 2) keep number of overall points, if all the points are with the similar normal, normal-based downsampling will get rid of the most of points, random sampling the removed points and add back to the downsampled points to keep a certain percentage of number of points.

Marching Cube

Figure 16:
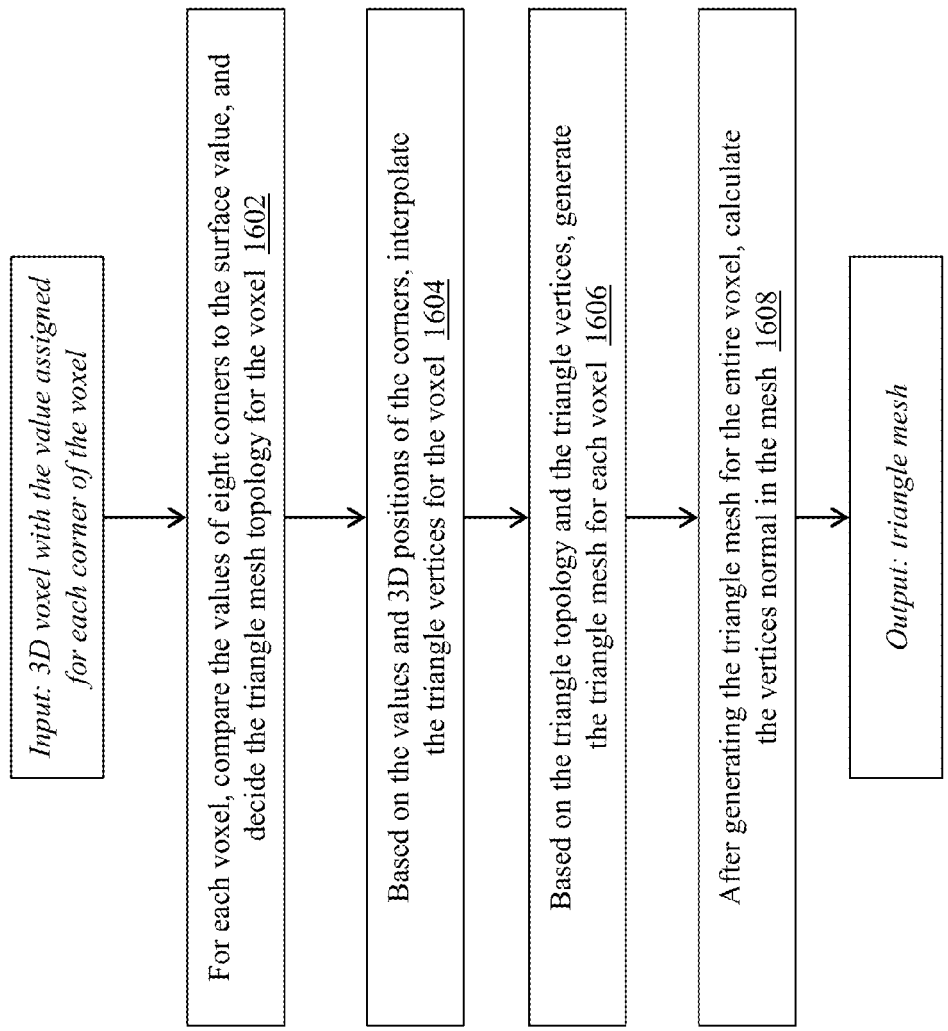
FIG. 16 is a flow diagram of a method for mesh generation using a marching cube technique.

As mentioned above, the image processing module 106 can utilize a marching cube technique to generate a mesh of the global model. FIG. 16 is a flow diagram of a method for mesh generation using a marching cube technique.

As shown in FIG. 16, 3D voxels with values assigned for each corner of the voxel is used as input. The value for each corner defines the distance from the corner to the surface of the object which the 3D voxels represent. For instance, a positive/negative value means the corner is outside/inside of the 3D object.

First, for each voxel, the image processing module 106 compares (1602) the values of eight corners of the voxel to the surface value, and decides the triangle mesh topology for the voxel. For each corner of the voxel, the corner is either outside or inside the 3D object (e.g., assume right on the surface is an outside condition). It is known that there are 256 conditions of voxel corners, and triangle mesh topology for each voxel can be determined by the 256 conditions. The 256 different topologies can be saved as the lookup table for speeding up the matching cube algorithm.

Next, based on the values and 3D positions of the corners, interpolate (1604) the triangle vertices for the voxel. In each voxel, neighborhood corners are connected via the edges. The marching cube algorithm assumes if the triangle mesh crosses the edges, the vertices of the triangle will be on the edges. Meanwhile, since the vertices are on the surface, the 3D coordinate of each vertex can be interpolated (e.g., linear interpolation) by the two corners of the edge which contain the vertex.

Next, based on the triangle topology and triangle vertices, generate (1606) the triangle mesh for each voxel. Based on the topology (i.e., how to organize vertices to build the mesh) from step 1604 and the 3D coordinates of the vertices, the marching cube algorithm is able to build the mesh for each voxel.

Then, after generating the triangle mesh for the entire set of voxels, calculate (1608) the vertices normal in the mesh. The vertex normal can be calculated by the average of the triangle's normal which contains the vertex. The triangle's normal can be calculated by the cross-product of the two triangle edges. As shown in FIG. 16, the output is the triangle mesh for the 3D global model.

For each additional scan that gets combined (or welded) into the 3D global model, "high-quality" scan points (for example, the points that are closest and normal to the sensor) can be identified and only such high-quality points can be merged into the global model. High-quality scan points are identified by using the distance from the camera as well as point density around the position of the scan point.

Given the number of the voxels per axis, each discrete point in the registered scan can be converted into a voxel in the 3D global model. Assigning a weight to each voxel can significantly denoise the metric. In the current 3D global model, if the point in the voxel is matched to the one in the current scan, the voxel is updated. Each voxel can be updated incrementally as more points are added using a simple weighted running average:

$$C_k = \frac{W_{k-1} C_{k-1} + C_p}{W_{k-1} + 1}$$

$$W_k = W_{k-1} + 1$$

$C_k$ denotes the coordinate of the point in the voxel. $C_p$ denotes the new point which will be filled into the voxel. $W_k$ is the weight assigned to the voxel.

On the other hand, if the point in the current 3D global model is not matched to any point in the current scan, the voxel containing the point (also called an outlier) is removed. The weight associated with the voxel is cleared as well.

To delete the outliers, the number of effective neighbors for each individual voxel is detected. For simplicity, only six neighbors around the current voxel in 3D space are considered. If the number of effective neighbors is below four, the current voxel is considered as an outlier.

3D Object Recognition

Returning to FIG. 3, the image processing module 106 also performs an object recognition function 304. The object recognition function receives images from the sensor 103, as well as new frames from the SLAM function 302 and a reference model of the object to be located 308. The object recognition function 304 serves to detect and locate objects in the scene.

Figure 17:
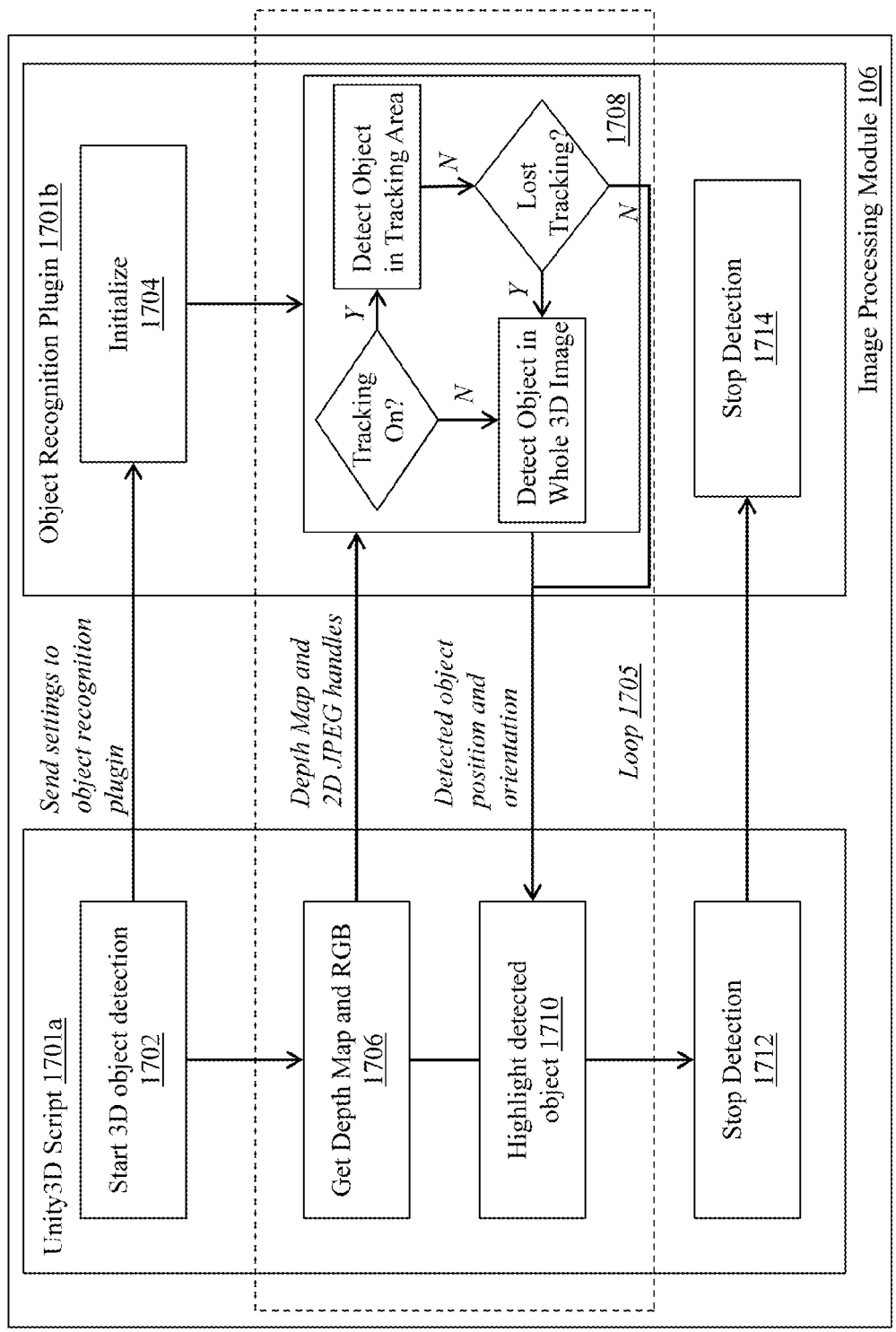
FIG. 17 is a flow diagram of a method of the object recognition function performed by the image processing module.

FIG. 17 is a flow diagram of a method 1700 of the object recognition function 304 performed by the image processing module 106 of FIG. 1. As shown in FIG. 17, the Unity3D script 1701*a* starts (1702) 3D object detection, which sends initialization settings to the object recognition plugin 1701*b*. The object recognition plugin 1701*b* initializes (1704) using the received settings, and loop 1705 begins.

The Unity3D script 1701*a* gets (1706) the depth map and RGB from the image, and transmits the depth map and 2D JPEG handles to the object recognition plugin 1701*b*. The plugin 1701*b* determines whether tracking is on, meaning that the object is to be located in a particular area of the image. If yes, the plugin 1701*b* detects the object in the tracking area. If the object is not detected in the tracking area, the plugin 1701*b* determines whether tracking has been lost. If yes, the plugin detects the object within the entire 3D image. The result of the detection process is the detected object position and orientation, which is returned to the Unity3D script 1701*a*. The script 1701*a* highlights (1710) the detected object in the scene. Then, detection is stopped (1712 and 1714).

Figure 18:
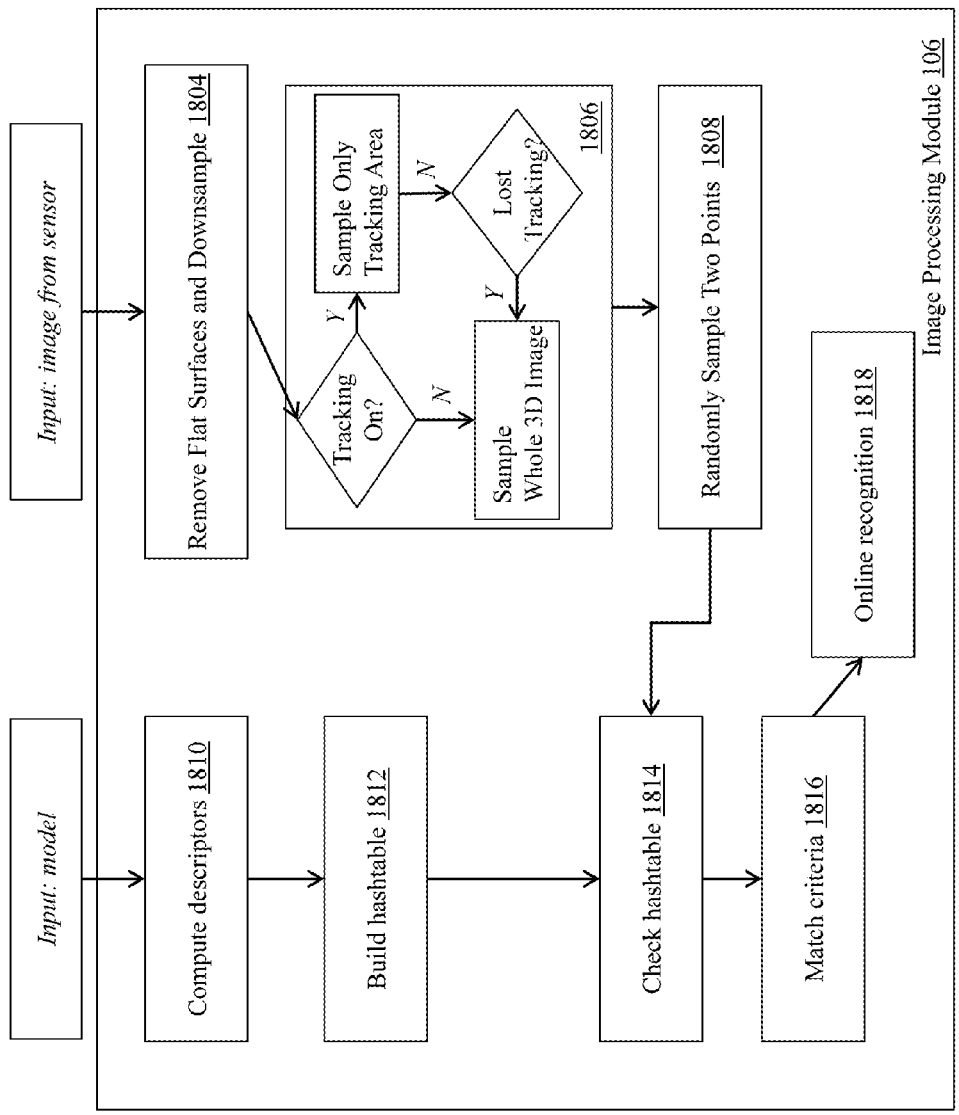
FIG. 18 is a detailed flow diagram of a method of the object recognition function performed by the image processing module.

FIG. 18 is a detailed flow diagram of a method 1800 of the object recognition function 304 performed by the image processing module 106 of FIG. 1. As shown in FIG. 18, images from the sensor and a model of the object to be located are received by the image processing module 106. The module 106 processes the model to compute (1810) descriptors for pairs of oriented points in the model and uses the descriptors to build (1812) a hashtable.

Figure 20:
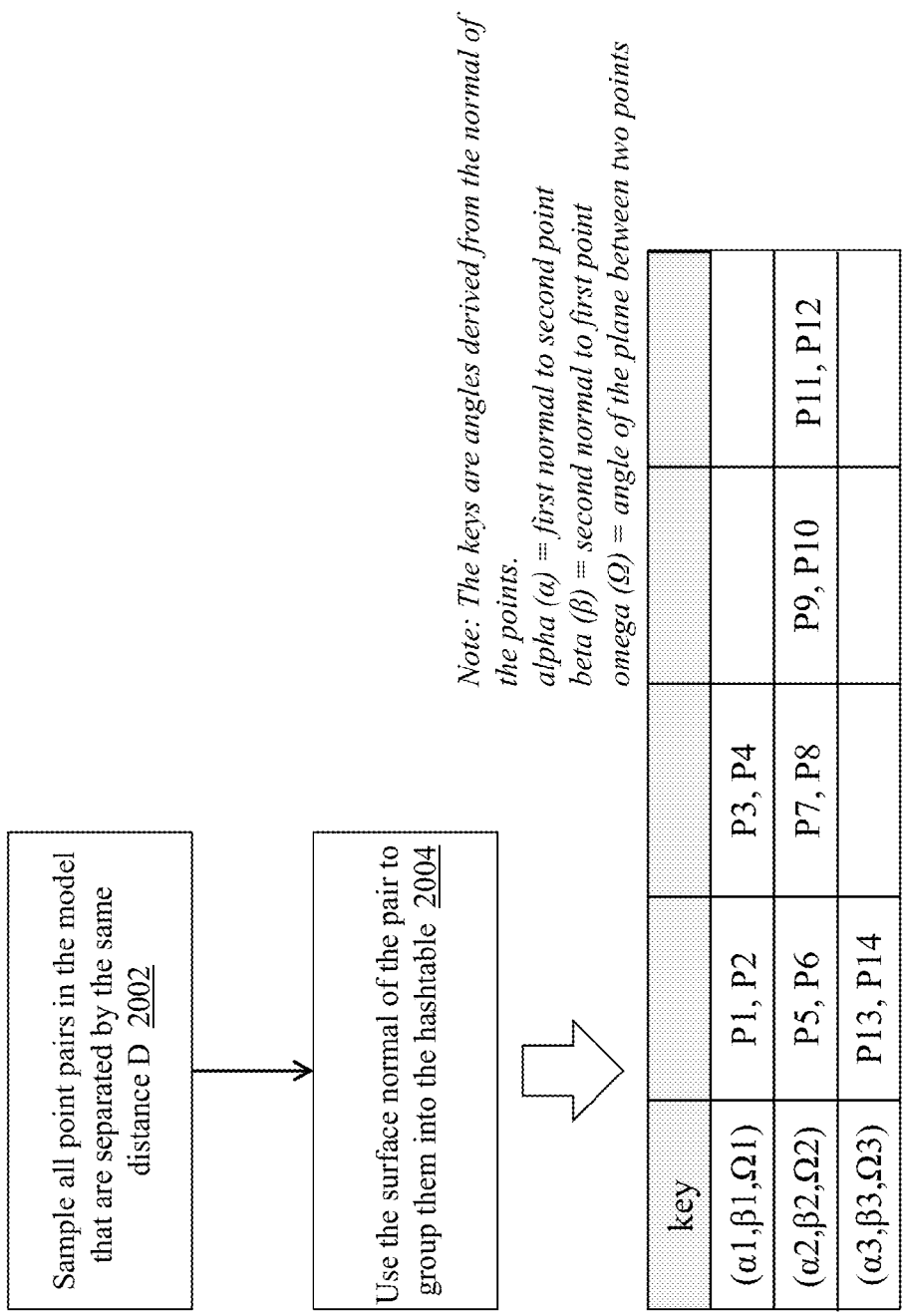
FIG. 20 is a flow diagram of a method to build the hashtable.

In one embodiment, for a given object model, the image processing module 106 samples all pairs of oriented points $(i,j)=((p_i, n_i), (p_j, n_j))$ for which $p_i$ and $p_j$ are approximately at a distance d from each other. For each pair, the descriptor $f(i,j)=(\Delta(n_i, n_j), \Delta(n_i, p_j - p_i), \Delta(n_j, p_i - p_j))$, where $\Delta(\ )$ denotes the angle between two vectors. Generally, the hash table consists of two parts: keys and values. In one embodiment, the object model is represented by a 3D hash table. The keys in the hash table denote the descriptor, which contains three values, i.e., $\Delta(ni,nj)$, $\Delta(ni,pj-pi)$ and $\Delta(nj,pi-pj)$. The values in the hash table represent the pairs of points associated with the descriptor. FIG. 19 depicts the structure of a 3D hash table to represent the object model, and FIG. 20 is a flow diagram of a method to build the hashtable. As shown in FIG. 20, the module 106 samples (2002) all point pairs in the model that are separated by the same distance D. The module 106 then uses (2004) the surface normal of each pair to group them into the hashtable.

Returning to FIG. 18, once the hashtable is built, the image processing module 106 performs an online detection step. The module 106 removes (1804) flat surfaces in the scene and downsamples the remaining points. For example, the module 106 creates an octree for the processed scene.

The module 106 uses a tracking option to speed up the object detection process. When the tracking is turned on, the module 106 does not have to sample the whole raw scan from every image. Instead, the tracking area used for sampling is associated with the previous position where the target object was found in the previous image(s). If the target object is not detected within the tracking area, the module 106 then searches/samples the whole 3D scan.

Next, the module 106 enters a loop where the following steps are performed:

a) Sample a pair of points pk and pl from the processed scene, where pk and pl are at a certain distance D from each other and the first point pk selected at random from the scene points. Then, choose the second point pl randomly from the points which have an approximate distance d from the first point.

b) Compute the descriptor $f(k, 1)=(\Delta(nk,nl), \Delta(nk,pl-pk), \Delta(nl,pk-pl))$ with the same method applied to the model.

c) Use f(k, 1) as a key to the model hash table to retrieve the model point pairs {(pi0, pj0), (pi1, pj1), (pi2, pj2) . . . } similar to (pk, pl).

d) Compute the rigid transform T that best aligns (pi, pj) to (pk, pl).

e) Crop the area from the raw scene with the rough position and size of the model based on the alignment in step (d).

f) Execute an ICP algorithm to align the cropped area to the model and get a rough transform T'.

g) Check the number of registered points in the cropped area. This number should be greater than the threshold.

h) Extract viewable points from transformed model based on the transform T'. The normal-base strategy is applied to choose these viewable points.

i) Find the best transform Tbest which can transform the model to get maximum registered points in the scene.

The module 106 then executes the ICP algorithm again to align the projected points to the model and generate a final transform which is used to highlight the detected object in the scene.

Figure 21:
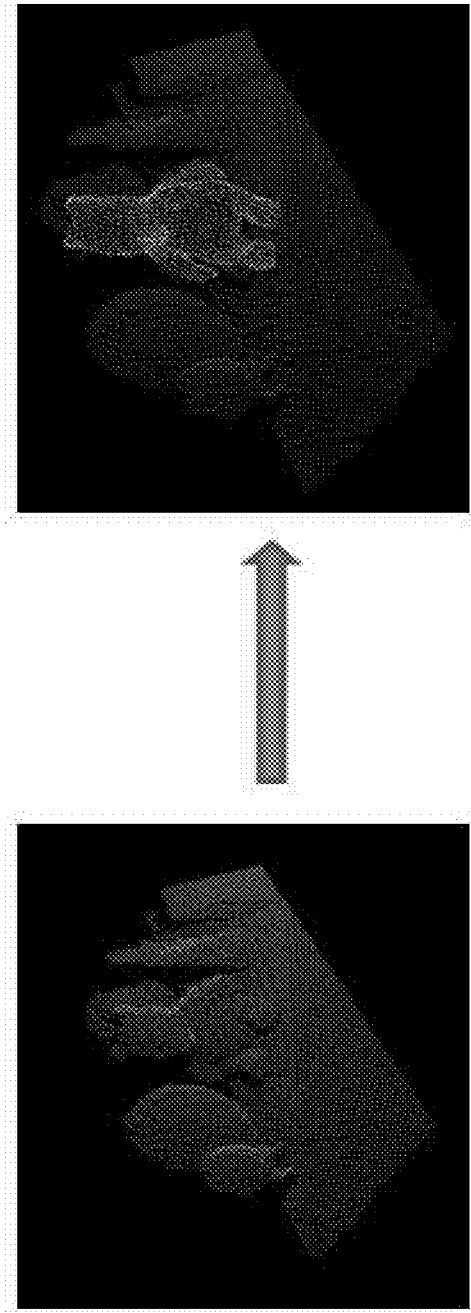
FIG. 21 depicts a located and highlighted object in a scene using the object recognition methods described herein.

FIG. 21 depicts a located and highlighted object in a scene using the object recognition methods described above. In FIG. 21, the left-hand picture depicts the scene which includes a number of different objects (e.g., ball, bear, cone, table). The right-hand picture depicts the scene after the system described herein has processed the scene using the object recognition method described herein. The result shows that the object (i.e., the bear) to be located, based upon the model, has been detected and highlighted (in white).

The reference model (RM) used in the object recognition process does not have to be exactly the same shape as the object being extracted from the scene. The RM can be a shape that is similar. For example, the system can use a cylinder to find a person's head and relax the similarity parameter control to find all the points in the scene that belong to the head.

The format of the reference model file can be a standard 3D file format such as .OBJ, and does not have to have the Reference Model format used for Shape-Based Registration, as described below.

Object Reconstruction (Shape-Based Registration) Using Noisy and Partial Scans

It should be appreciated that in generating a 3D model of an object, the ICP registration algorithm (described above) is typically used to register the respective position/pose of multiple scans of an object and then merge the scans into a single 3D model. The ICP registration technique generally works well in a controlled environment using accurate scanners. Further, depending on the complexity of the object, the ICP registration technique can require a large number of scans, and hence a great deal of processing, to generate an accurate 3D model. Therefore, ICP registration can be expensive, difficult to use, and can require manual post-processing of the 3D model.

For real-time embedded and mobile applications, a fast, efficient, and fault-tolerant approach is preferred for generating a fully closed, formed 3D model. The methods and systems described herein use knowledge of the object type to construct a 3D model from a minimum number of points in a noisy real-life scene. This is accomplished by starting with a Reference Model (RM), which has a known shape that is similar to the object to be modeled and analyzed. The RM is first resized and its global shape is modified using the non-rigid registration to roughly match the RM to the extracted object points. The RM is then further deformed by the points captured by the scanner to provide a best possible representation of the object in the scene. One advantage provided by the methods and systems described herein is that the data structure of the RM at the start of the process is known—every point in the Reference Model has a known relationship to the other points in the model. Hence, the scan points are used to 'warp' the RM such that the resulting Object 3D Model (OM) represents the best fit 3D model of the object in the scene. As more scan points are captured from the object in the scene, the OM is further refined and becomes more accurate relative to the actual object.

Figure 22:
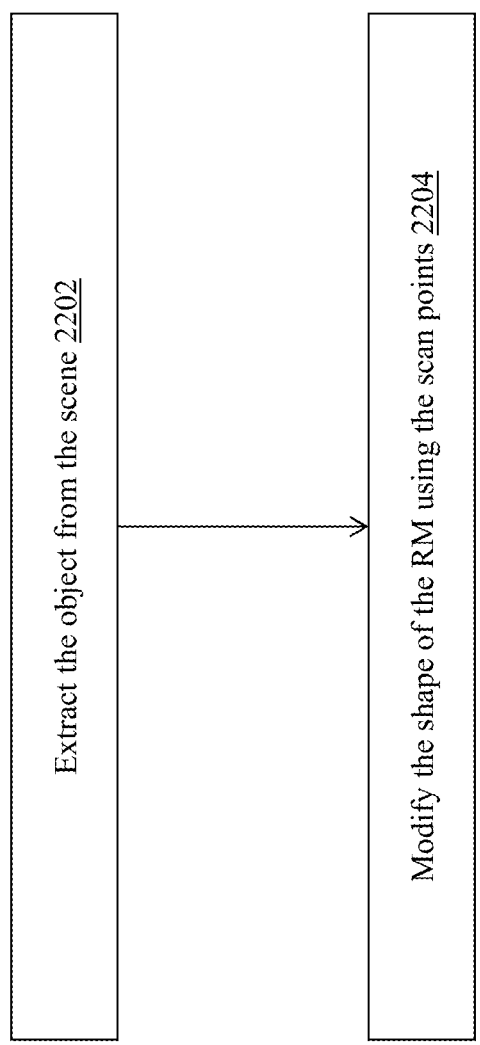
FIG. 22 is an exemplary workflow of a method for object reconstruction and analysis using noisy and partial scans.

FIG. 22 is an exemplary workflow of a method for object reconstruction and analysis using noisy and partial scans. First, the object is extracted (2202) from the scene. Generally, a Descriptor of the RM is used. The Descriptor contains the shape information of the RM (also called the criteria), which is compared to the scene containing the object. When the group of the points in the scene matches the RM Descriptor criteria, the matched group of points is deemed to be the points associated with the target object. For example, if the object to be located in the scene is a car, the Descriptor contains the information related to the car's shape, such as distances between points as well as the surface normal of the points within the car. The point cloud in the scene is then similarly analyzed and compared against the Descriptor to determine the closeness of the match. When the match is found, the system can use the object's location as well as the object's pose to extract the points related to the car.

Figure 23:
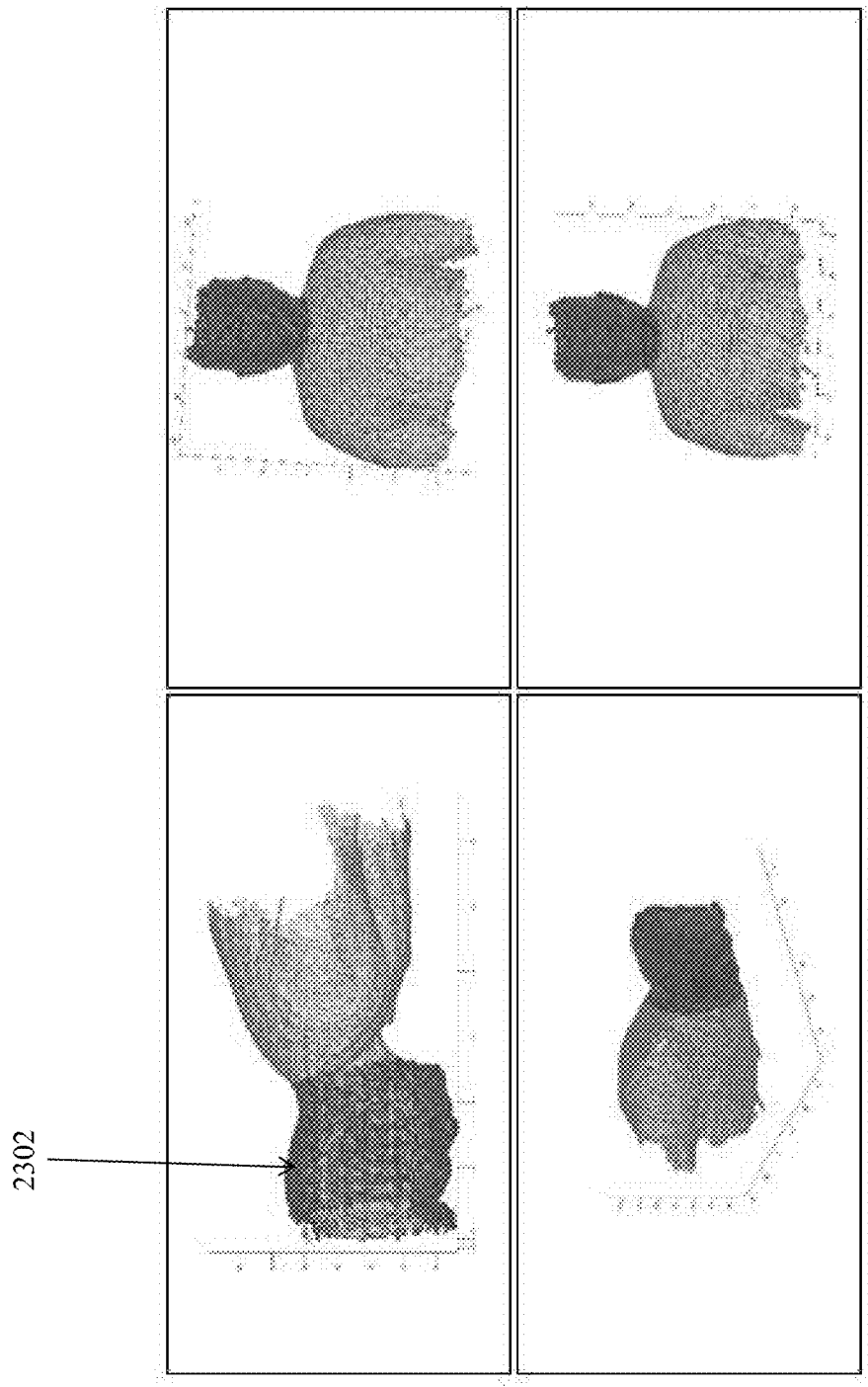
FIG. 23 depicts an exemplary extraction of an object (e.g., a person's head) from a scene using the SLAM function and object recognition function described herein.

FIG. 23 depicts an exemplary extraction of an object (e.g., a person's head) from a scene using the SLAM function 302 and object recognition function 304 described above. As shown in FIG. 23, the SLAM function 302 was used to capture the full 360-degree model of the head (e.g., head 2302, the darker area connected to the body), the object recognition function 304 was used to detect the head points, and the head points are extracted from the scene.

Turning back to FIG. 22, once the object points in the scene are extracted, the image processing module 106 uses the scan points to modify (2204) the shape of the RM. The RM is thus matched to provide the best fit 3D model that represents the object in the scene. The resulting OM represents the best fit model of the object.

There are several advantages to the above-described object reconstruction method:

Reliability—because the full 3D Model structure is already in place but simply being modified to fit the scan, the resulting 3D model is clean and complete. Therefore, the resulting 3D model can directly be transferred to the application (e.g., 3D Printing) without any additional manual processing steps (i.e., the OM can be directly used for 3D Printing without any manual cleanup).

Speed—the above-described process uses only the new object points from the scan that are added to the scene. Basically, the points that were previously processed do not need to be processed again. Hence, there is no redundant processing of the same points from multiple scans and the processing is very fast in comparison to the traditional ICP method, where most of new points are processed again in order to get accurate registration.

Accuracy—the above-described process uses the actual positions of the points from the scene to modify the RM. Hence, the modification is accurate and is limited only by the point density of the RM. The higher the RM density is, the more accurate the resulting OM is when compared to the actual object.

Noise Tolerance—because the 3D Model retains its overall shape, even the noisiest or partial scan can generate an accurate and clean 3D Model. Hence, outlier points in the scan do not deform the shape of the object significantly, as a result providing natural smoothing and hole filling capabilities which would have been done manually using the traditional ICP process.

Figure 24B:
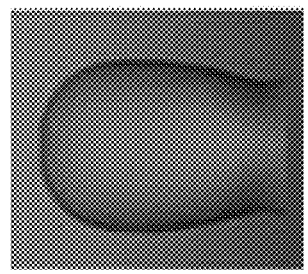
FIGS. 24A-24B depict examples of reference models that can be used in conjunction with the methods for shape-based registration described herein.
Figure 24A:
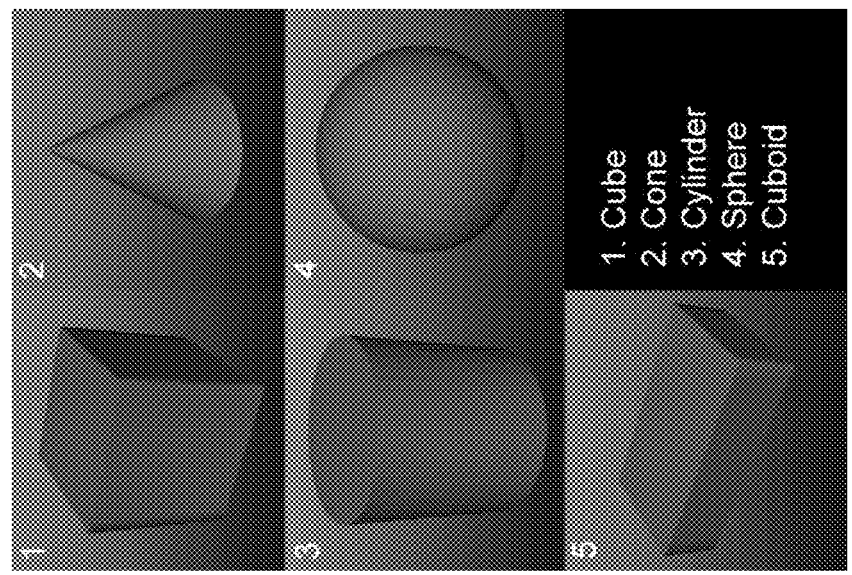

FIG. 24A depicts examples of reference models that can be used in conjunction with the above-described methods for shape-based registration. Typically, the reference models are simple geometric models, such as the cube, cone, cylinder, sphere, and cuboid shown in FIG. 24A. In some cases, the reference model could look as close to the object to be located (e.g., a person's head), such as the model shown in FIG. 24B. Generally, the more similar the reference model is in shape to the scan, the better the object reconstruction results will be.

Creation of the 3D Reference Model for Shape-Based Registration

The following section describes the creation of the 3D Reference Model for shape-based registration. In one example, the 3D Reference Model is a simple monolithic shape (e.g., cylinder) but it should be appreciated that other types and complexities of shapes can be used without departing from the scope of invention. Further, for flexible objects, a non-rigid registration process can be used to slightly modify the shape of the 3D model before being used in the shape-based registration (reconstruction) process.

The initial Reference Model (RM) is built in multiple 2D layers. In this embodiment, the height between each 2D layer is identical. Therefore, the RM consists of a large number of 2D layers of equal distance from each other. For example, a cylinder would be represented by a large number of circles parallel to each other and separated by the same distance to each other.

The RM is represented as 2×2 arrays, where each row represents a single 2D layer. Each column represents points that are connected to the points in layers above and below. The center of each layer is also calculated and saved in this array.

As the RM is modified by the scan points, the height between each layer can change but the layers are still equidistant to each other. The points within each layer are correspondingly modified to provide a best fit relative to the scan points. Any point within the RM can be designated as a feature point.

More complex shapes, such as a human being, can be represented by combining multiple monolithic shapes. For a person, for example, each of the head/neck/torso/leg can be independently represented by a monolithic 3D Model.

In order to achieve interconnection between multiple monolithic shapes, the system can add an interconnection array that is shared between two different monolithic shapes. Between multiple RMs, for example, there is one interconnection array that provides connection points between two RMs. If the overall shape is very complex, there could be a large number of interconnection arrays. The interconnection array points may or may not be located on the same 2D layer planes within the monolithic shape.

When the shapes of the RMs are changed using the scan points, the positions of the interconnection array points are correspondingly changed as well. Therefore, two corresponding points in each of the RMs are no longer in the same position. To reconnect these two shapes together, the image processing module 106 averages the corresponding interconnection points between the two shapes and use the averaged points as the new interconnection points. Now, the two interconnection points occupy the same positions.

Figure 25:
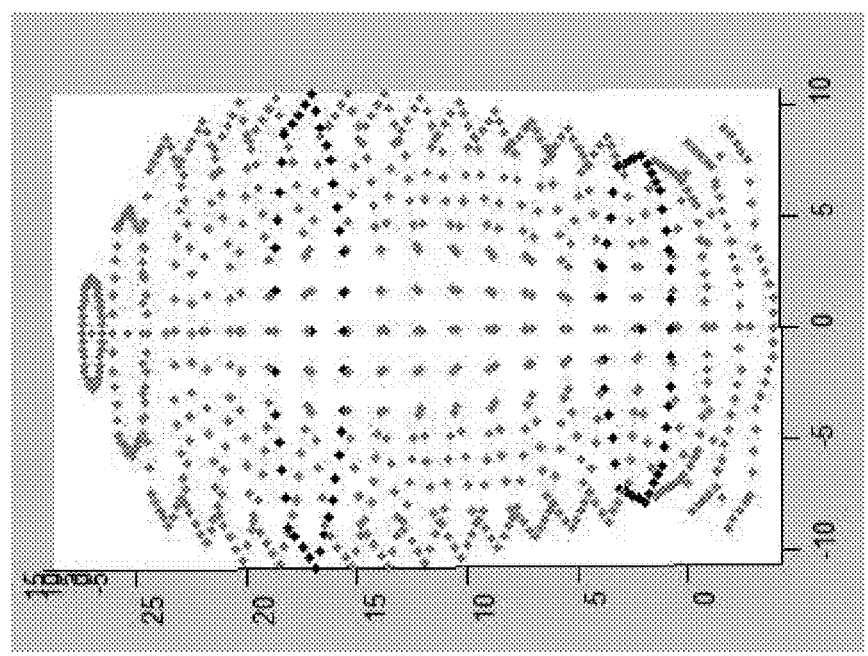
FIG. 25 is a diagram of a RM where the layers of points are sorted by height.

Next, we describe the process of shape fitting, starting with the data structure of the RM. The model points of the RM are fit into a data structure where every point of the RM has a known relationship to the other points in the model. First, the model points (x, y and z coordinates) are sorted by height (y coordinate values). FIG. 25 is a diagram of a RM where the layers of points are sorted by height.

Next, the center points of each layer are calculated from the two center points of two corner layers provided by the RM. Table 1 below is an example of a center_points array: center_points=

TABLE 1

| X coordinate | Y coordinate | Z coordinate |
| --- | --- | --- |
| 0 | 25.3518 | 4.3109 |
| 0 | 22.0577 | 4.1683 |
| 0 | 18.7635 | 4.0257 |
| 0 | 15.4693 | 3.8831 |
| 0 | 12.1648 | 3.7401 |
| 0 | 8.8810 | 3.5979 |
| 0 | 5.5868 | 3.4553 |
| 0 | 2.2926 | 3.3128 |
| 0 | −1.0016 | 3.1702 |
| 0 | −4.2958 | 3.0276 |

The next step is to calculate the angles each point creates with the x-axis for each layer of the RM. Then, the points for each layer are sorted by the angle in ascending order. Table 2 below is an example of the sorted points of one layer by angles. It should be noted that each layer has an identical y value.

TABLE 2

| X coordinate | Y coordinate | Z coordinate | Angle |
|---|---|---|---|
| 2.5279 | 25.3518 | 4.3109 | 0 |
| 2.0451 | 25.3518 | 6.1659 | 42.2104 |
| 0.7812 | 25.3518 | 7.3124 | 75.4123 |
| −0.7812 | 25.3518 | 7.3124 | 104.5877 |
| −2.0451 | 25.3518 | 6.1659 | 137.7896 |
| −2.5279 | 25.3518 | 4.3109 | 180.0000 |
| −2.0451 | 25.3518 | 2.4558 | 222.2103 |
| −0.7812 | 25.3518 | 1.3093 | 255.4123 |
| 0.7812 | 25.3518 | 1.3093 | 284.5877 |
| 0.9925 | 5.3518 | 2.4558 | 317.7896 |

Next, the max and min angle range for each point for every layer of the model is calculated and stored. In one embodiment, the maximum range for a point is calculated by dividing the distance between the angle of that point and the next point in the sorted table (as shown above in Table 2) by two, and adding the calculated distance to the angle of that respective point.

In one embodiment, the minimum range is calculated by dividing the distance between the angle of that point and the previous point in the sorted table by two, and subtracting that distance from the angle of that respective point.

Figure 26:
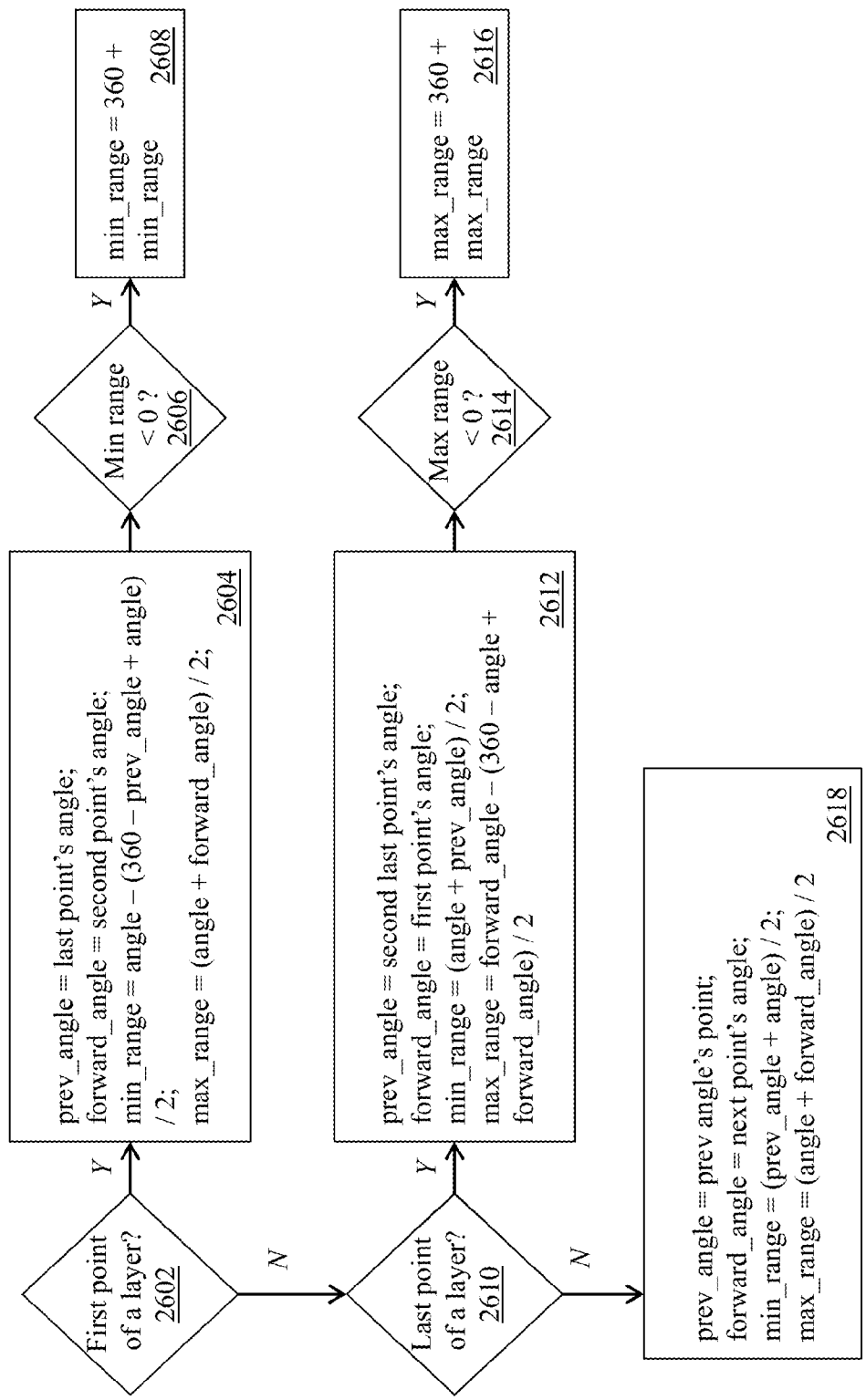
FIG. 26 is a flow diagram of a method for determining the max and min angle range for each point for every layer of the model.

When considering the max and min range for the first point of a layer, the previous point is the last point of that layer. And, in the case of the max and min range for the last point of a layer, the next point is the first point of that layer. Using this method, one point's min angle range is the previous point's max angle range and one point's max angle range is the next point's min angle range. FIG. 26 is a flow diagram of a method for determining the max and min angle range for each point for every layer of the model. As shown in FIG. 26, the module 106 determines (2602) whether the point is the first point of a layer. If the point is the first point of a layer, the module 106 calculates the prev_angle, forward_angle, min_range, and max_range attributes according to the formulas represented in box 2604—then determines if the min range is less than zero (2606) and adds 360 to the min_range attribute (2608).

If the point is not the first point of a layer, the module 106 determines (2610) whether the point is the last point of a layer. If the point is the last point of a layer, the module 106 calculates the prev_angle, forward_angle, min_range, and max_range attributes according to the formulas represented in box 2612—then determines if the max range is less than zero (2614) and adds 360 to the max_range attribute (2616).

If the point is not the first point of a layer or the last point of a layer, the module calculates the prev_angle, forward_angle, min_range, and max_range attributes according to the formulas represented in box 2618.

Table 3 below displays the points of one layer sorted by angle and including the min angle range and max angle range.

TABLE 3

| X coordinate | Y coordinate | Z coordinate | Angle with X axis | Min Angle Range | Max Angle Range |
|---|---|---|---|---|---|
| 2.5279 | 25.3518 | 4.3109 | 0 | 338.8948 | 21.1052 |
| 2.0451 | 25.3518 | 6.1659 | 42.2104 | 21.1052 | 58.8114 |

TABLE 3-continued

| X coordinate | Y coordinate | Z coordinate | Angle with X axis | Min Angle Range | Max Angle Range |
|---|---|---|---|---|---|
| 0.7812 | 25.3518 | 7.3124 | 75.4123 | 58.8114 | 90.0000 |
| −0.7812 | 25.3518 | 7.3124 | 104.5877 | 90.0000 | 121.1886 |
| −2.0451 | 25.3518 | 6.1659 | 137.7896 | 121.1886 | 158.8948 |
| −2.5279 | 25.3518 | 4.3109 | 180.0000 | 158.8948 | 201.1052 |
| −2.0451 | 25.3518 | 2.4558 | 222.2103 | 201.1052 | 238.8113 |
| −0.7812 | 25.3518 | 1.3093 | 255.4123 | 238.8113 | 270.0000 |
| 0.7812 | 25.3518 | 1.3093 | 284.5877 | 270.0000 | 301.1887 |
| 2.0451 | 25.3518 | 2.4558 | 317.7896 | 301.1887 | 338.8948 |

Using Table 3, the image processing module 106 can extract the required information on x, y, z, angle, max and min angle range to compare the values with the scan points and then deform the RM to look like the actual scanned object, as described below.

Before starting the shape-based deformation, however, the module 106 can resize the 3D Reference Model as close to the size of the scan as possible. For example, if the reference model is 1 meter tall and the scanned points are 1.05 meter tall, the reference model is 'stretched' to 1.05 meter so that its respective sizes are similar before the deformation takes place. This process is not always necessary for all application but generally results in a more accurate 3D model.

Figure 27:
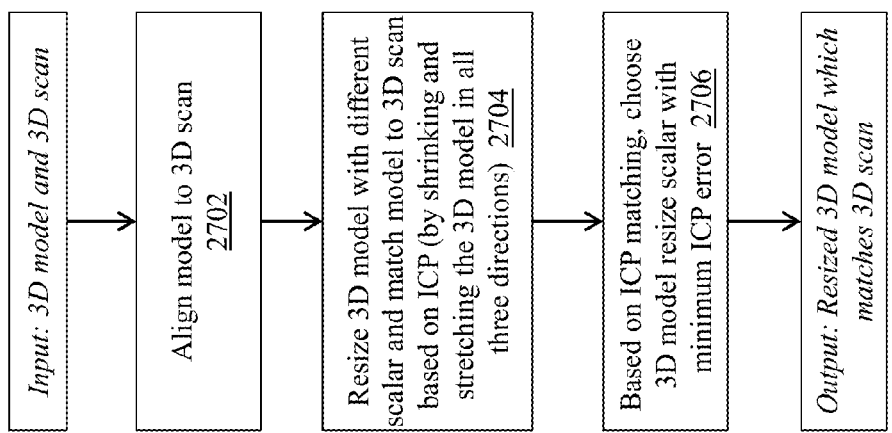
FIG. 27 is a flow diagram of a method for resizing a 3D model to match the 3D scan.

FIG. 27 is a flow diagram of a method for resizing a 3D model to match the 3D scan. The resizing of a 3D model to match the 3D scan is based on initial alignment and refinement ICP matching with different 3D model scalar. The scalar can be applied in three dimensions individually or simultaneously. The ICP error is calculated based upon the distance between matched and resized 3D model and 3D scan. A smaller ICP error indicates better alignment and more properly scalar. Based on the matched and resized 3D model, the 3D scan can be cropped and only part of the scan which is similar to 3D model can be kept. As shown in FIG. 27, the 3D model and 3D scan are used as input into the image processing module 106. The module 106 aligns (2702) the model to the 3D scan. The module 106 then resizes (2704) the 3D model with different scalar and matches the model to the 3D scan based upon the ICP algorithm (e.g., by shrinking and stretching the 3D model in all three directions). The module 106 then chooses (2706) the 3D model resize scalar with a minimum ICP error. The output is a resized 3D model which matches the 3D scan.

If there are no corresponding points in the scene (i.e., big holes in the extracted target object), the original shape of the Reference Model is retained for the missing sections. Therefore, this acts as an automatic best effort 'hole-filling' of the missing sections in the target object based on the reference model shape.

The amount of modification of the 3D reference model can be controlled from the minimum (no change) to maximum (full change), or somewhere in between. This allows the automatic smoothing capability of the shape modification while still keeping the original shape to its best effort. This means that even the noisiest scans can result in a relatively good 3D model of the object.

Non-Rigid Registration (for Flexible Objects)

Figure 28:
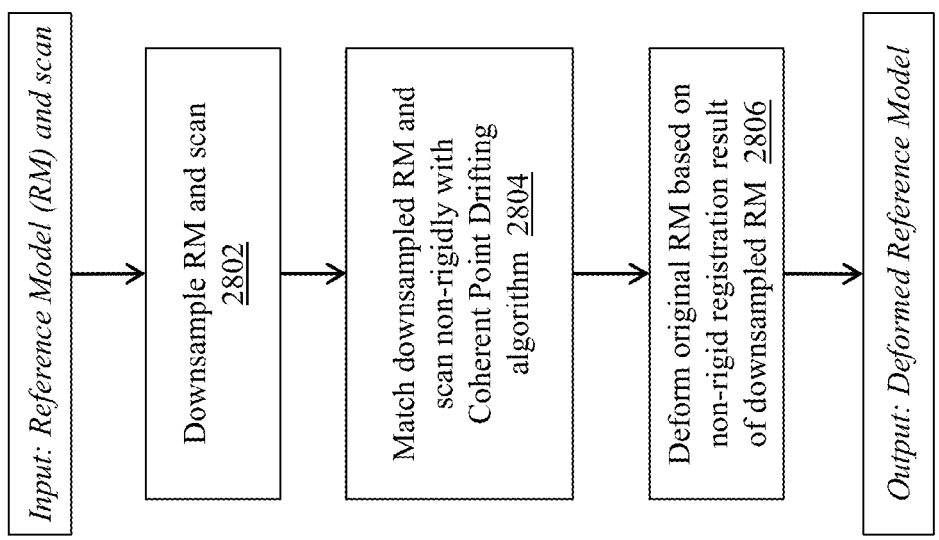
FIG. 28 is a flow diagram of a method for non-rigid registration for shape-based registration.

For objects that are not 'rigid' like humans or objects made of flexible materials, the shape of the object may be quite different from the 3D model due to the changes in the position around the object. In this case, the image processing module 106 can apply non-rigid registration in order to modify the 3D model such that the parts within the object matches that of the object in the scan before moving to shape-based registration. FIG. 28 is a flow diagram of a method for non-rigid registration for shape-based registration.

As shown in FIG. 28, the reference model (RM) and scan are input into the image processing module 106. The module 106 downsamples (2802) the RM and, optionally, the scan. Downsampling the RM and the scan decreases the amount data to be matched in the non-rigid registration process in order to accelerate the speed. Next, the module 106 matches (2804) the downsampled RM and the scan non-rigidly using a coherent point drifting algorithm. Then, the module 106 deforms (2806) the original RM based upon the results of the non-rigid registration of the downsampled RM using, e.g., a thin plate spline algorithm.

Figure 29:
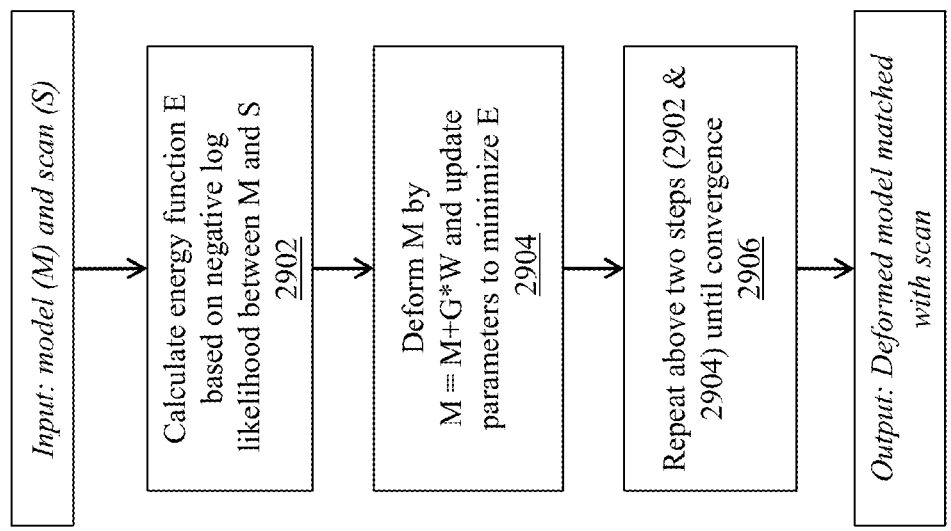
FIG. 29 is a flow diagram of a method for matching the downsampled RM and the scan using a coherent point drifting algorithm.

It should be understood that instead of the coherent point drifting algorithm, the module 106 can use other algorithms such as robust point matching without departing from the scope of the invention described herein. FIG. 29 is a flow diagram of a method for matching the downsampled RM and the scan using a coherent point drifting algorithm. As shown in FIG. 29, the module 106 receives the model (M) and scan (S) as inputs. The module 106 calculates (2904) an energy function E. The energy function E is defined by negative log likelihood between M and S and likelihood between Model, M, and Scan, S, is defined by Gaussian Mixture Model.

Let $M=\{m_0, m_1, \ldots, m_{Nm}\}$, $S=\{s_0, s_1, \ldots, s_{Ns}\}$ each m and s is 3D point, $W=\{w_0, w_1, \ldots, w_{Nm}\}$, each $w_i$ is weight of $m_i$ in 3D, G is Nm by Nm matrix and each $$G_{ij} = e^{-\frac{1}{s}\left\|\frac{m_i - m_j}{\beta}\right\|^2}$$

$$E = -\log\left(\sum_i \sum_j e^{-\frac{1}{2}\left\|\frac{m_i - s_j}{\sigma}\right\|^2}\right) + \frac{\lambda}{2} * \text{trace}(W^T * G * W)$$

β and λ are parameters control the smoothness of non-rigid registration result, the larger value, the more smoothness.

The module 106 deforms M by M=M+G*W and updates (2904) W and σ in order to minimize E. Let P is Ns by Nm matrix and each $$P_{ij} = \frac{e^{-\frac{1}{2}\left\|\frac{m_i - s_j}{\sigma}\right\|^2}}{\sum_i e^{-\frac{1}{2}\left\|\frac{m_i - s_j}{\sigma}\right\|^2}}$$

The update rules of W and σ are:

$$W = (G + \lambda * \sigma^2 * \text{diag}(P*1)^{-1})^{-1} * (\text{diag}(P*1)^{-1} * P * S - M)$$

$$\sigma^2 = \frac{1}{3*\sum\sum P}(\text{trace}(S^T * \text{diag}(P^T * 1) * S) - 2 * \text{trace}((P*S)^T * M) + \text{trace}(M^T * \text{diag}(P*1) * M))$$

The module 106 repeats (2906) the above steps 2902 and 2904 until convergence. When the non-rigid registration is converged, E is minimized, so the likelihood between M and S is maximized and M is deformed to match with S.

Figure 30A:
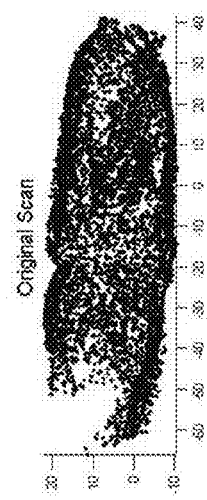
FIGS. 30A-30B depict front and side views, respectively, of the original scan.
Figure 30B:
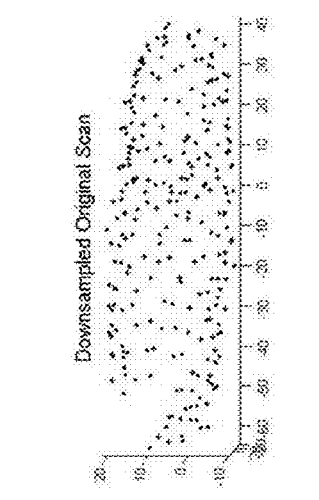
Figure 31A:
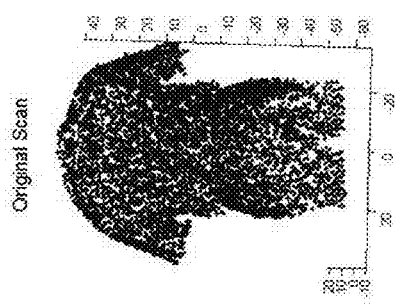
FIGS. 31A-31B depict front and side views, respectively, of the downsampled original scan.
Figure 31B:
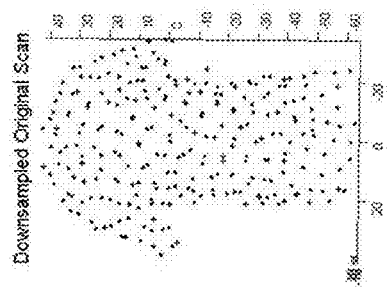
Figure 32B:
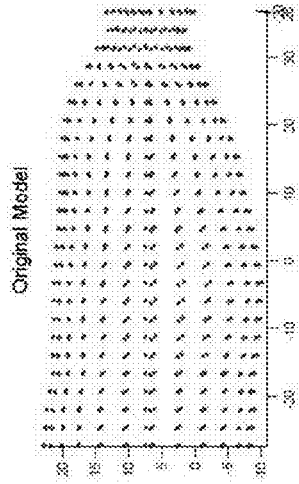
FIGS. 32A-32B depict front and side views, respectively, of the original 3D model.
Figure 33B:
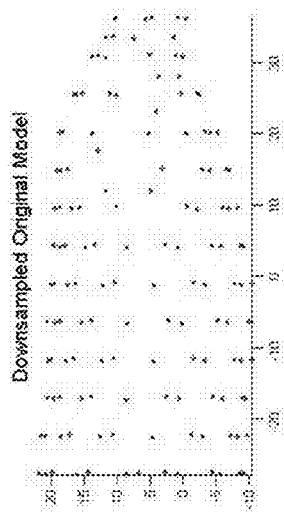
FIGS. 33A-33B depict front and side views, respectively, of the downsampled original 3D model.
Figure 32A:
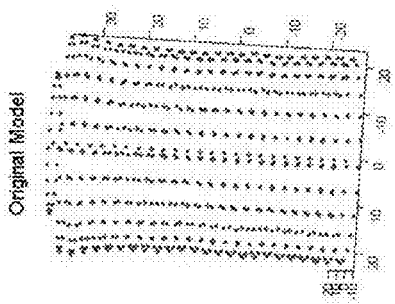
Figure 33A:
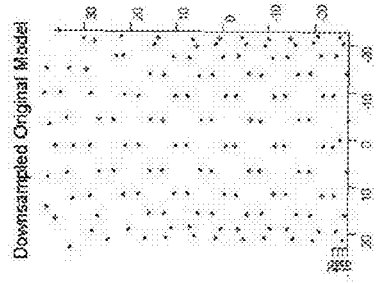
Figure 34A:
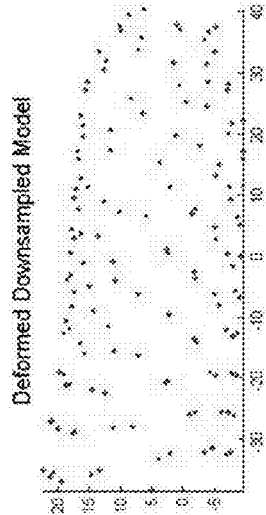
FIGS. 34A-34B depict front and side views, respectively, of the deformed downsampled original 3D model.
Figure 34B:
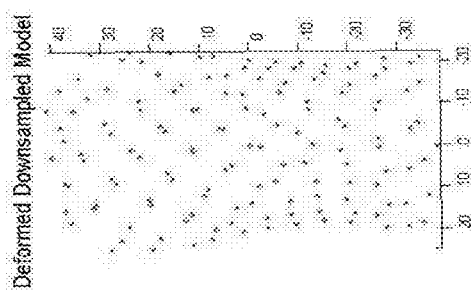
Figure 35A:
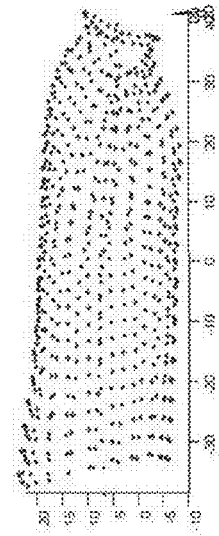
FIGS. 35A-35B depict front and side views, respectively, of the deformed model.
Figure 35B:
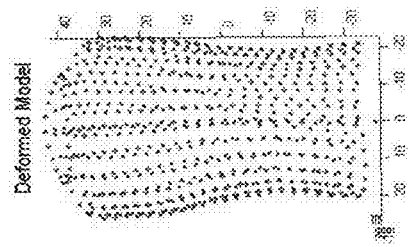

FIGS. 30A-B depict front and side views, respectively, of the original scan. FIGS. 31A-B depict front and side views, respectively, of the downsampled original scan. FIGS. 32A-B depict front and side views, respectively, of the original 3D model. FIGS. 33A-B depict front and side views, respectively, of the downsampled original 3D model. FIGS. 34A-B depict front and side views, respectively, of the deformed downsampled original 3D model. FIGS. 35A-B depict front and side views, respectively, of the deformed model.

Figure 36:
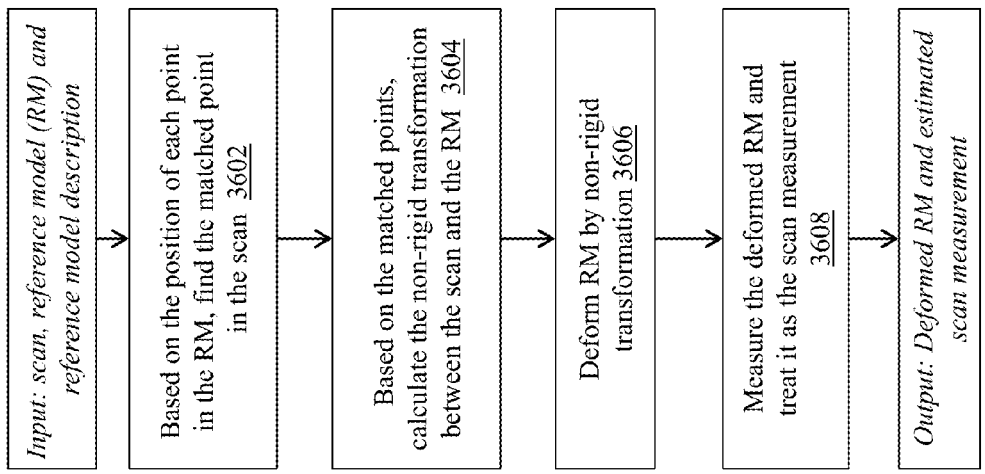
FIG. 36 is a flow chart of a method for comparing the x, y, z, angle, max and min angle range values with the scan points and deforming the RM to look like the actual scanned object.
Figure 37:
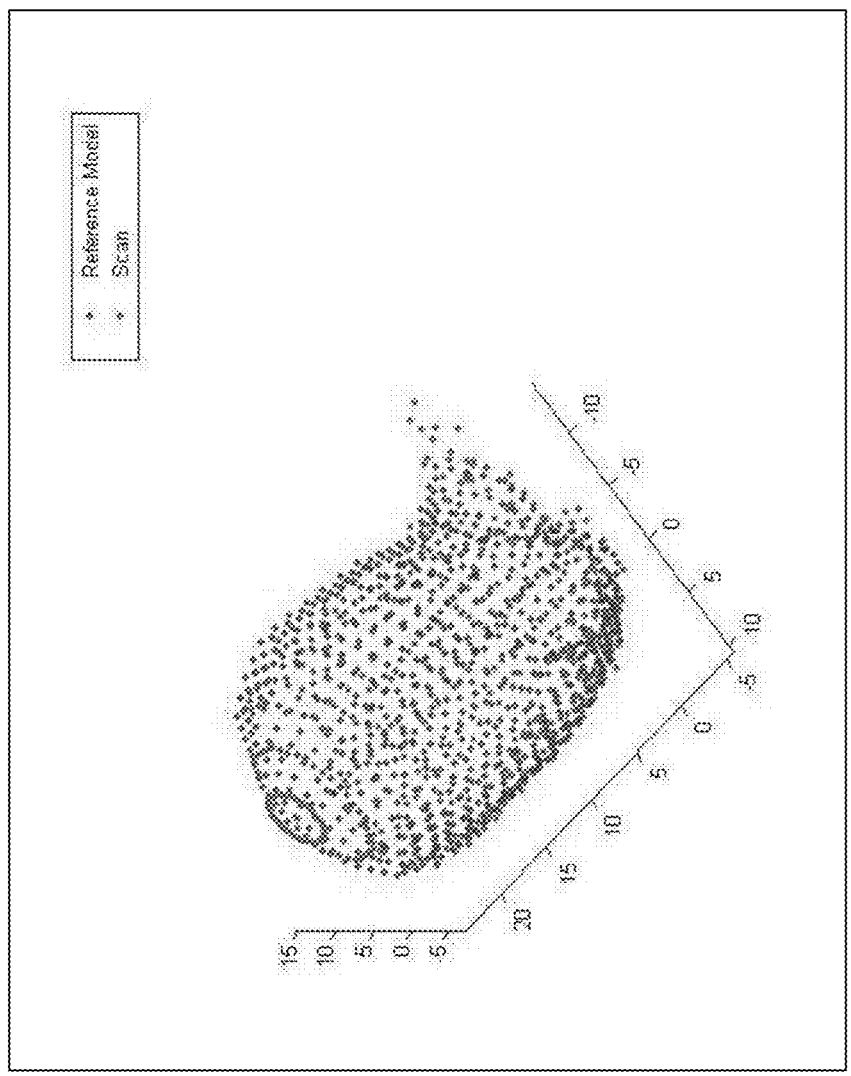
FIG. 37 depicts the size and posture of the scan and the RM have been matched.

FIG. 36 is a flow chart of a method for comparing the x, y, z, angle, max and min angle range values with the scan points and deforming the RM to look like the actual scanned object. As shown in FIG. 36, the module 106 receives as input the Reference Model (RM), the RM description, and a scan of the object. At this point, the size and posture of the scan and the RM have been matched (as shown in FIG. 37). The RM Description is used for matched scan points searching, as described below.

Figure 38:
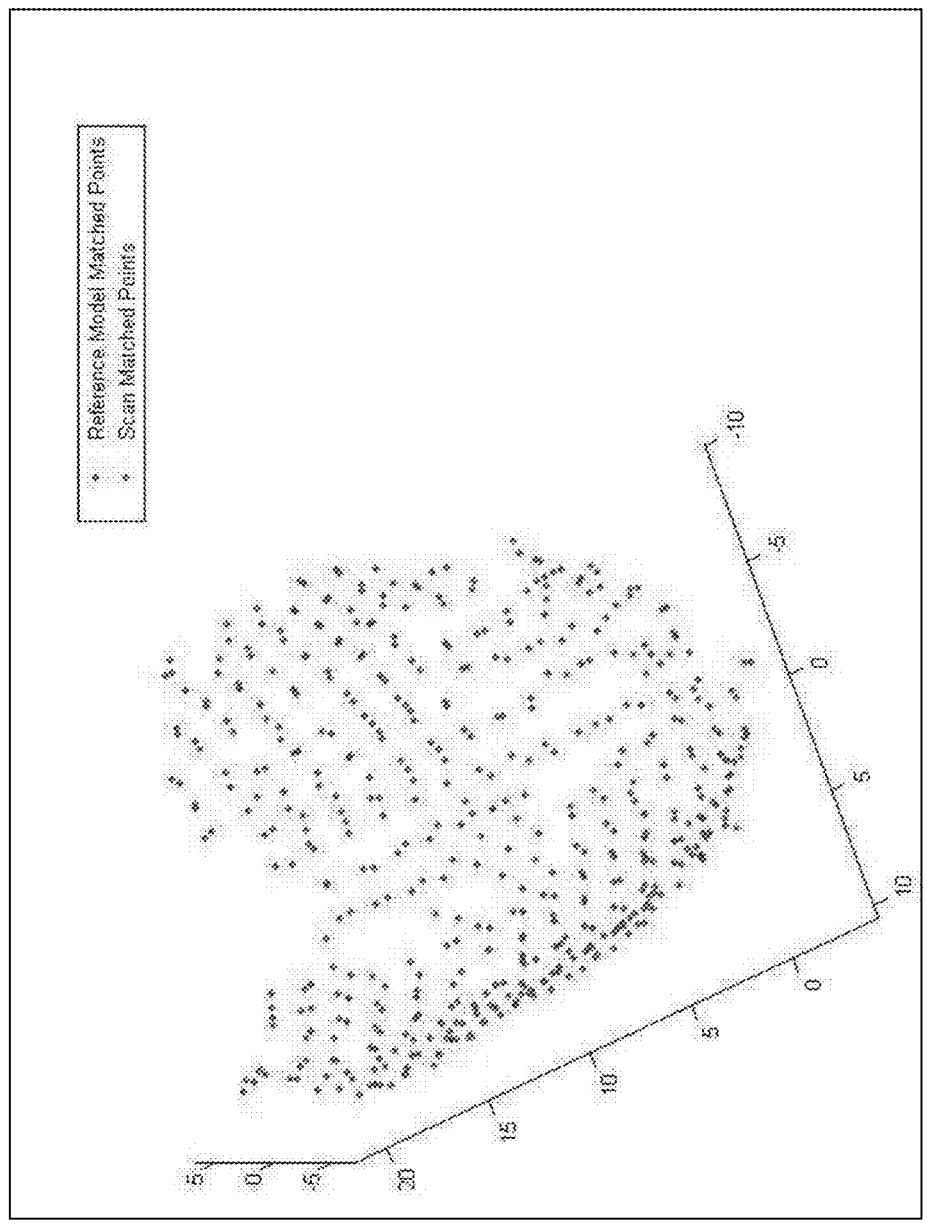
FIG. 38 depicts that not all the RM points have matched scan points, because there may be no point in the searching range defined by the RM Description.

Based on the position of each point in RM, the module 106 finds (3602) the matched point in the scan. The RM and RM Description are used for scan matched points searching. The RM description is a defined searching range, e.g. boundary in cylinder coordinate system, for each RM point. There are many methods to find the match point once the searching range has been defined (e.g. closest point, averaged point, point with the most similar normal, etc.). In the methods described herein, not all the RM points have matched scan points, because there may be no point in the searching range defined by the RM Description (as shown in FIG. 38).

Based on the scan matched points and RM, the module 106 calculates (3604) the non-rigid transformation between the scan and the RM.

Once the RM points and scan matched points have been defined, the non-rigid transformation between RM points and scan matched points can be calculated. In one embodiment, the system uses the thin plate spline function to match RM points to scan points.

Thin plate spline is a commonly used basis function for representing coordinates mapping. In 3D coordinates, the mapping function is defined as:

$$f(x, y, z) = d + d_x * x + d_y * y + d_z * z + \sum_{i=1}^{n} c_i * U(\|(x_i, y_i, z_i) - (x, y, z)\|)$$

The module 106 uses function f to map RM points to scan points. The function f can be represented in linear form which can be solved by QR decomposition.

Let $T = \begin{bmatrix} 1, x_1, y_1, z_1 \\ \ldots \\ 1, x_n, y_n, z_n \end{bmatrix}$ from RM points, $Z = \begin{bmatrix} 1, x_1, y_1, z_1 \\ \ldots \\ 1, x_n, y_n, z_n \end{bmatrix}$ from Scan points, $K = \begin{bmatrix} \begin{pmatrix} U(\|(x_i, y_i, z_i) - (x_j, y_j, z_j)\|) & \cdots & U(\|(x_i, y_i, z_i) - (x_j, y_j, z_j)\|) \\ \vdots & \ddots & \vdots \\ U(\|(x_i, y_i, z_i) - (x_j, y_j, z_j)\|) & \cdots & U(\|(x_i, y_i, z_i) - (x_j, y_j, z_j)\|) \end{pmatrix} \end{bmatrix}$ from RM points.

The linear representation of the function f is:

$$\begin{bmatrix} K+\alpha I & T \\ T' & 0 \end{bmatrix}\begin{bmatrix} c \\ d \end{bmatrix} = \begin{bmatrix} Z \\ 0 \end{bmatrix}, \alpha \text{ is the smoothness factor}$$

$$\text{QR decomposition } T, T = \begin{bmatrix} Q_1 & Q_2 \end{bmatrix}\begin{bmatrix} R \\ 0 \end{bmatrix}$$

$$b = (Q_2'KQ_2 + \alpha I)^{-1}Q_2'Z$$

$$d = R^{-1}Q_1'(Z - KQ_2 b), c = Q_2 b$$

Once c and d are solved, all parameters in f are known.

Figure 39:
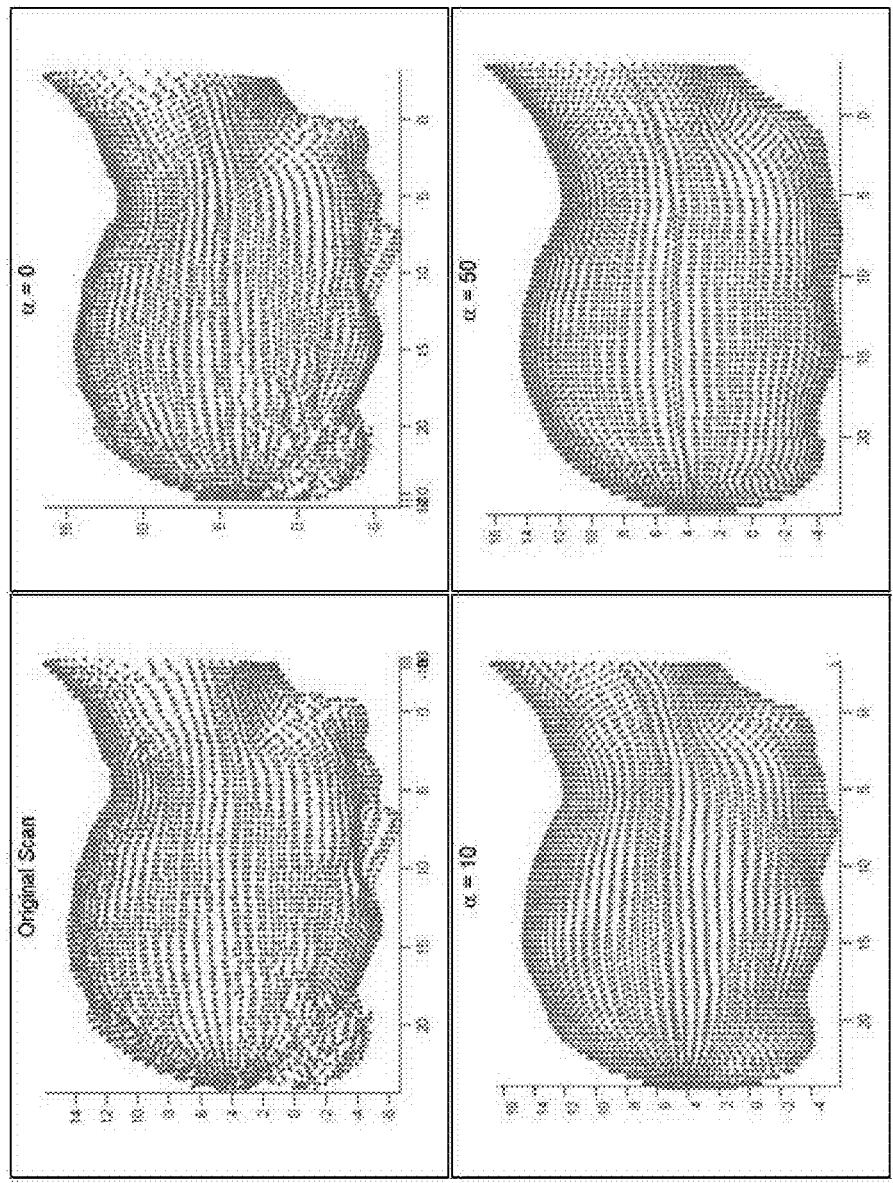
FIG. 39 depicts a deformed RM with different smoothness factors.

Controlling the amount of deformation: Smoothness factor α controls the overall smoothness of RM after deformation. FIG. 39 shows a deformed RM with different smoothness factors. In shape-based registration, α is a way to control how much the original model can be modified by the scan points. The larger the value, the more it keeps the original shape of the reference model. If this value is very large, the resulting 3D model looks like the original reference model regardless of the scan points. If this value is zero, maximum deformation takes place and the resulting 3D model looks like the scan points but with holes filled. In a typical application, α value needs to be chosen carefully based on the type of the object and the reference model shape.

Further, a different α value can be applied to different parts of the reference model. For example, in the example in FIG. 39, a low α value can be applied to the face to get the details while high α value can be applied to the back of the head which does not require the same amount of detail.

Figure 40A:
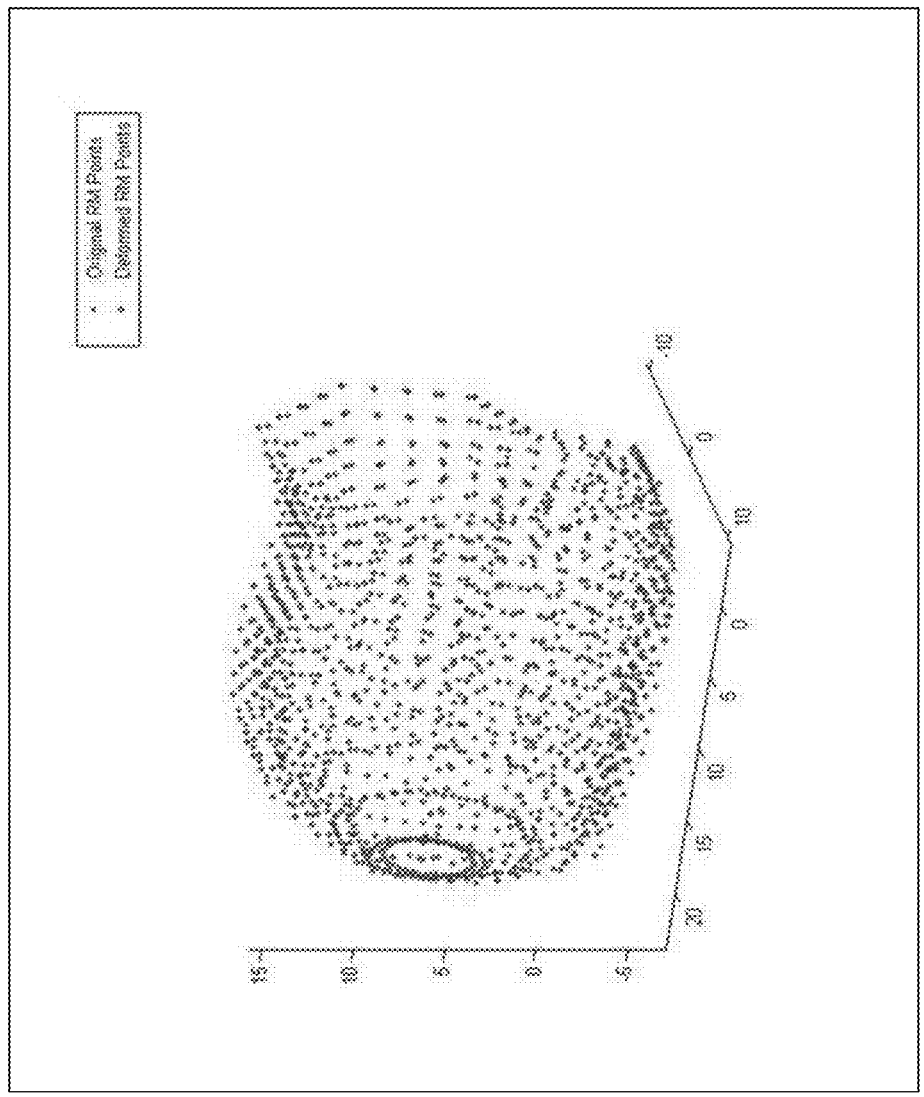
FIG. 40A depicts the original RM and the deformed RM.
Figure 40B:
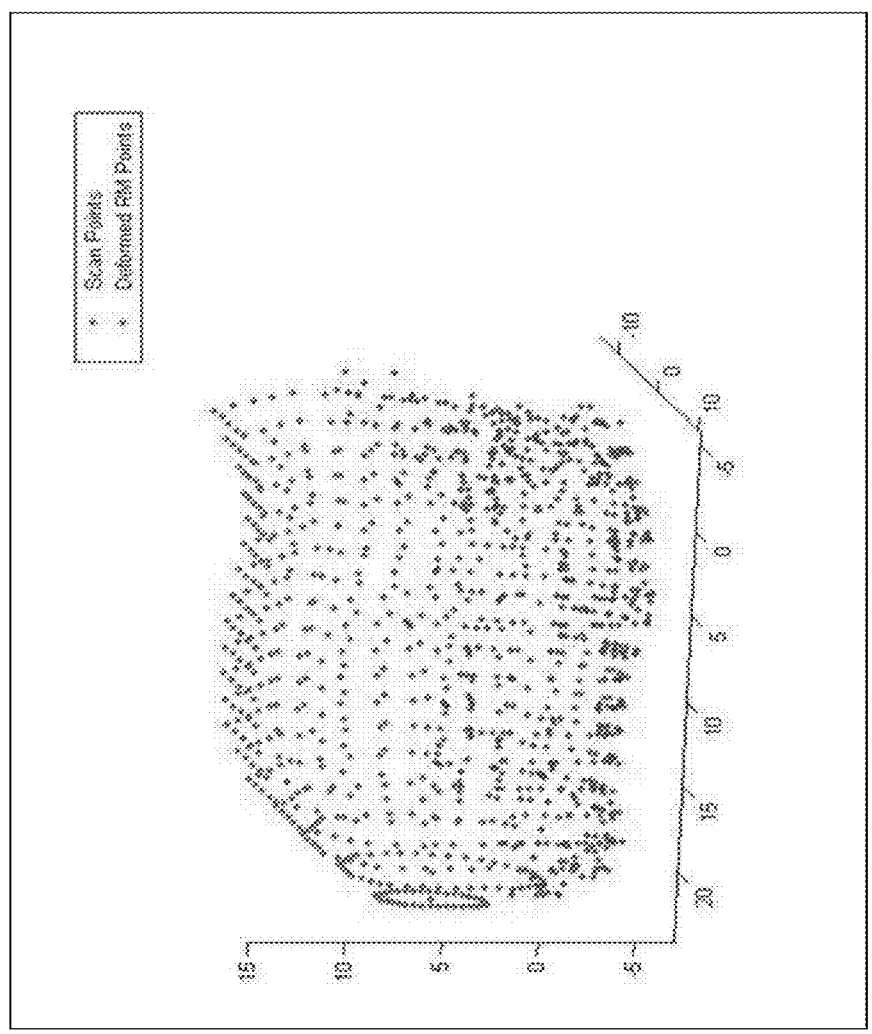
FIG. 40B depicts the scan and the deformed RM.

Then, the module 106 deforms (3606) the RM by non-rigid transformation—use c and d to deform all RM points to map scan points, as shown in FIGS. 40A and 40B. FIG. 40A depicts the original RM and the deformed RM. FIG. 40B depicts the scan and the deformed RM.

Next, the module 106 measures (3608) the deformed RM and treats the measurement as a measurement of the scan. The measurement of the deformed RM is an accurate estimation of the measurement of the scan, because the RM and the scan are matched both in rigid and non-rigid ways. Depending on the implementation, the measurement can be circumference, height, volume, and so on. Finally as shown in FIG. 36, the output is the deformed Reference Model and estimation of the scan measurement.

An important factor in the deformation process is to ensure that the layers in the OM are still parallel to each other. Therefore, the distance between the layers is identical as previously described in reference to the RM. This allows the data structure to be simple and allows the following measurement to take place easily. It should be noted that by not moving the y-values, a small amount of accuracy is lost. However, in order to get higher accuracy, the number of the layers can be increased such that the delta(y) is very small.

Measurement—the measurement methodology of the methods and systems described herein is easy because the initial data structure of the RM and the resulting OM have a known relationship to the physical properties of the object.

Example 1

Height

Height of $OM$=y-value(highest layer)−y-value(lowest layer)

Circumference of $OM$ for each layer=Sum(distances between all the points in a single row)

Volume=Sum {(Area layer (i)−Area layer (i−1))/ 2*delta_height_between_two_layers*(number of layers−1)}

Feature Points:

Feature points can be designated to particular points in the reference model. For example, a point in Row 5 & Column 6 can be a feature point. We can then check the (x,y,z) location of this feature point before and after the shape-based deformation process relative to other points to check how much and which direction it moved from the original position. This allows us to measure the before/after difference between the reference model and the resulting extracted 3D Model. As an example, a tip of the person's nose can be designated as a 'feature point'. After the registration, we can then check this feature point to measure the distance from the tip of the nose to the ear which is another 'feature point'.

Object Analysis (Feature Detection and Analysis)

Generally, capturing an image of an object and making certain measurements of the object based upon the image is useful for many applications. However, a single two-dimensional (2D) camera typically cannot capture distance information, and measurements obtained from a single 2D image traditionally do not result in an accurate measurement. In some cases, 3D scanners can be used to make measurements with some success, but this approach is limited in uncontrolled environment because of noise, occlusion, and lack of enough number of scans to make a full 3D model.

Referring back to FIG. 3, the image processing module 106 includes a shape-based registration function 310. The shape-based registration function 310 receives the 3D model of the scene 306 as generated by the SLAM module 302 and the object recognition module 304.

Shape-based registration of 3D reconstruction offers a number of benefits over more traditional approaches. especially when used with 3D object analysis. The data structure of the fully formed 3D output makes it very easy to make detailed measurements of features.

Therefore, the sensor 103 captures an image which is used to generate a 3D point cloud of a physical object, and the 3D point cloud is analyzed to provide an accurate measurement. The shape-based registration function 310 of the image processing module 106 is tolerant of a noisy environment (such as those found in the real world) and is able to measure complex shapes. In some embodiments, the measurement is length, height, width, volume, angle, amounts of curvature, ratio, distance, or anything that conveys the description of the physical space.

Calibration

Most low-cost 3D cameras are not very accurate in terms of being able to measure the physical space. For example, two different cameras can measure the same object and come up with approximately 7% difference in the object's size from a certain distance. In general, as an object is placed further away from the camera, inaccuracy of measurements of the object increases.

Therefore, the module 106 can perform a calibration process where the captured scan from each sensor is compared against a known object with certain measurements. Working backward, the image processing module then determines a function that converts the captured points x, y, z to coordinates x', y', z', which more accurately match the real-world dimensions. In some embodiments, this type of calibration or correction is done statistically or in real-time. Thus, imperfection in the accuracy of the 3D image capture device is corrected through the calibration process.

In some embodiments, the measurements are displayed on a viewer coupled to the computing device 105 as an augmented reality display on top of a real-world scene. Other techniques can be used to display the measurements without departing from the scope of the technology described herein. In some embodiments, the measurements are stored in a database or transferred to a cloud-based server for easy retrieval by other applications.

Figure 41:
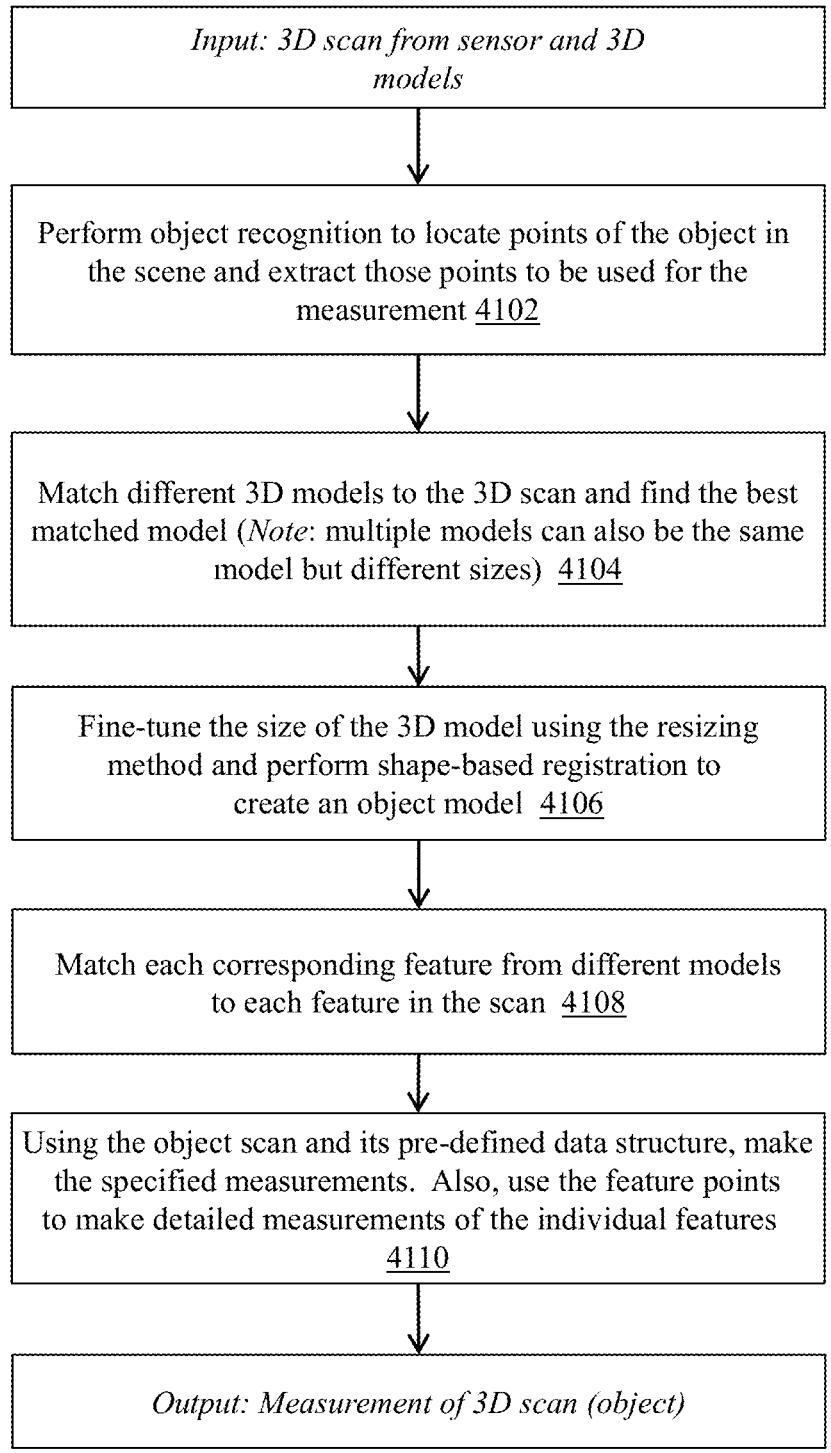
FIG. 41 is a flow diagram of a method for shape-based registration and measurement analysis.
Figure 42:
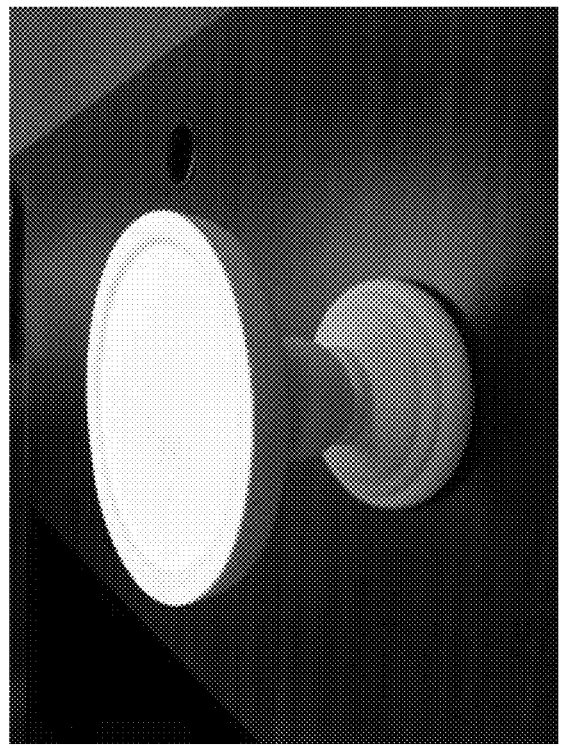
FIG. 42 is an example complex object to be used in conjunction with the shape-based registration function described herein.
Figure 43:
FIG. 43 depicts a 3D scan of the scene which includes the target object to be measured.

FIG. 41 is a flow diagram of a method for shape-based registration and measurement analysis used in conjunction with the system 100 of FIG. 1 and the workflow of FIG. 3. FIG. 42 is an example complex object to be used in conjunction with the shape-based registration function 310 described herein. The sensor 103 captures an image of the complex object and provides the image to the image processing module 106. For example, the module 106 generates a 3D scan of the scene which includes the target object to be measured. As shown in FIG. 43, the 3D scan of a scene includes the target object.

Figure 44:
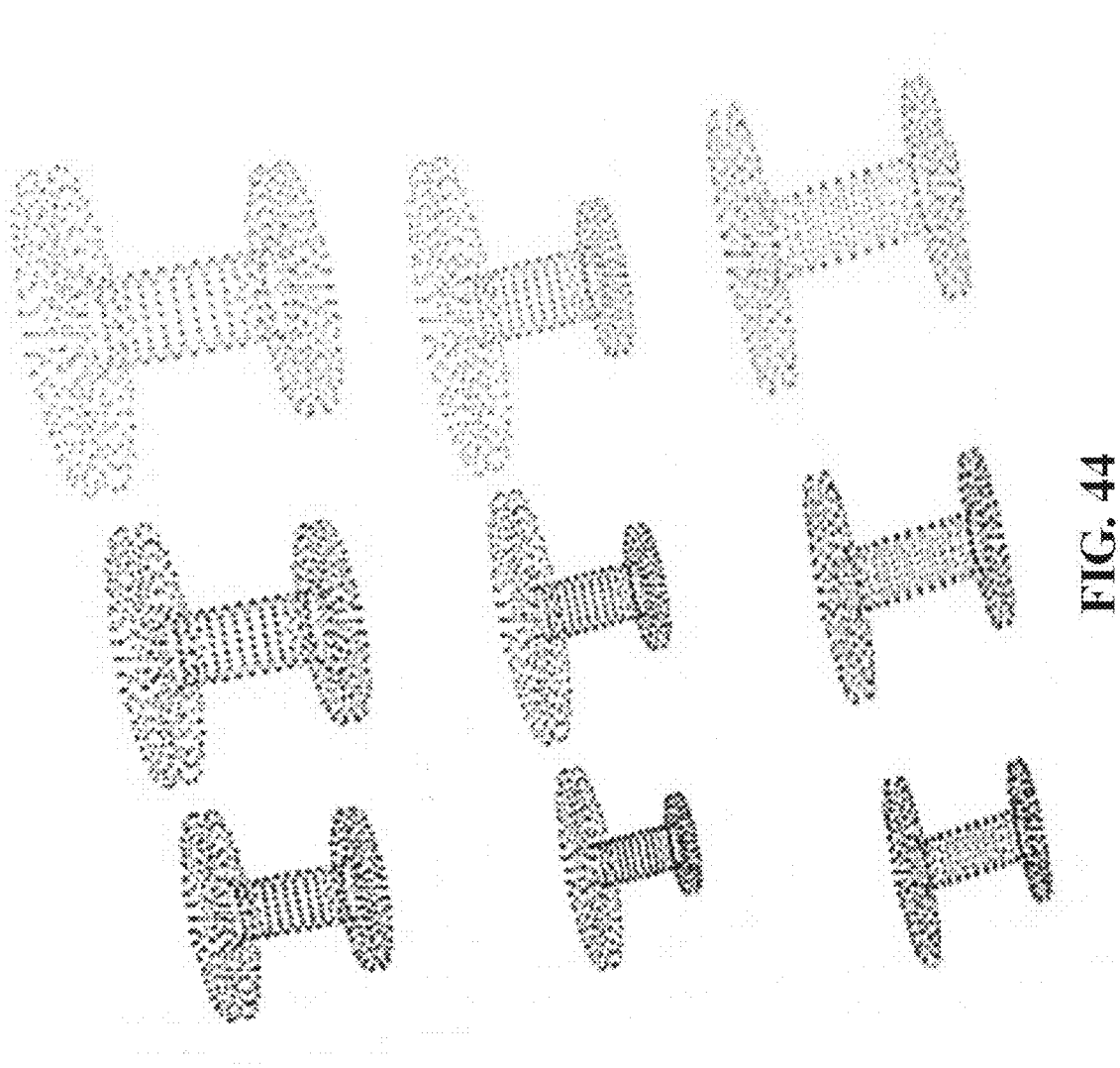
FIG. 44 depicts an example of 3D models that are used.

The module 106 also generates or retrieves 3D models that are similar to the target object. FIG. 44 depicts an example of 3D models that are used by the module 106. As shown, each model is slightly different in size and dimensions from the other models.

Figure 45:
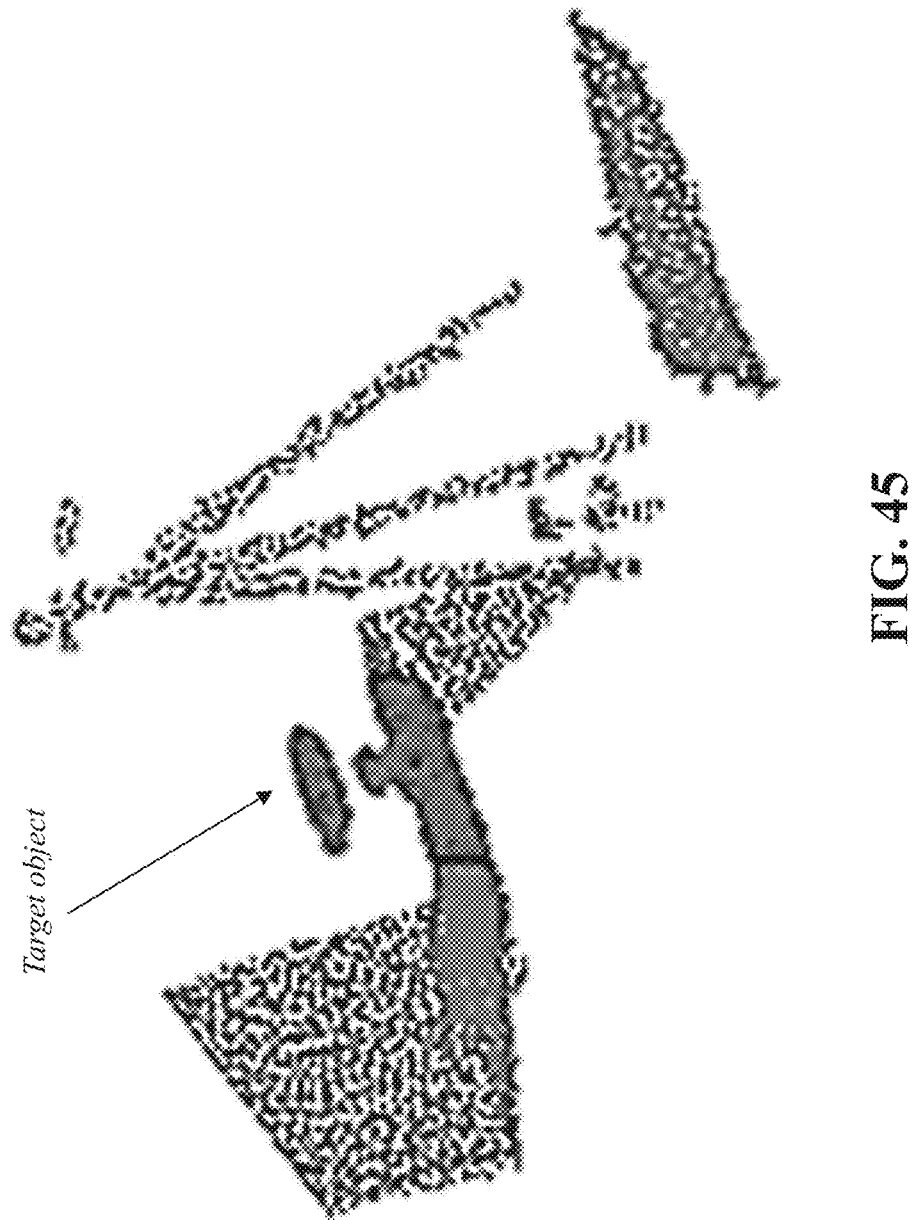
FIG. 45 depicts a located object highlighted in a different color.

Referring back to FIG. 41, the image processing module 106 performs the following steps:

Perform object recognition to locate points of the object in the scene and extract those points to be used for the measurement (4102). The module 106 searches the 3D scan of the scene for the object, using any number of object recognition algorithms (e.g., machine learning, polynomial fit, and/or object comparison) including those described previously herein. As shown in FIG. 45, the located object can be highlighted in a different color.

Figure 46:
FIG. 46 depicts the best matched model with the highest similarity measurement.

The module 106 matches (4104) the 3D scan to the various 3D models using a 3D registration algorithm, e.g. ICP. The module 106 evaluates the matching results by measuring the similarity between matched models and scan, such as point to point distance summation (i.e. ICP error). It should be noted that the module 106 can use the same model at different sizes for the matching step. The module 106 determines the best matched model with the highest similarity measurement, as shown in FIG. 46. This is further refined by the taking the chosen 3D model and resizing it slightly to fine-tune (4106) the 3D model size (e.g., using the resizing method described above).

Figure 47:
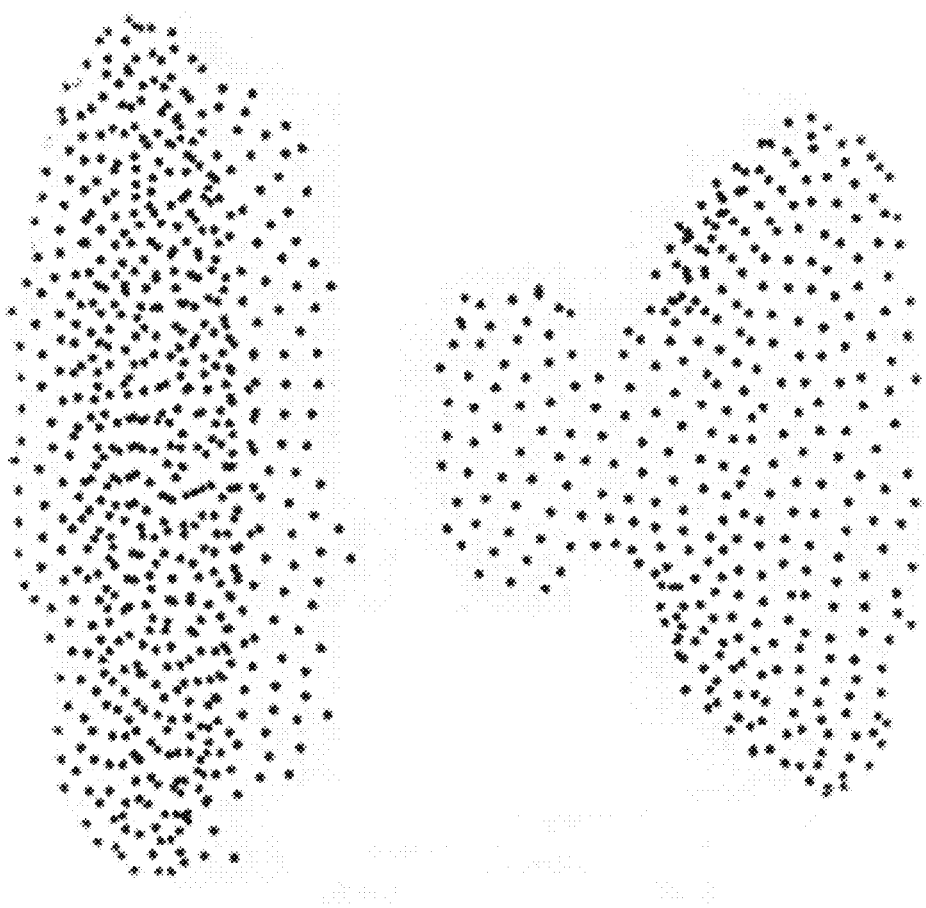
FIG. 47 depicts the close points to the model as belonging to the target object.

Based on the best matched model, the module 106 considers only the close points to the model as belonging to the target object and cleans up the rest of the points, as shown in FIG. 47.

Figure 48:
FIG. 48 is an example of the resulting scan after feature detection and extraction.

The 3D model has 'feature points' (e.g. nose on the face) that are pre-defined. As the 3D model is modified by the shape-based registration function 310 described above, its pre-defined position is moved to a new location. This movement of the point from its original location (relative to other points in the model) allows an accurate measurement of the feature (e.g. height of the nose relative to the rest of the face). The module 106 detects and extracts the features from the de-noised scan using feature detection. FIG. 48 is an example of the resulting scan after feature detection and extraction.

Figure 49:
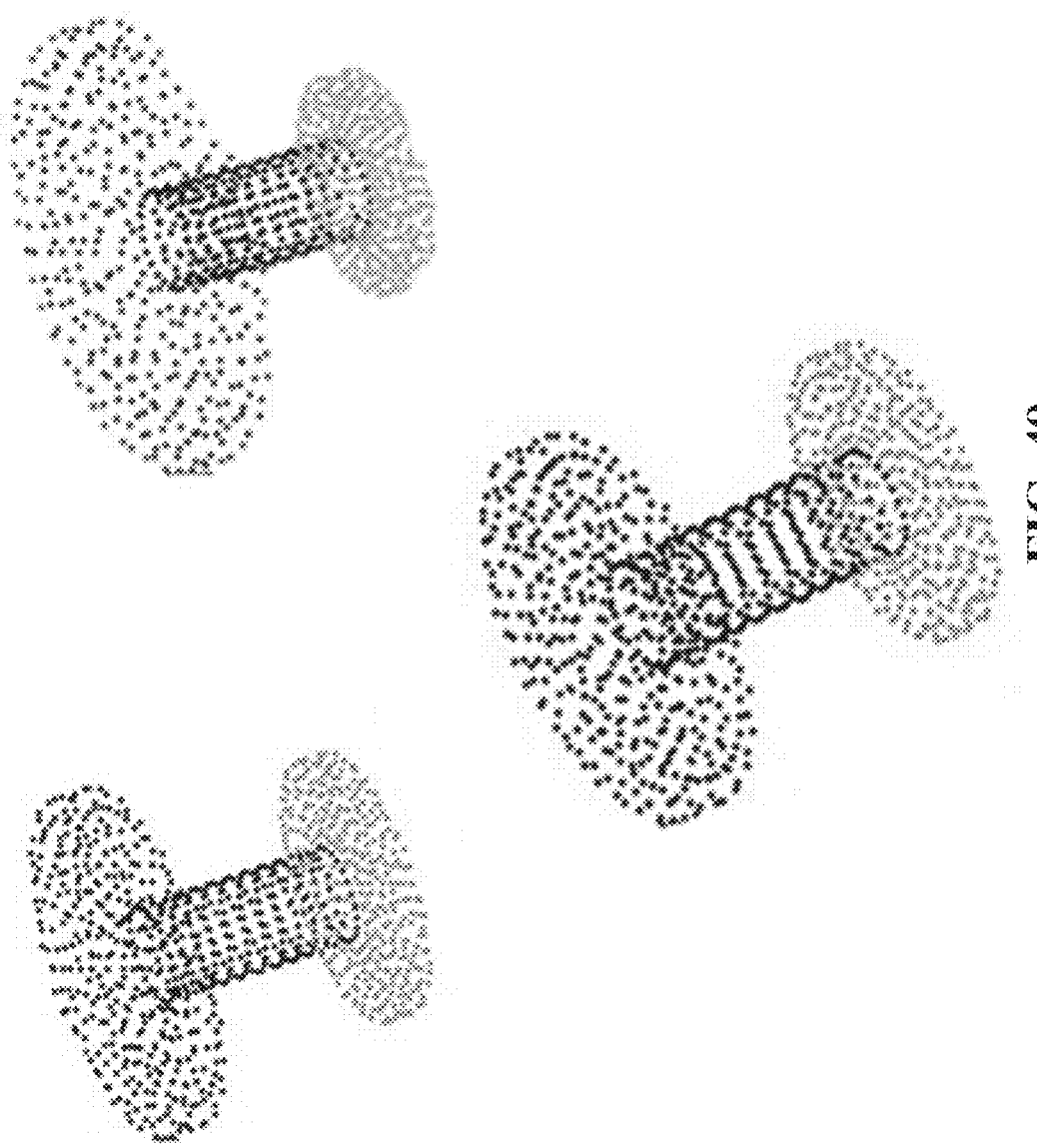
FIG. 49 depicts matching each corresponding feature of the different models to the feature of the scan.
Figure 50:
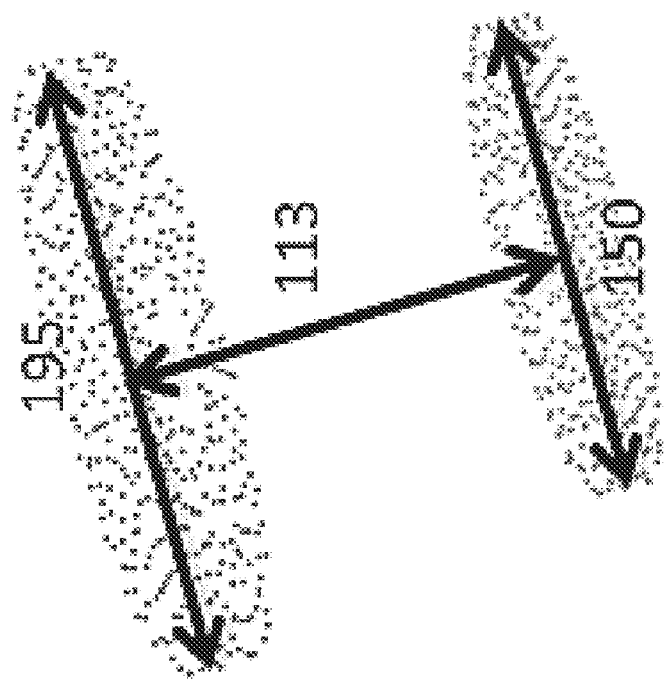
FIG. 50 depicts the calculation of the measurement of the target object.
Figure 51:
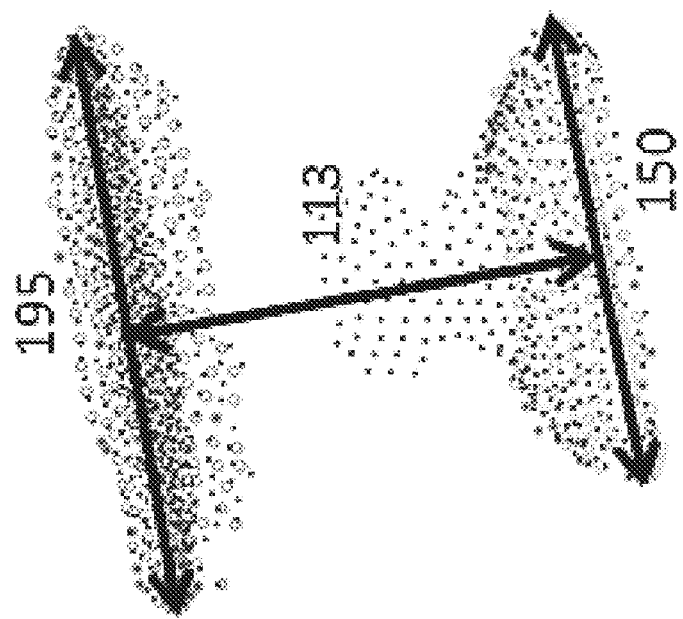
FIG. 51 depicts the output of the measurements of the target object.

Next, the module 106 finds the corresponding features in the models and matches (4108) each corresponding feature of the different models to the feature of the scan, as shown in FIG. 49. The module 106 uses the pre-defined data structure of the 3D model to make any necessary measurements (4110). Also, the module 106 can use the feature points to make detailed measurements of the individual features. For example, the height is found by the difference between the y-values of the array as previously shown. Or, the volume of the object can also be found in a similar fashion. Based on the relative measurements and known information of the models, the module 106 calculates the measurement of the target object, as shown in FIG. 50. The module 106 then outputs the measurements of the target object, as shown in FIG. 51.

There are several advantages to the shape-based registration process described herein. By using shape-based registration to create a fully formed 3D model, even a partial scan of the object can be used to make accurate 3D measurements since it will fill in the rest of the object the best it can. This works even with occlusions and noises around the object since this process can automatically smooth and fill in the rest of the object. This works well with low-cost scanner or scans taken from outdoors in harsh environment since it will automatically provide accurate measurements based off the 'best possible' 3D model that can be extracted from the scans. Also, the process is fast because the 3D modeling process is fast and the data structure of the 3D model is known (i.e. the relationship between all the points in the model are known). This allows the calculation to take place very quickly.

This works for any type of an object. Even the most complex objects can be broken down into individual components of monolithic models that can be individually measured and then combined. This works well for location features and making the measurement of key features within the object by using the 'feature points'.

Applications

The above-described methods and systems can be applied to a wide variety of industrial and other real-world applications.

3D Printing—the 3D printing industry has been around for some time. However, the adaption rate for the consumer market has been slow, primarily due to the complexity of scanning objects easily to create a printable model. The methods and systems described herein (for example, as used in the Starry Night plug-in for the Unity 3D game engine, available from VanGogh Imaging, Inc. of McLean, Va.) greatly simplify the 3D printing process. Traditional 3D printing methods usually require a post-processing step that can be difficult for users to learn and take approximately 30-60 minutes to complete, thereby slowing down the end-to-end processing and making it undesirable for real-time, embedded applications. In some cases, the user must use a complex CAD tool to clean, crop, fill in holes and smooth the 3D model before it can be used in 3D printing applications. In contrast, using the methods and systems described herein, the resulting OM is already a full 3D model that is processed using knowledge of the object's shape. Therefore, the OM can be sent directly to the 3D printer without the manual post-processing step.

Parts Inspection—Parts inspection processes are used in a large number of industries, such as manufacturing, agriculture, and service. Parts inspection could also be used to inspect humans (e.g., for security applications such as face recognition and medical applications such as measuring the amount of air a newborn is breathing). the traditional method requires a large amount of processing steps (e.g., crop & remove noise, locate features, extract feature points) in order to clean up the noise as well as to locate which points are relevant to the measurement. Further, finding a volume of a scan which is not a fully formed 3D model is difficult. Therefore, the process tends to be very slow and sometimes not accurate.

In contrast, using the methods and systems described herein, the OM is already a fully formed model and as shown in the corresponding measurement section above, the measurement of this object is simple because the OM has a data structure where every point has a known relationship to each other. Therefore, as soon as the OM is extracted, the measurement can be calculated without any further processing.

In summary, the methods and systems described herein show how scan points that were captured can be used to modify the RM to provide the best possible fit 3D model which is fully formed and can be used in a wide variety of applications such as 3D printing, gaming, parts inspection, and many industries without the time-consuming and difficult manual processing that is typically needed.

Hardware Acceleration

For a large number of applications, the methods and systems described herein can run quite fast as a software-only solution by applying multi-threading and NEON (for ARM) support. However, higher performance can be achieved with hardware acceleration using an field programmable gate array (FPGA). Specifically, the methods and systems described herein can use a FPGA, DSP, GPU, or ISP (image processor) to provide large number of parallel voxel processors. This allows the methods and systems described herein to perform multiple times the speed of the software-only implementation.

The methods and systems described herein are ideally suited to meet the challenges of real-time object recognition and reconstruction for a large number of applications. They offer significant benefits when compared to more traditional approaches including:
  Ease of use—no prior computer vision experience is needed.
  Supported by Unity and their millions of App developers. It can also be available as .SO for Android/Linux and .DLL for Windows.
  Runs very efficiently on embedded (Linux) or mobile (Android) platforms using ARM processors but can also support Windows or iOS as well.
  Supports hardware acceleration for demanding applications.
  Real-time capture and object identification.
  Superior noise tolerance.
  A fully automated workflow—no manual post-processing required.
  The output is a fully formed 3D model.
  The known data structure of the fully formed 3D output makes it very easy to make detailed measurements of features.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A computerized method for generating a fully-formed three-dimensional (3D) model of an object represented in a noisy or partial scene, the method comprising:

receiving, by an image processing module of a computing device, a plurality of images captured by a sensor coupled to the computing device, the images depicting a scene containing one or more physical objects;

generating, by the image processing module, partial 3D mesh models of the physical objects in the scene based upon analysis of the plurality of images, the generating comprising:

cleaning, by the image processing module, the plurality of images by removing artifacts caused by the sensor from the images;

capturing, by the image processing module, a depth map for each cleaned image and converting the depth map into a point cloud;

generating, by the image processing module, a 3D global model of the scene;

registering, by the image processing module, the point cloud for each image to the 3D global model;

updating, by the image processing module, the 3D global model after each registration of a point cloud; and generating, by the image processing module, the partial 3D mesh models after registration of the point clouds;

determining, by the image processing module, a location of at least one target object in the scene by comparing the plurality of images to one or more 3D reference models and extracting a 3D point cloud of the target object;

matching, by the image processing module, the 3D point cloud of the target object to a selected 3D reference model based upon a similarity parameter;

detecting, by the image processing module, one or more features of the target object based upon the matching step;

generating, by the image processing module using the 3D reference model, a fully formed 3D model of the target object using partial or noisy 3D points extracted from the scene;

extracting, by the image processing module using the 3D reference model, the detected features of the target object and features of the 3D reference models that correspond to the detected features of the target object; and calculating, by the image processing module using the 3D reference model, measurements of the detected features of the target object by comparing each of the detected features of the target object to the corresponding features of the 3D reference models.

2. The method of claim 1, wherein the step of generating a 3D global model of the scene comprises analyzing, by the image processing module, the first image in the plurality of images to generate a global distance volume model.

3. The method of claim 1, wherein the step of registering the depth map for each image to the 3D global model comprises comparing the point cloud for each image to the 3D global model using a multi-level iterative closest point (ICP) comparison.

4. The method of claim 3, wherein the step of updating the 3D global model after each registration of a point cloud comprises:

calculating, by the image processing module, a distance between a voxel in the 3D global model and one or more closest points in the point cloud based upon the ICP comparison; and updating, by the image processing module, a distance value of the voxel in the 3D global model based upon the calculated distance between the voxel and the one or more closest points.

5. The method of claim 4, further comprising:
   determining, by the image processing module, a position and a direction of the sensor relative to the scene;
   calculating, by the image processing module, a direction of one or more simulated rays traveling from the sensor to the 3D global model and determining whether each simulated ray crosses a surface of the 3D global model;
   determining, by the image processing module, a vertex and a normal for each simulated ray that crosses a surface of the 3D global model, the vertex and the normal based upon a point at which the simulated ray crosses the surface; and
   updating, by the image processing module, the 3D global model based upon the determined vertex and normal for each simulated ray.

6. The method of claim 1, wherein the depth map is filtered and/or downsampled before being converted into a point cloud.

7. The method of claim 1, wherein the step of determining a location of at least one target object in the scene comprises:
   determining, by the image processing module, a plurality of descriptors associated with pairs of points in the one or more 3D reference models;
   storing, by the image processing module, the descriptors of the 3D reference models in a table;
   remove, by the image processing module, one or more flat surfaces from the plurality of images and downsample the images;
   sample, by the image processing module, a pair of points in one of the plurality of images, wherein the sampled pair of points are at a specified distance from each other,
   determine, by the image processing module, a descriptor for the sampled pair of points;
   determine, by the image processing module, a rigid transform that aligns the sampled pair of points and a similar pair of points retrieved from the table;
   crop, by the image processing module, an area from the image based upon the rigid transform;
   align, by the image processing module, the cropped area to one of the 3D reference models to obtain a rough transform of the 3D reference model;
   determine, by the image processing module, a number of registered points in the cropped area;
   project, by the image processing module, the rough transform of the 3D reference model to the image; and
   determine, by the image processing module, a refined transform of the 3D reference model based upon the rough transform, wherein the refined transform includes a maximum number of projected points in the image; and
   align, by the image processing module, the maximum number of projected points to the 3D reference model to generate a final transform of the 3D reference model.

8. The method of claim 7, wherein the final transform is used to highlight the location of the target object in the scene.

9. The method of claim 7, wherein the descriptor for the sampled pair of points is used as a key to retrieve the similar pair of points from the table.

10. The method of claim 1, wherein the step of matching the 3D point cloud of the target object to a selected 3D reference model based upon a similarity measurement comprises:
    selecting, by the image processing module, a 3D reference model;
    measuring, by the image processing module, a level of similarity between the 3D point cloud of the target object and the selected 3D reference model;
    repeating, by the image processing module, the steps of selecting a 3D reference model and measuring a level of similarity, for each of the 3D reference models;
    determining, by the image processing module, the 3D reference model corresponding to the highest level of similarity that is higher than the similarity parameter; and
    removing, by the image processing module, a plurality of points from the 3D reference model corresponding to the highest level of similarity.

11. The method of claim 1, wherein the step of generating a fully formed 3D model of the target object using partial or noisy 3D points extracted from the scene comprises modifying, by the image processing module, the 3D reference model using the extracted partial or noisy 3D points.

12. The method of claim 11, further comprising retaining, by the image processing module, an original point position of the 3D reference model if measurements of the detected features of the target object cannot be calculated using the corresponding features of the 3D reference models.

13. The method of claim 11, further comprising controlling, by the image processing module, an amount of modification of the 3D reference model to provide automatic smoothing of the extracted partial or noisy 3D points.

14. The method of claim 1, wherein the 3D reference model comprises a data structure including a plurality of 2×2 arrays and wherein:
    each row of an array represents a 2D layer of the 3D reference model; and
    each column of an array represents points connected to points in layers above and below the 2D layer.

15. The method of claim 14, wherein the 2D layers in the 3D reference model data structure are of equal distance from each other.

16. The method of claim 14, wherein the 3D reference model data structure includes a center of each 2D layer.

17. The method of claim 14, the 3D reference model data structure further comprising an interconnection array that provides connection points between two 3D reference models.

18. The method of claim 14, wherein the rows of an array are sorted by height.

19. The method of claim 14, wherein one or more points in the 3D reference model data structure are designated as feature points.

20. The method of claim 19, wherein the image processing module uses the feature points to calculate measurements of the features in the 3D reference models.

21. The method of claim 1, wherein the calculated measurements of the detected features of the target object include a height of a detected feature, a width of a detected feature, a length of a detected feature, or a volume of a detected feature.

22. A system for generating a fully-formed three-dimensional (3D) model of an object represented in a noisy or partial scene, the system comprising an image processing module of a computing device configured to:
    receive a plurality of images captured by a sensor coupled to the computing device, the images depicting a scene containing one or more physical objects;
    generate partial 3D mesh models of the physical objects in the scene based upon analysis of the plurality of images, the generating comprising:

cleaning the plurality of images by removing artifacts caused by the scanner from the images;
capturing a depth map for each cleaned image and converting the depth map into a point cloud;
generating a 3D global model of the scene;
registering the point cloud for each image to the 3D global model;
updating the 3D global model after each registration of a point cloud; and
generating the partial 3D mesh models after registration of the point clouds;
determine a location of at least one target object in the scene by comparing the plurality of images to one or more 3D reference models and extracting a 3D point cloud of the target object;
match the 3D point cloud of the target object to a selected 3D reference model based upon a similarity parameter;
detect one or more features of the target object based upon the matching step;
generate, using the 3D reference model, a fully formed 3D model of the target object using partial or noisy 3D points from the scene;
extract, using the 3D reference model, the detected features of the target object and features of the 3D reference models that correspond to the detected features of the target object; and
calculate, using the 3D reference model, measurements of the detected features of the target object by comparing each of the detected features of the target object to the corresponding features of the 3D reference models.

23. The system of claim 22, wherein the step of generating a 3D global model of the scene comprises analyzing the first image in the plurality of images to generate a global distance volume model.

24. The system of claim 22, wherein the step of registering the depth map for each image to the 3D global model comprises comparing the point cloud for each image to the 3D global model using a multi-level iterative closest point (ICP) comparison.

25. The system of claim 24, wherein the step of updating the 3D global model after each registration of a point cloud comprises:
calculating a distance between a voxel in the 3D global model and one or more closest points in the point cloud based upon the ICP comparison; and
updating a distance value of the voxel in the 3D global model based upon the calculated distance between the voxel and the one or more closest points.

26. The system of claim 25, wherein the image processing module is further configured to:
determine a position and a direction of the sensor relative to the scene;
calculate a direction of one or more simulated rays traveling from the sensor to the 3D global model and determining whether each simulated ray crosses a surface of the 3D global model;
determine a vertex and a normal for each simulated ray that crosses a surface of the 3D global model, the vertex and the normal based upon a point at which the simulated ray crosses the surface; and
update the 3D global model based upon the determined vertex and normal for each simulated ray.

27. The system of claim 22, wherein the depth map is filtered and/or downsampled before being converted into a point cloud.

28. The system of claim 22, wherein the step of determining a location of at least one target object in the scene comprises:
determining a plurality of descriptors associated with pairs of points in the one or more 3D reference models;
storing the descriptors of the 3D reference models in a table;
removing one or more flat surfaces from the plurality of images and downsample the images;
sampling a pair of points in one of the plurality of images, wherein the sampled pair of points are at a specified distance from each other,
determining a descriptor for the sampled pair of points;
determining a rigid transform that aligns the sampled pair of points and a similar pair of points retrieved from the table;
cropping an area from the image based upon the rigid transform;
aligning the cropped area to one of the 3D reference models to obtain a rough transform of the 3D reference model;
determining a number of registered points in the cropped area;
projecting the rough transform of the 3D reference model to the image;
determining a refined transform of the 3D reference model based upon the rough transform, wherein the refined transform includes a maximum number of projected points in the image; and
aligning the maximum number of projected points to the 3D reference model to generate a final transform of the 3D reference model.

29. The system of claim 28, wherein the final transform is used to highlight the location of the target object in the scene.

30. The system of claim 28, wherein the descriptor for the sampled pair of points is used as a key to retrieve the similar pair of points from the table.

31. The system of claim 22, wherein the step of matching the 3D point cloud of the target object to a selected 3D reference model based upon a similarity parameter comprises:
selecting a 3D reference model;
measuring a level of similarity between the 3D point cloud of the target object and the selected 3D reference model;
repeating the steps of selecting a 3D reference model and measuring a level of similarity, for each of the 3D reference models;
determining the 3D reference model corresponding to the highest level of similarity that is higher than the similarity parameter; and
removing a plurality of points from the 3D reference model corresponding to the highest level of similarity.

32. The system of claim 22, wherein the step of generating a fully formed 3D model of the target object using partial or noisy 3D points extracted from the scene comprises modifying the 3D reference model using the extracted partial or noisy 3D points.

33. The system of claim 32, wherein the image processing module is further configured to retain an original point position of the 3D reference model if measurements of the detected features of the target object cannot be calculated using the corresponding features of the 3D reference models.

34. The system of claim 32, wherein the image processing module is further configured to control an amount of modification of the 3D reference model to provide automatic smoothing of the extracted partial or noisy 3D points.

35. The system of claim 22, wherein the 3D reference model comprises a data structure including a plurality of 2×2 arrays and wherein:
   each row of an array represents a 2D layer of the 3D reference model; and
   each column of an array represents points connected to points in layers above and below the 2D layer.

36. The system of claim 35, wherein the 2D layers in the 3D reference model data structure are of equal distance from each other.

37. The system of claim 35, wherein the 3D reference model data structure includes a center of each 2D layer.

38. The system of claim 35, the 3D reference model data structure further comprising an interconnection array that provides connection points between two 3D reference models.

39. The system of claim 35, wherein the rows of an array are sorted by height.

40. The system of claim 35, wherein one or more points in the 3D reference model data structure are designated as feature points.

41. The system of claim 40, wherein the image processing module uses the feature points to calculate measurements of the features in the 3D reference models.

42. The system of claim 22, wherein the calculated measurements of the detected features of the target object include a height of a detected feature, a width of a detected feature, a length of a detected feature, or a volume of a detected feature.

43. A computer program product, tangibly embodied in a non-transitory computer readable storage device, for generating a fully-formed three-dimensional (3D) model of an object represented in a noisy or partial scene, the computer program product including instructions operable to cause an image processing module of a computing device to:

receive a plurality of images captured by a sensor coupled to the computing device, the images depicting a scene containing one or more physical objects;
generate partial 3D mesh models of the physical objects in the scene based upon analysis of the plurality of images, the generating comprising:
   cleaning the plurality of images by removing artifacts caused by the scanner from the images;
   capturing a depth map for each cleaned image and converting the depth map into a point cloud;
   generating a 3D global model of the scene;
   registering the point cloud for each image to the 3D global model;
   updating the 3D global model after each registration of a point cloud; and
   generating the partial 3D mesh models after registration of the point clouds;
determine a location of at least one target object in the scene by comparing the plurality of images to one or more 3D reference models and extracting a 3D point cloud of the target object;
match the 3D point cloud of the target object to a selected 3D reference model based upon a similarity parameter;
detect one or more features of the target object based upon the matching step;
generate, using the 3D reference model, a fully formed 3D model of the target object using partial or noisy 3D points from the scene;
extract, using the 3D reference model, the detected features of the target object and features of the 3D reference models that correspond to the detected features of the target object; and
calculate, using the 3D reference model, measurements of the detected features of the target object by comparing each of the detected features of the target object to the corresponding features of the 3D reference models.

* * * * *